United States Patent
Xu et al.

(10) Patent No.: US 8,635,652 B2
(45) Date of Patent: Jan. 21, 2014

(54) METHOD AND APPARATUS FOR SUPPORTING MOBILITY IN A MOBILE BROADCASTING SYSTEM

(75) Inventors: Yiling Xu, Suwon-si (KR); Young-Wan So, Seoul (KR); Jae-Yeon Song, Seoul (KR); Kook-Heui Lee, Suwon-si (KR); Seo-Young Hwang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 507 days.

(21) Appl. No.: 12/351,505

(22) Filed: Jan. 9, 2009

(65) Prior Publication Data
US 2009/0204997 A1 Aug. 13, 2009

(30) Foreign Application Priority Data

| Jan. 9, 2008 | (KR) | 10-2008-0002820 |
| Feb. 27, 2008 | (KR) | 10-2008-0018036 |
| Apr. 8, 2008 | (KR) | 10-2008-0032882 |
| Jun. 3, 2008 | (KR) | 10-2008-0052104 |
| Oct. 2, 2008 | (KR) | 10-2008-0097313 |
| Oct. 21, 2008 | (KR) | 10-2008-0103246 |

(51) Int. Cl.
H04N 7/16 (2011.01)

(52) U.S. Cl.
USPC .................. 725/62; 725/38; 725/39; 725/48

(58) Field of Classification Search
USPC .................. 725/62, 38–39, 48; 455/432.1
See application file for complete search history.

(56) References Cited

U.S. PATENT DOCUMENTS

| 2005/0090235 A1 | 4/2005 | Vermola et al. |
| 2005/0289589 A1* | 12/2005 | Vermola .......................... 725/35 |
| 2006/0259433 A1* | 11/2006 | Lahtinen et al. ................ 705/57 |
| 2006/0262751 A1 | 11/2006 | Vermola et al. |

(Continued)

FOREIGN PATENT DOCUMENTS

| EP | 1 791 362 | 5/2007 |
| EP | 1 826 930 | 8/2007 |

(Continued)

OTHER PUBLICATIONS

ETSI TS 1XX XXX V<0.0.11> (Mar. 2005) Techniical Spesification IP Datacast over DVB-H: Electronic Service Guide TM 3348 Rev.1.*

(Continued)

*Primary Examiner* — Pankaj Kumar
*Assistant Examiner* — Alazar Tilahun
(74) *Attorney, Agent, or Firm* — The Farrell Law Firm, P.C.

(57) ABSTRACT

A method and apparatus for supporting mobility in a mobile broadcasting system in which Electronic Service Guide (ESG) discovery is required. The mobility support is classified into three ways according to three different aspects. The first way is to provide roaming information for a local IPDC operator having a roaming partner among local IPDC operators. In the second way, a terminal transmits a query message for requesting transmission of information on a particular local IPDC operator, and receives information on the particular local IPDC operator in response thereto. The third way is to provide the terminal with type information of an ESG; an access type of which is classified according to provision of a roaming service. The roaming information, the information on the particular local IPDC operator and the type information of the ESG, which are provided to the terminal from the mobile broadcasting system, can be provided in an ESG bootstrap level.

43 Claims, 44 Drawing Sheets

(56) References Cited

U.S. PATENT DOCUMENTS

| | | |
|---|---|---|
| 2007/0041377 A1 | 2/2007 | Song et al. |
| 2007/0100984 A1 | 5/2007 | Jansky et al. |
| 2007/0118872 A1 | 5/2007 | Song et al. |
| 2007/0150920 A1 | 6/2007 | Lee et al. |
| 2007/0174861 A1 | 7/2007 | Song et al. |
| 2007/0207727 A1 | 9/2007 | Song et al. |
| 2008/0176559 A1* | 7/2008 | Vare et al. .................. 455/432.1 |
| 2009/0113471 A1* | 4/2009 | Bouazizi et al. ................ 725/32 |

FOREIGN PATENT DOCUMENTS

| | | |
|---|---|---|
| EP | 1 838 018 | 9/2007 |
| EP | 1 871 027 | 12/2007 |
| JP | 2009-505557 | 2/2009 |
| JP | 2009-512318 | 3/2009 |
| JP | 2009-515386 | 4/2009 |
| JP | 2009-517963 | 4/2009 |
| WO | WO 2007/111445 | 10/2007 |
| WO | WO 2007/129863 | 11/2007 |
| WO | WO 2007/136199 | 11/2007 |

OTHER PUBLICATIONS

Digital Video Broadcasting (DVB); IP Datacast over DVB-H: Implementation Guidelines for Mobility, ETSI TS 102 611 V1.1.1, Oct. 2007.

DVB Organization, "ESG Extensions for Roaming Support", TM-CBMS 2063, DVB TM CBMS, IPDC over DVB-H, Dec. 3, 2007.

DVB Organization, "Input for Chapter 7.5 in ESGoIA Working Assumption", TM-CBMS 2060, Nov. 28, 2007.

DVB Organization, "Potential Relevant Parameters in ESG from Roaming Perspective", TM-CBMS 2035, Oct. 30, 2007.

DVB Organization, "ESG Discovery in Mobility Phase 2 Scenarios", TM-CBMS 2096, DVB TM CBMS, IPDC over DVB-H, Feb. 27, 2007.

DVB Organization, "ESG Extension for Mobility Supporting", TM-CBMS 2083, DVB TM CBMS, IPDC in DVB-H, Jan. 8, 2008.

\* cited by examiner

US 8,635,652 B2

METHOD AND APPARATUS FOR SUPPORTING MOBILITY IN A MOBILE BROADCASTING SYSTEM

PRIORITY

This application claims the benefit under 35 U.S.C. §119 (a) of Korean patent applications filed in Korea as Application No. 10-2008-0002820 filed on Jan. 9, 2008, Application No. 10-2008-0018036 filed on Feb. 27, 2008, Application No. 10-2008-0032882 filed on Apr. 8, 2008, Application No. 10-2008-0052104 filed on Jun. 3, 2008, Application No. 10-2008-0097313 filed on Oct. 2, 2008, and Application No. 10-2008-0103246 filed on Oct. 21, 2008, the disclosures of which are incorporated herein by reference.

BACKGROUND OF THE INVENTION

1. Field of the Invention

The present invention relates generally to a method and apparatus for supporting mobility in a mobile broadcasting system, and in particular, to a method and apparatus for supporting mobility in a mobile broadcasting system that utilizes Electronic Service Guide (ESG).

2. Description of the Related Art

The general architecture of a Convergence of Broadcast and Mobile Services (CBMS) system is shown in FIG. 1.

As shown in FIG. 1, Internet Protocol (IP) datacast over a Digital Video Broadcasting-Handheld (DVB-H) network involves a collection of entities that work together in order to achieve the required capabilities. In FIG. 1, a Service Application (SA) 110 aggregates contents from multiple content sources and their related metadata in order to provide a particular service application. A Service Management system 120 includes several sub-systems that manage various managements for the service. A Broadcast Network 130 and an Interactive Network 135 are transmission bearers in the CBMS system. A Terminal 140 in the CBMS system receives services and signaling over the Broadcast Network 130, and communicate bidirectionally over the Interactive Network 135. In FIG. 1, the functional entities represented by reference numerals 110 to 140 are in the actual scope of the DVB-based CBMS system.

In FIG. 1, reference numerals C1 to C7 correspond to reference points, i.e., CBMS-1 to CBMS-7, between functional entities in the CBMS system, respectively. These reference numbers represent reference points in the scope of IP datacast. Among them, CBMS-1 to CBMS-4 are pointed out specifically in the DVB-based CBMS system, CBMS-5 is stated clearly up to Transmission Control Protocol/Internet Protocol (TCP/IP) in the DVB-based CBMS system, and CBMS-6 and CBMS-7 are considered for reference. In the CBMS system, transmission of Program Specific Information/Service Information (PSI/SI) information is achieved through CBMS-1, transmission of audio/video (A/V) streams and files is performed through CMBS-2, transmission of ESG metadata and point-to-multipoint (p-t-m) transmission are carried out via CBMS-3, access control to service applications, transmission of ESG metadata and point-to-point (p-t-p) transmission are performed through CBMS-4, and a p-t-p transmission service such as Short Message Service (SMS)/Multimedia Messaging Service (MMS), IP connectivity are provided through CBMS-5. Further, CBMS-6 is a reference point between the Service Management system 120 and the Broadcast Network 130, and CBMS-7 is a reference point between the Service Application 110 and the Service Management system 120. In FIG. 1, X1 to X3, which are reference points between the functional entities, represent the reference points that are outside the scope of IP datacast over DVB-H, i.e., outside the scope of the DVB-based CMBS system.

In the foregoing CBMS system, an ESG discovery mechanism of a terminal is as follows:

1) The terminal receives PSI/SI;
2) The terminal selects an IP platform;
3) The terminal retrieves an ESG bootstrap for the selected IP platform;
4) The terminal selects an ESG by the ESGProviderDiscoveryDescriptor and ESGAccessDescriptor in the ESG bootstrap; and
5) The terminal retrieves the ESG.

The ESG bootstrap includes the ESGProviderDiscoveryDescriptor and the ESGAccessDescriptor and provides the terminal with information on an ESG provider that provides an ESG in a given IP platform and how to obtain the ESG. For example, the ESG bootstrap may be provided through the Service Management system 120 of FIG. 1 in the CBMS system. The terminal then chooses an ESG it will boot based on the ESGProviderDiscoveryDescriptor and can parse a relevant ESGAccessDescriptor to boot the ESG. ESGAccessDescriptor designates acquisition information related to the ESG provider designated in the ESGProviderDiscoveryDescriptor.

The terminal first selects one IP platform, and then selects the ESG within this IP platform. The service described in the ESG may belong to one exact Internet Protocol Data Casting (IPDC) operator, and this information is given in the acquisition fragment. This means the terminal can only know which IPDC operator that each service belongs to only after the terminal selects and retrieves the ESG. Currently, the IPDC operator is identified by IPDC Key Management System ID (IPDCKMSID) and IPDCOperatorID. If the identifier is changed in the future, the related identifier should also be replaced by the new identifier. The IPDC operator can provide a broadcast service to the terminal in at least one predetermined IP platform and the ESG.

Generally, in one network, there may be multiple IP platforms. As shown in FIG. 2, each IP platform 211 has its own ESG bootstrap 220. Inside each ESG bootstrap 220, there may be multiple ESG providers (not shown), and each ESG provider may provide multiple ESGs. Each ESG describes services from a different IPDC operator 235.

In the above existing ESG acquisition method, mobility issue has not been considered. That is, as shown in FIG. 3, the terminal may select any one of its IP platform 320 in PSI/SI 310 for the ESG bootstrap, check an ESG provider based on the ESGProviderDiscoveryDescriptor in the ESG bootstrap and the ESGProviderDiscoveryDescriptor information provided from ESGAccessDescriptor, and choose an ESG 340 that the ESG provider 330 provides. After retrieving the ESG 340, the terminal acquires information on available IPDC operators 300 and chooses one possible IPDC operator.

FIG. 4 is a flowchart illustrating a general operation of a terminal for discovering an ESG. As shown in FIG. 4, the terminal acquires broadcast service information (PSI/SI) in step 405 and chooses an available IP platform in step 410. In step 415, the terminal ESG-bootstraps from the selected IP platform. The terminal chooses the ESG from the ESGProviderDiscoveryDescriptor and the ESGAccessDescriptor in step 420 and acquires the selected ESG by accessing a File Delivery over Unidirectional Transport (ESGFLUTE) session in step 425.

In step 430, the terminal determines whether it supports an available Key Management System (KMS) in the ESG. If it is determined in step 430 that it supports the available KMS, the terminal determines in step 435 whether it supports an available IPDC operator. If it is determined in step 435 that it supports an available IPDC operator, the terminal chooses one IPDC operator in step 440 and then accesses or purchases services in step 445.

However, if it is determined in step 430 that the terminal does not support the available KMS, the terminal determines in step 450 whether all the ESGs has been checked. If it is determined in step 450 that all the ESG has not been checked, the terminal determines in step 455 whether it wants to check another ESG. If it is determined in step 455 that it wants to check another ESG, the terminal proceeds to step 420; otherwise, the terminal ends the operation.

Meanwhile, if it is determined in step 450 that all the ESG has been checked, the terminal determines in step 460 whether all of the IP platform's ESG bootstrap has been checked. If it is determined in step 460 that all of the IP platform's ESG bootstrap has been checked, the terminal ends the operation. If not, the operation proceeds to step 465.

In step 465, the terminal determines whether it wants to check another ESG bootstrap from another IP platform. If it is determined in step 465 that it wants to check another ESG bootstrap, the terminal proceeds to step 410. If not, it ends the operation.

If the terminal is allowed to receive service only from a designated IPDC operator (e.g., the terminal has registered for service associated with this EPDC operator), the terminal cannot know which ESG has the service information related to the designated IPDC operator. Therefore, the terminal would need to perform the process of retrieving each ESG bootstrap's information and parsing every ESG until it finds the expected service related to its expected IPDC operator.

Especially in the roaming case, the terminal may move to a foreign area and maybe have no knowledge of which IPDC operator provides the desired service based on agreement. Therefore, according to the existing CBMS specification, the terminal would need to retrieve each and every ESG bootstrap information in order to retrieve and parse each and every ESG to search for the IPDC operator that is to provide the roaming service. Accordingly, existing ESG-related technology cannot support interactive ESG. Therefore, there is a demand for a system and method that provides interactive ESG in the interactive ESG-related technology.

SUMMARY OF THE INVENTION

An aspect of the present invention is to address at least the problems and/or disadvantages described above and to provide at least the advantages described below. Accordingly, the present invention provides a method and apparatus for efficiently supporting mobility of a terminal in a mobile broadcasting system.

An object of the present invention is to provide a method and apparatus for providing roaming information of an IPDC operator in a mobile broadcasting system.

Another object of the present invention is to provide a method and apparatus capable of querying information about an IPDC operator in a mobile broadcasting system.

Yet another object of the present invention is to provide a method and apparatus capable of checking whether an ESG supports roaming in a mobile broadcasting system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for supporting mobility of a terminal by a server in a mobile broadcasting system supporting Internet Protocol Data Casting (IPDC) includes listing local IPDC operators that provide a broadcast service to a terminal in predetermined IP platform and Electronic Service Guide (ESG), generating roaming information for a local IPDC operator having a roaming partner among the local IPDC operators, and transmitting broadcast service information including the roaming information over a broadcast network.

According to another aspect of the present invention, a method for supporting mobility by a terminal in a mobile broadcasting system supporting Internet Protocol Data Casting (IPDC) includes receiving, over a broadcast network, broadcast service information including information on local IPDC operators that provide a broadcast service to a terminal in predetermined IP platform and Electronic Service Guide (ESG), parsing the broadcast service information to acquire roaming information for a local IPDC operator having a roaming partner among the local IPDC operators, finding a particular local IPDC operator having its subscribed local IPDC operator as the roaming partner from the acquired roaming information, when the terminal cannot receive the broadcast service through the subscribed local IPDC operator, and accessing the broadcast service using an ESG of the particular local IPDC operator when the particular local IPDC operator is found.

According to yet another aspect of the present invention, a server apparatus for supporting mobility of a terminal in a mobile broadcasting system supporting Internet Protocol Data Casting (IPDC) includes a controller for listing local IPDC operators that provide a broadcast service to a terminal in predetermined IP platform and Electronic Service Guide (ESG), and generating roaming information for a local IPDC operator having a roaming partner among the local IPDC operators, and a transmitter for transmitting broadcast service information including the roaming information generated by the controller, over a broadcast network.

According to still yet another aspect of the present invention, a terminal apparatus for supporting mobility in a mobile broadcasting system supporting Internet Protocol Data Casting (IPDC) includes a receiver for receiving, over a broadcast network, broadcast service information including information on local IPDC operators that provide a broadcast service to a terminal in predetermined IP platform and Electronic Service Guide (ESG), and a controller for parsing the broadcast service information to acquire roaming information for a local IPDC operator having a roaming partner among the local IPDC operators, finding a particular local IPDC operator having its subscribed local IPDC operator as the roaming partner from the acquired roaming information when the terminal cannot receive the broadcast service through the subscribed local IPDC operator, and accessing the broadcast service using an ESG of the particular local IPDC operator when the particular local IPDC operator is found.

According to another aspect of the present invention, a method for supporting mobility by a terminal in a mobile broadcasting system supporting Internet Protocol Data Casting (IPDC) includes generating a query message including at least one key value requiring transmission of information on a particular local IPDC operator among local IPDC operators that provide a broadcast service to a terminal in predetermined IP platform and Electronic Service Guide (ESG), transmitting the query message including the at least one key value requiring transmission of information on the particular local IPDC operator, to a server over an interactive channel, and receiving a response message including information on the particular local IPDC operator from the server in response to the query message.

According to yet another aspect of the present invention, a method for supporting mobility to a terminal by a server in a mobile broadcasting system supporting Internet Protocol Data Casting (IPDC) includes receiving over an interactive channel a terminal's query message including at least one key value requiring transmission of information on a particular local IPDC operator among local IPDC operators that provide a broadcast service to a terminal in predetermined IP platform and Electronic Service Guide (ESG), and generating and transmitting a response message including information on the particular local IPDC operator based on at least one key value in response to the query message received from the terminal.

According to still another aspect of the present invention, a terminal apparatus for supporting mobility in a mobile broadcasting system supporting Internet Protocol Data Casting (IPDC) includes a controller for generating a query message including at least one key value requiring transmission of information on a particular local IPDC operator among local IPDC operators that provide a broadcast service to a terminal in predetermined IP platform and Electronic Service Guide (ESG), a transmitter for transmitting the query message including the at least one key value requiring transmission of information on the particular local IPDC operator, to a server over an interactive channel, and a receiver for receiving a response message including information on the particular local IPDC operator from the server in response to the query message.

According to still yet another aspect of the present invention, a server apparatus for supporting mobility to a terminal in a mobile broadcasting system supporting Internet Protocol Data Casting (IPDC) includes a receiver for receiving over an interactive channel a terminal's query message including at least one key value requiring transmission of information on a particular local IPDC operator among local IPDC operators that provide a broadcast service to a terminal in predetermined IP platform and Electronic Service Guide (ESG), a transmitter for transmitting a response message to the query message, and a controller for generating the response message including information on the particular local IPDC operator based on at least one key value in response to the query message received from the terminal.

According to another aspect of the present invention, a method for supporting mobility of a terminal by a server in a mobile broadcasting system supporting Internet Protocol Data Casting (IPDC) includes generating broadcast service information including type information of an Electronic Service Guide (ESG), an access type of which is classified according to provision of a roaming service in association with use of a broadcast service, and transmitting broadcast service information including the type information of the ESG.

According to yet another aspect of the present invention, a method for supporting mobility by a terminal in a mobile broadcasting system supporting Internet Protocol Data Casting (IPDC) includes receiving, from a server, broadcast service information including type information of an Electronic Service Guide (ESG), an access type of which is classified according to provision of a roaming service in association with a broadcast service, and selecting a desired ESG based on the type information of the ESG.

According to still another aspect of the present invention, a server apparatus for supporting mobility of a terminal in a mobile broadcasting system supporting Internet Protocol Data Casting (IPDC) includes a controller for generating broadcast service information including type information of an Electronic Service Guide (ESG), an access type of which is classified according to provision of a roaming service in association with use of a broadcast service, and a transmitter for transmitting broadcast service information including the type information of the ESG.

According to still yet another aspect of the present invention, a terminal apparatus for supporting mobility in a mobile broadcasting system supporting Internet Protocol Data Casting (IPDC) includes a receiver for receiving, from a server, broadcast service information including type information of an Electronic Service Guide (ESG), an access type of which is classified according to provision of a roaming service in association with use of a broadcast service, and a controller for selecting a desired ESG based on the type information of the ESG.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1:
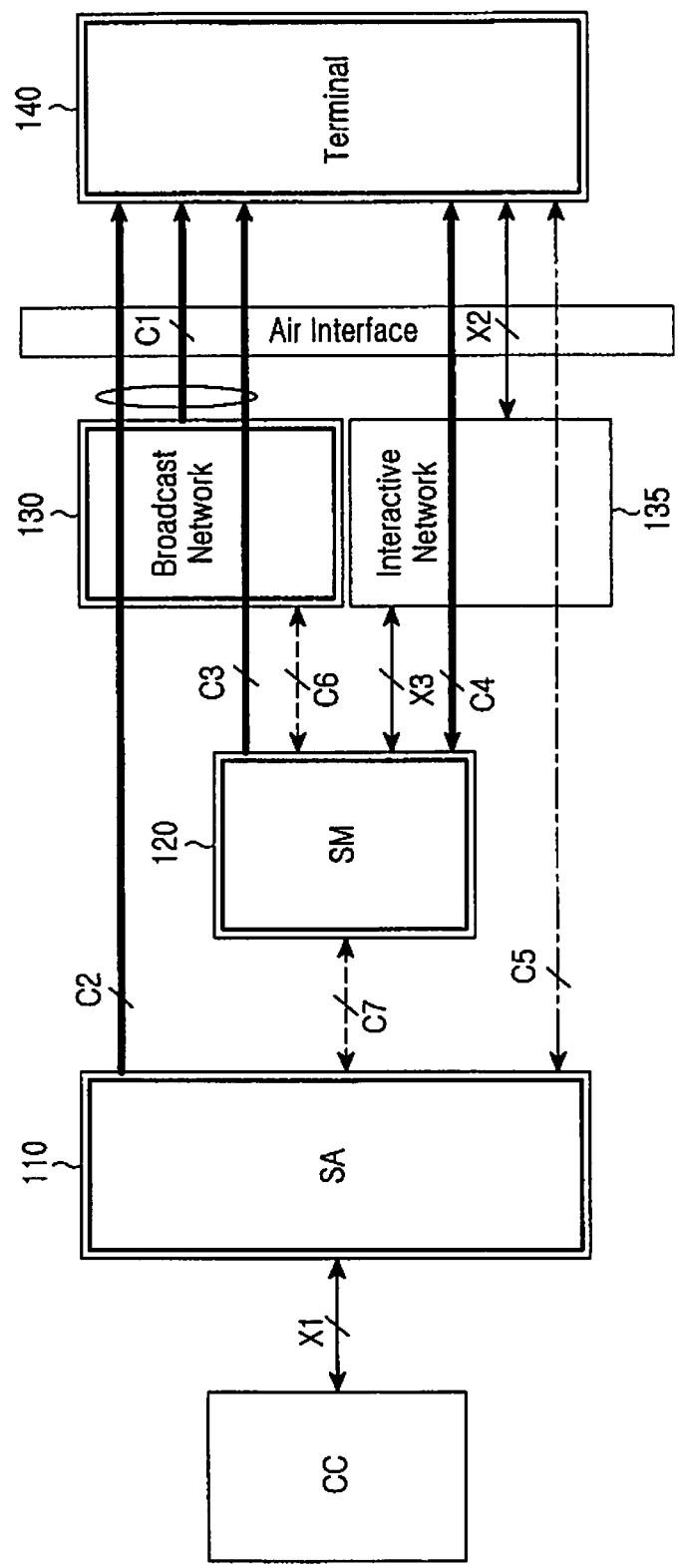
FIG. 1 is a diagram illustrating architecture of a general CBMS system.
Figure 2:
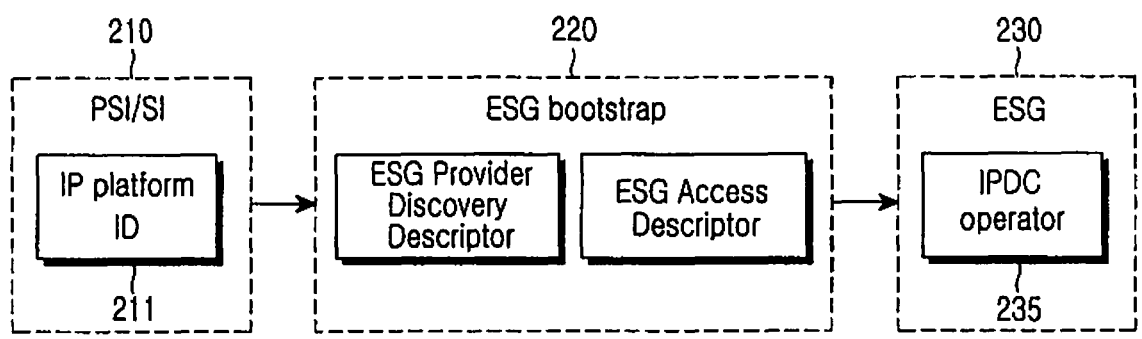
FIG. 2 is a diagram illustrating a structure of a general ESG bootstrap.
Figure 3:
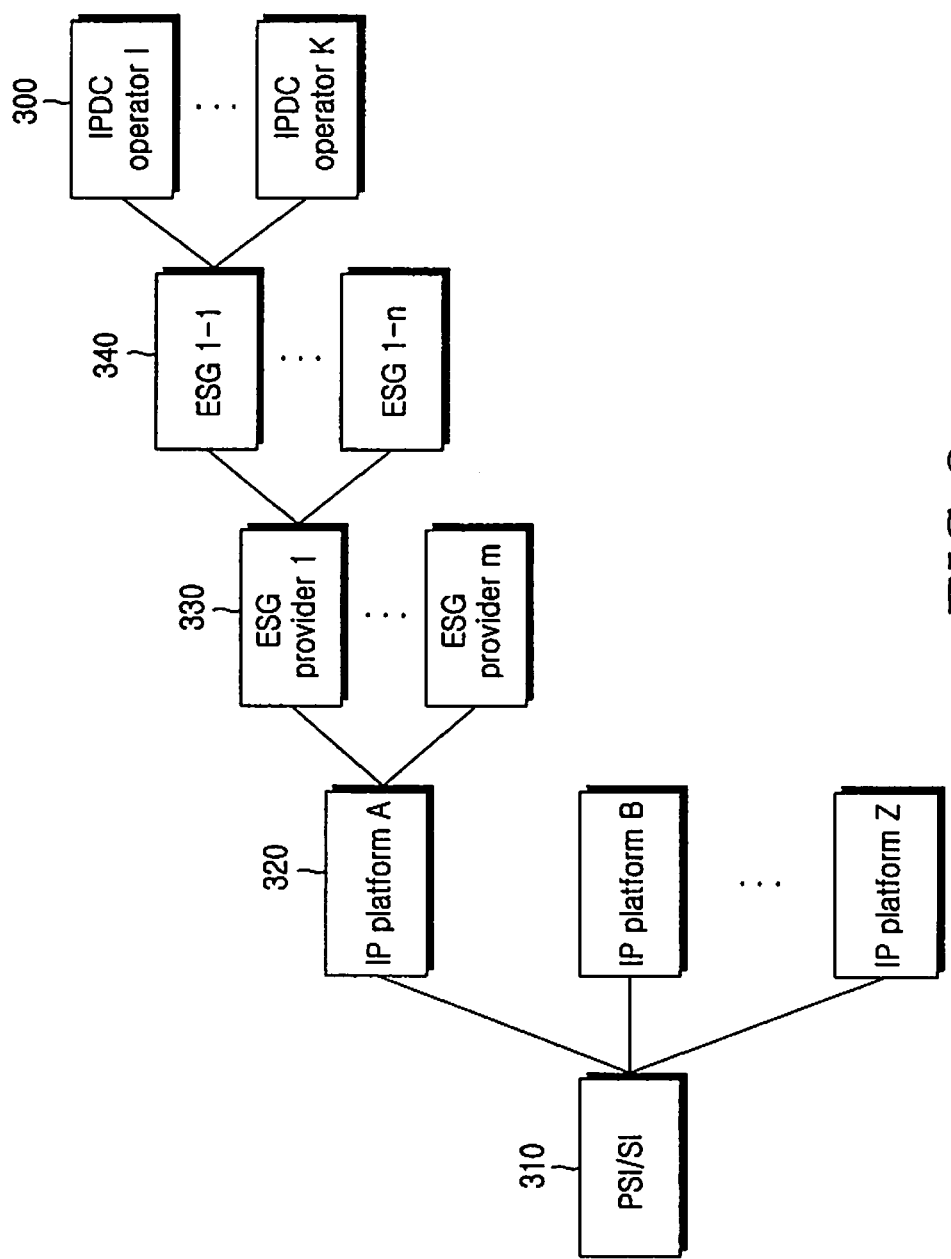
FIG. 3 is a diagram illustrating a general search process for an ESG.
Figure 4:
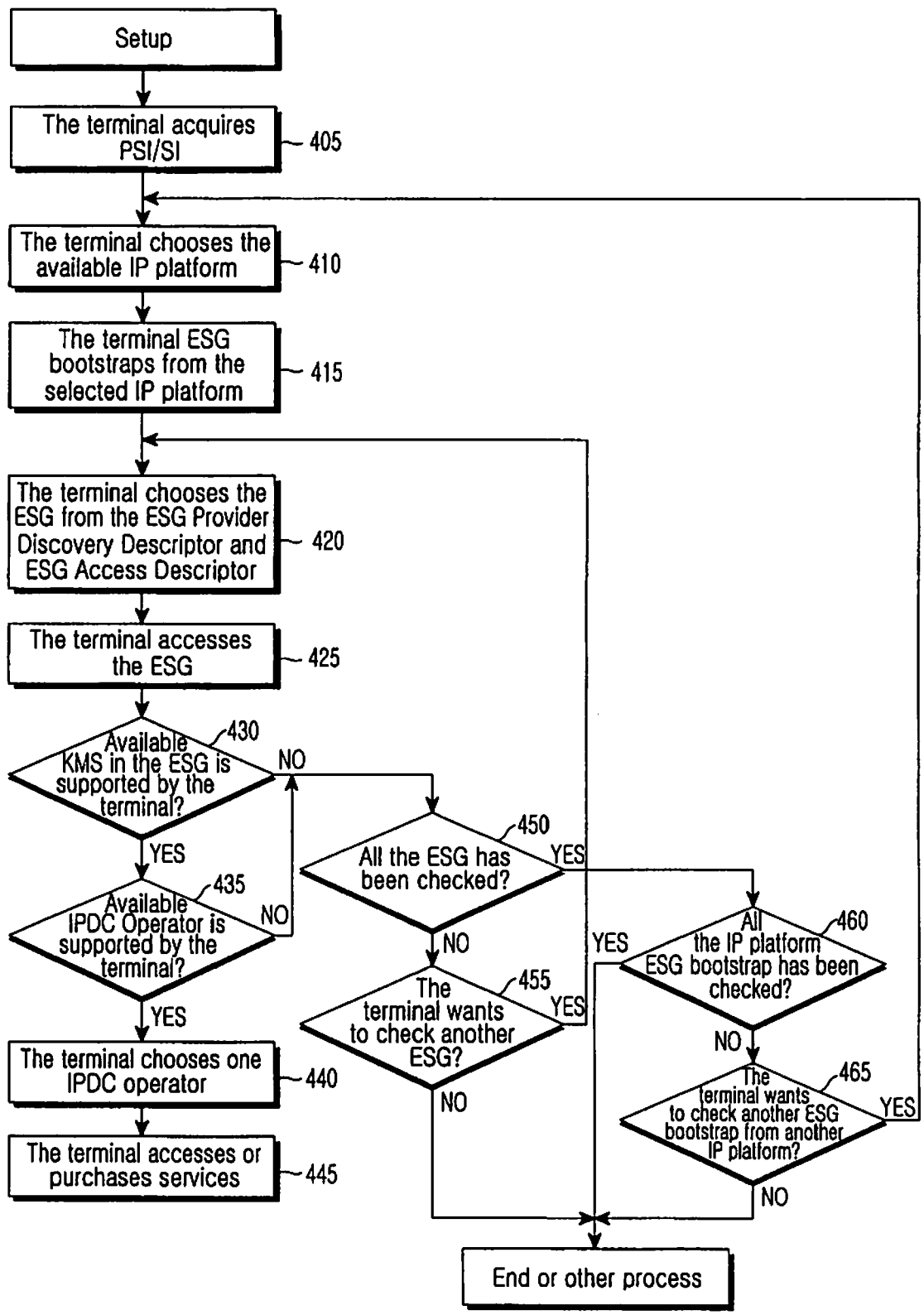
FIG. 4 is a flowchart illustrating a general operation of a terminal for searching an ESG.

Exemplary embodiments of the present invention will now be described in detail with reference to the annexed drawings. In the drawings where possible, the same or similar elements have been denoted by the same reference numerals even though they are depicted in different drawings.

The present invention provides a method and system for allowing a terminal to more rapidly and easily acquire a proper ESG in a digital mobile broadcasting system supporting IP Data Casting (IPDC). Although the following embodiments will be described in connection with a DVB-H based digital mobile broadcasting system by way of example, the present invention may also be applied to various digital mobile broadcasting systems supporting IPDC. The term "broadcast service information" as used herein refers to the Program Specific Information/Service Information (PSI/SI). According to the present invention, the ESG bootstrap and roaming information are included in the PSI/SI, and individual information such as ESG type information may also be construed as being part of the broadcast service information.

Before describing the method and system for ESG discovery method in accordance with the present invention, various scenarios will be described. Based on the relationship between IP platforms and IPDC operators, operating scenarios may be classified into two general categories.

Scenario 1

In this scenario, the broadcast service information (PSI/SI) includes more than one IP platform and more than one IPDC operator in the network, and each IPDC operator exists in only one exact IP platform. In another word, a specific IPDC operator does not exist in more than one IP platform.

Figure 5:
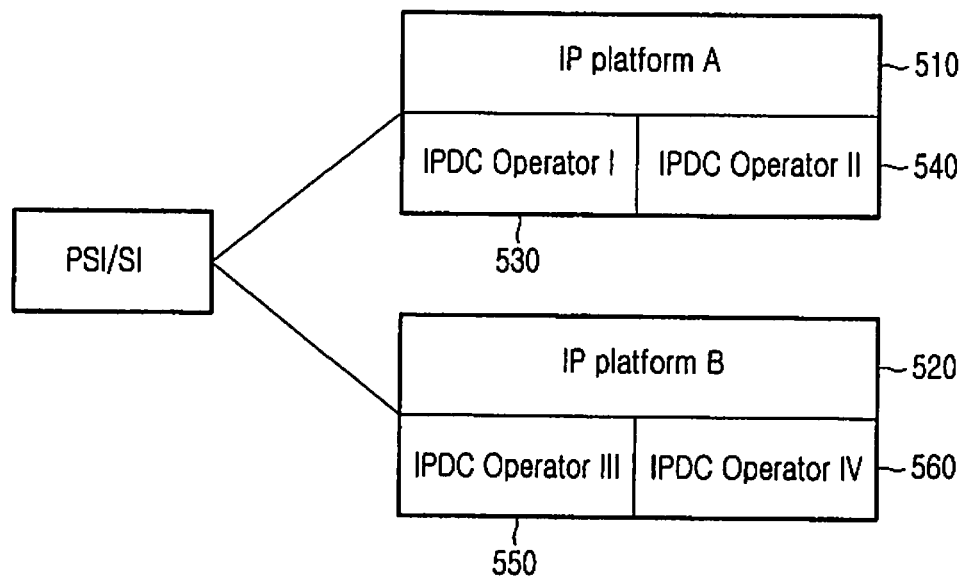
FIG. 5 is a diagram illustrating an example of a first scenario between an IP platform and an IPDC operator.

An example of Scenario 1 between the IP platform and the IPDC operator is shown in FIG. 5. As shown in FIG. 5, there are two IP platforms shown for simplicity of explanation: an IP platform A 510 and an IP platform B 520. There are four IPDC operators shown for simplicity of explanation: an IPDC operator I 530, an IPDC operator II 540, an IPDC operator III 550, and an IPDC operator IV 560. Each IPDC operator is related to only one IP platform: IPDC operator I 530 and IPDC operator II 540 are associated with IP platform A 510, and IPDC operator III 550 and IPDC operator IV 560 are associated with IP platform B 520.

Scenario 2

In this scenario, the broadcast service information (PSI/SI) includes more than one IP platform and more than one IPDC operator in the network, and an IPDC operator may exist in more than one IP platform at the same time. In another word, a specific IPDC operator may exist in multiple IP platforms.

Figure 6:
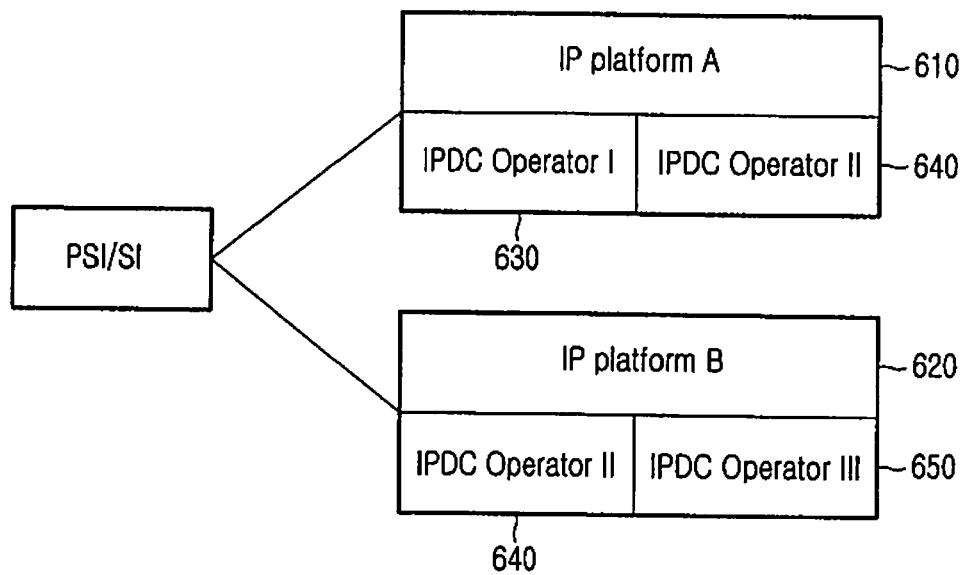
FIG. 6 is a diagram illustrating an example of a second scenario between an IP platform and an IPDC operator.

An example of Scenario 2 between the IP platform and the IPDC operator is shown in FIG. 6. As shown in FIG. 6, there are two IP platforms shown for simplicity of explanation: an IP platform A 610 and an IP platform B 620. There are three IPDC operators shown for simplicity of explanation: an IPDC operator I 630, an IPDC operator II 640, and an IPDC operator III 650. Each IPDC operator may be related to more than one IP platform. For example, IPDC operator II 640 is associated with both IP platform A 610 and IP platform B 620.

Based on the above two scenarios, the present invention provides the following exemplary embodiments for ESG discovery. In the exemplary embodiments of the present invention, IPDC operator information is included in the ESG bootstrap. Additionally, it is assumed that the ESG bootstrap is a unit for each IP platform regardless of the number of IPDC operators existing in the corresponding IP platform.

Figure 7:
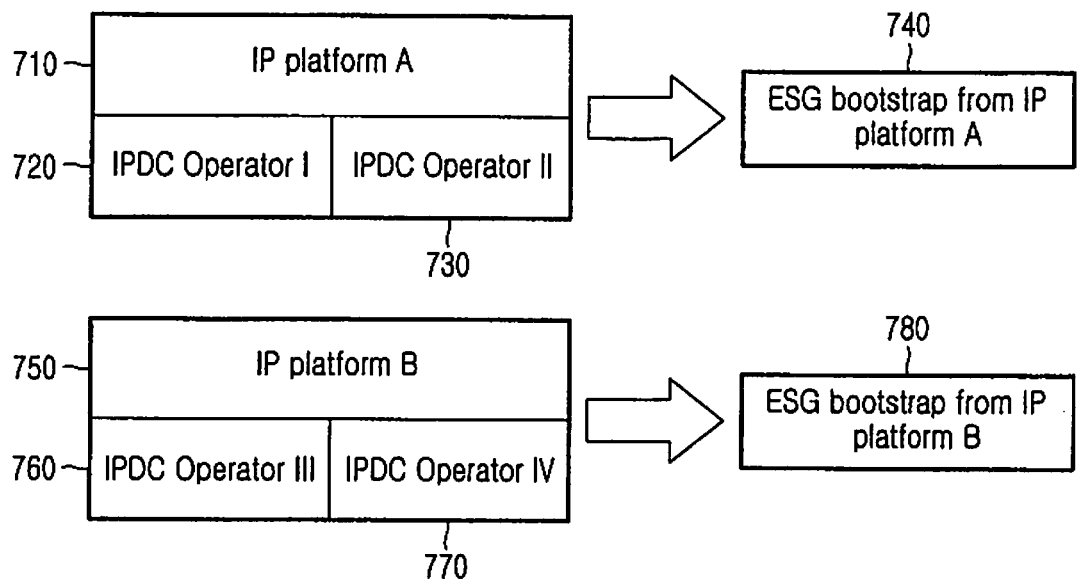
FIG. 7 is a diagram illustrating an exemplary embodiment of parsing an ESG bootstrap in the first scenario in accordance with the present invention.

In general, the terminal only needs to choose the IP platform that contains its IPDC operator for ESG bootstrap. However, how the terminal knows which IP platform is the one needed, i.e., how it can find out the IP platform that contains its IPDC operator, is the challenge. The terminal may get this information by provisioning channels, by some special signaling, or through interactive channels of the digital mobile broadcasting system. However, if the terminal could not know which of the IP platforms 710 and 750 contains its IPDC operator (i.e., one of IPDCs 720, 730, 760 and 770), then the terminal needs to parse each of the ESG bootstrap information 740 and 780 from the respective IP platforms 710 and 750, in the case where the invention is applied to Scenario 1 as shown in FIG. 7.

Figure 8:
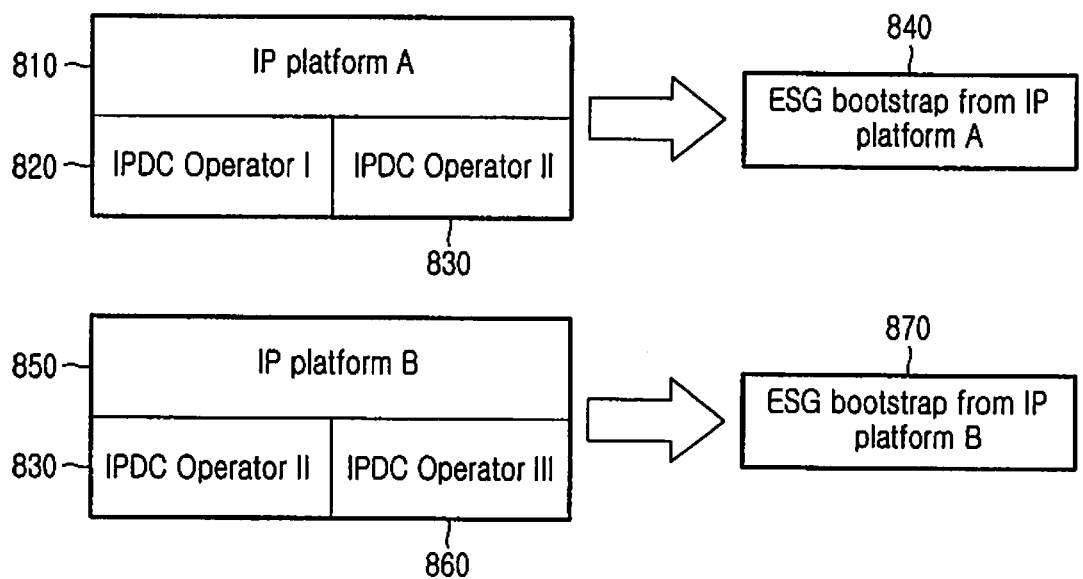
FIG. 8 is a diagram illustrating an exemplary embodiment of parsing an ESG bootstrap in the second scenario in accordance with the present invention.

In Scenario 2, shown in FIG. 8, the terminal may need to parse more than one ESG bootstrap information because each of IPDC operators 820, 830, and 860 may be in more than one of the IP platforms 810 and 850.

If there is no pre-information about which IP platform an IPDC operator is in, the terminal would need to parse through all of the ESG bootstraps from all of the IP platforms. However, if there is pre-information about which IP platform that each IPDC operator is in, the terminal only needs to retrieve the indicated ESG bootstrap information from such IP platforms. Of course, if the same IPDC operator is in more than one IP platform, the terminal may need to retrieve more than one ESG bootstrap information from multiple IP platforms.

In the following exemplary embodiments of the present invention, the IPDC operator information is indicated in the ESG bootstrap.

Embodiment 1

Figure 9:
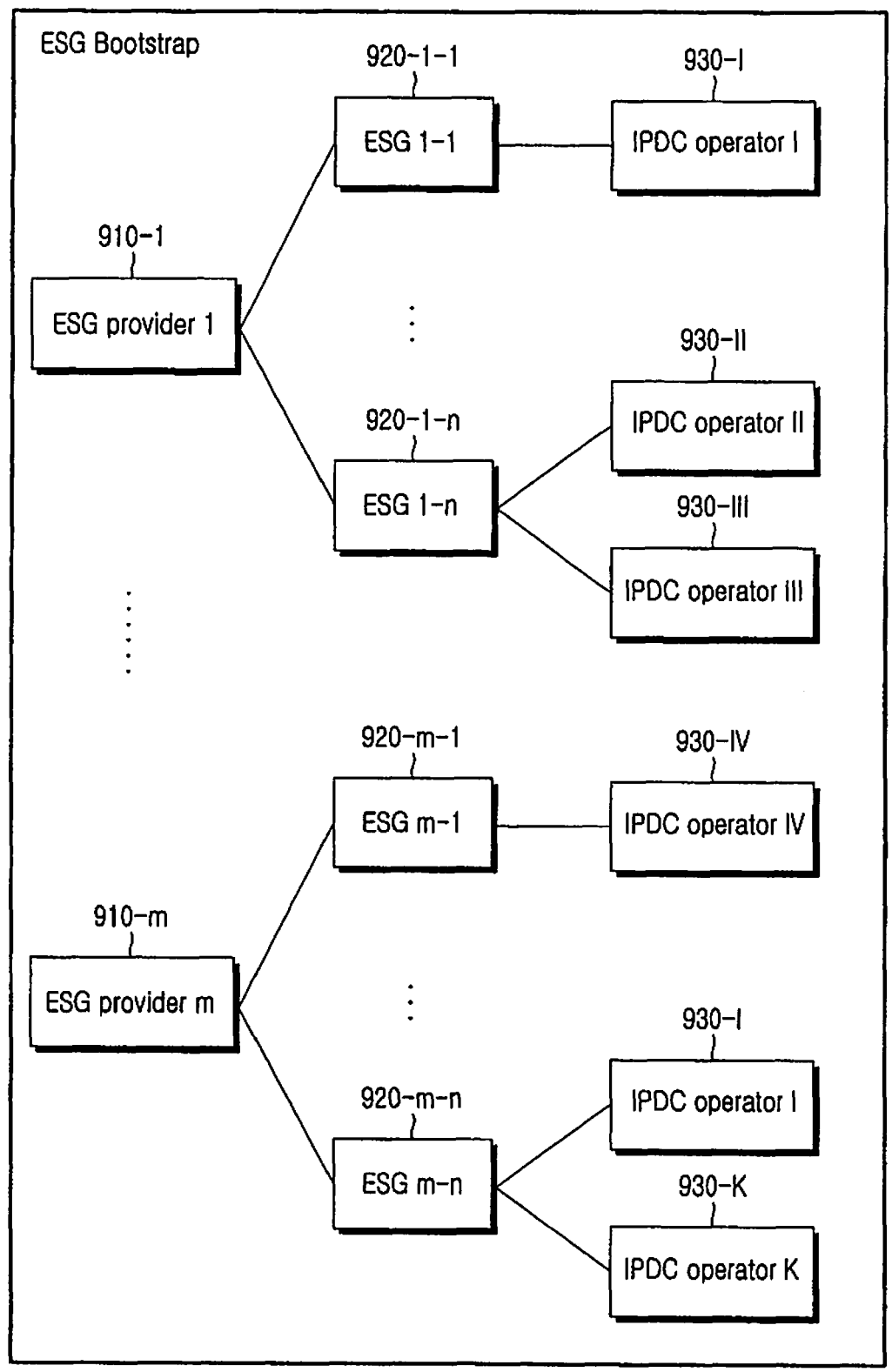
FIG. 9 is a diagram illustrating an exemplary embodiment according to the present invention.

FIG. 9 is a diagram illustrating an exemplary embodiment according to the present invention. As shown in FIG. 9, an ESG bootstrap includes the following descriptors: ESGProviderDiscoveryDescriptor (910-1, ..., 910-*m*) and ESGAccessDescriptor (920-1-1, ..., 920-*m-n*), and additionally indicating which IPDC operator (930-1, ..., 930-K) is related to each ESG provider/ESG. In this way, the terminal only has to retrieve the ESG that is related to the expected IPDC operator.

The location of the IPDC operator information in the bootstrap may be varied without departing from the scope of the present invention. For example, various structures for including IPDC operator information in the ESG bootstrap session may be varied, such as by adding IPDC operator information into ESGProviderDiscoveryDescriptor (as shown in Table 1), by adding IPDC operator information into ESGAccessDescriptor (as shown in Table 6 to Table 11), and by adding a new descriptor providing the IPDC operator information (as shown in Table 12 and FIG. 11). Moreover, while interactive ESG bootstrap may have some differences, various modifications may be made without departing from the scope of the present invention.

Figure 10:
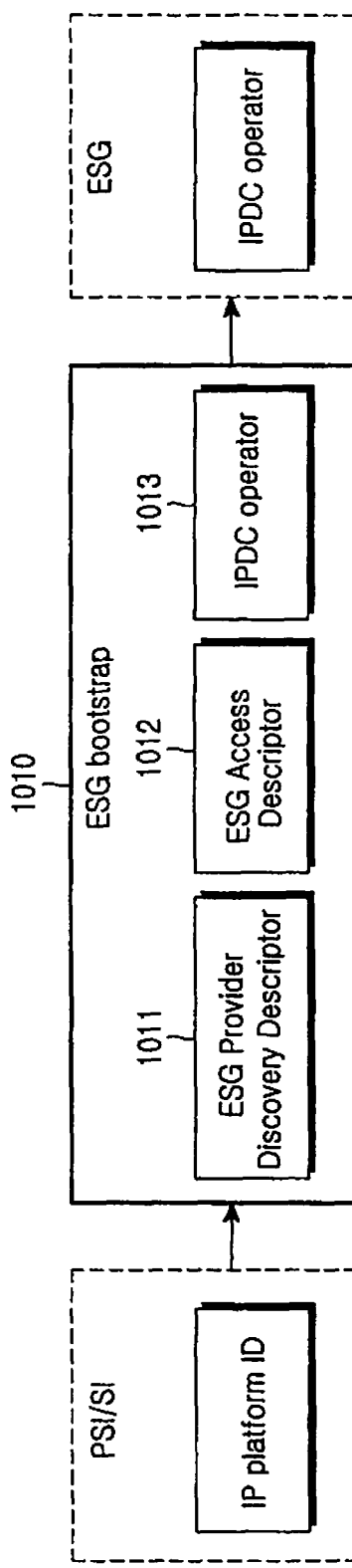
FIG. 10 is a diagram illustrating an exemplary structure of an ESG bootstrap according to the present invention.

FIG. 10 illustrates an exemplary structure of an ESG bootstrap in which IPDC operator information is included in various locations, according to an exemplary embodiment of the present invention. In the exemplary case as shown in FIG. 10, information about an IPDC operator 1013 is written in an ESG bootstrap 1010. An example of ESGProviderDiscoveryDescriptor 1011 included in the ESG bootstrap 1010 is shown in Table 1 below.

TABLE 1

```
<schema targetNamespace="urn:dvb:ipdc:esgbs:2005" xmlns:bs="urn:dvb:ipdc:esgbs:2005"
xmlns:mpeg7="urn:mpeg:mpeg7:schema:2001"     xmlns="http://www.w3.org/2001/XMLSchema"
elementFormDefault="qualified" attributeFormDefault="unqualified">
    <import namespace="urn:mpeg:mpeg7:schema:2001" />
    <complexType name="ESGProviderType">
      <sequence>
        <element name="ProviderURI" type="anyURI"/>
        <element name="ProviderName" type="mpeg7:TextualType"/>
        <element name="ProviderLogo" type="mpeg7:TitleMediaType" minOccurs="0"/>
        <element name="ProviderID" type="positiveInteger"/>
        <element name="ProviderInformationURL" type="anyURI" minOccurs="0"/>
        <element name="PrivateAuxiliaryData" type="anyType" minOccurs="0"/>
        <element name="IPDCKMSId" type="unsignedShort"/>
        <element name="IPDCOperatorId" type="string"/>
      </sequence>
    </complexType>
    <element name="ESGProviderDiscovery">
    <complexType>
      <sequence>
        <element name="ServiceProvider" type="bs:ESGProviderType" maxOccurs="unbounded"/>
      </sequence>
    </complexType>
    </element>
</schema>
```

Since the IPDCType may be defined, Table 2 is shown below as an example.

TABLE 2

```
<schema    targetNamespace="urn:dvb:ipdc:esgbs:2005"    xmlns:bs="urn:dvb:ipdc:esgbs:2005"
xmlns:mpeg7="urn:mpeg:mpeg7:schema:2001"       xmlns="http://www.w3.org/2001/XMLSchema"
elementFormDefault="qualified" attributeFormDefault="unqualified">
    <import namespace="urn:mpeg:mpeg7:schema:2001" />
    <complexType name="ESGProviderType">
        <sequence>
            <element name="ProviderURI" type="anyURI"/>
            <element name="ProviderName" type="mpeg7:TextualType"/>
            <element name="ProviderLogo" type="mpeg7:TitleMediaType" minOccurs="0"/>
            <element name="ProviderID" type="positiveInteger"/>
            <element name="ProviderInformationURL" type="anyURI" minOccurs="0"/>
            <element name="PrivateAuxiliaryData" type="anyType" minOccurs="0"/>
            <element name="IPDC" type="esg:IPDCType"/> maxOccurs="unbounded"/>
        </sequence>
    </complexType>
    <element name="ESGProviderDiscovery">
    <complexType>
        <sequence>
            <element name="ServiceProvider" type="bs:ESGProviderType" maxOccurs="unbounded"/>
        </sequence>
    </complexType>
    </element>
</schema>
```

Furthermore, the IPDCType may be expressed as shown in Table 3.

TABLE 3

```
<complexType name="IPDCType">
    <sequence>
        <element name="IPDCKMSId" type="unsignedShort"/>
        <element name="IPDCOperatorId" type="string"/>
    </sequence>
</complexType>
```

More specifically, it may be rewritten as shown in Table 4.

TABLE 4

```
<complexType name="IPDCType">
    <sequence>
        <element name="IPPlatformID" type=" positive Integer "/>
        <element name="IPDCKMSId" type="unsignedShort"/>
        <element name="IPDCOperatorId" type="string"/>
        <element name="ProviderURI" type="anyURI"/>
        <element name="ProviderID" type="positive Integer"/>
        <element name="ESGURI" type="anyURI"/>
    </sequence>
</complexType>
```

If the IPDCOperatorId cannot be indicated, even IPDCK-MSId may be used to help the terminal filter the ESG. In this case, an example of the IPDCType is shown in Table 5.

TABLE 5

```
<complexType name="IPDCType">
    <sequence>
        <attribute name="IPDCKMSId" type="unsignedShort"
            use=required"/>
        <attribute name="IPDCOperatorId" type="string" use="optional"/>
    </sequence>
</complexType>
```

While various examples of adding elements in accordance with the present invention that provides IPDC operator information to the syntax of an ESGAccessDescriptor 1012 included in the ESG bootstrap 1010 are possible, three non-limiting examples are provided below for purposes of explanation.

1) First exemplary syntax of ESGAccessDescriptor 1012

TABLE 6

```
Syntax
ESG Access Descriptor{
    IPDCKMSId
    IPDCOperatorId
    n_o_ESGEntries
    for(i=0; i<n_o_ESGEntries; i++){
    ESGEntry[i]( )
    }
}
```

Alternatively, it may be defined as shown in Table 7.

TABLE 7

```
Syntax
ESG Access Descriptor{
    IPDC
    n_o_ESGEntries
    for(i=0; i<n_o_ESGEntries; i++){
        ESGEntry[i]( )
    }
}
```

2) Second exemplary syntax of ESGAccessDescriptor 1012

TABLE 8

```
Syntax
ESG Access Descriptor{
    n_o_ESGEntries
    for(i=0; i<n_o_ESGEntries; i++){
    ESGEntry[i]( )
        IPDCKMSId
        IPDCOperatorId
    }
}
```

Alternatively, it may be defined as shown in Table 9.

TABLE 9

Syntax

ESG Access Descriptor{
   n_o_ESGEntries
   for(i=0; i<n_o_ESGEntries; i++){
     ESGEntry[i]( )
     IPDC
   }
}

3) Third exemplary syntax of ESGAccessDescriptor 1012

TABLE 10

Syntax
ESGEntry
  ESGEntryVersion
  ESGEntryLength
  MultipleStreamTransport
  IPVersion6
  Reserved
  ProviderID
  if(IPVersion6){
  SourceIPAddress
  DestinationIPAddress
  }else{
  SourceIPAddress
  DestinationIPAddress
  }
   Port
   TSI
   IPDCKMSId
   IPDCOperatorId
  }

Alternatively, it may be defined as shown in Table 11.

TABLE 11

Syntax
ESGEntry{
  ESGEntryVersion
  ESGEntryLength
  MultipleStreamTransport
IPVersion6
  Reserved
  ProviderID
  if(IPVersion6){
SourceIPAddress
DestinationIPAddress
  }else{
SourceIPAddress
DestinationIPAddress
  }
  Port
  TSI
  IPDC
}

In yet another exemplary embodiment, a new descriptor 1013 may be added that includes IPDC operator information in the ESG bootstrap session as shown in FIG. 10. This new descriptor carries the information about the IPDC operator of each ESG provider and/or ESG

TABLE 12

<element name="IPDCOperator">
  <complexType>
    <sequence>
      <element name="IPDC" type="esg:IPDCType"
      maxOccurs="unbounded"/>
    </sequence>
  </complexType>
</element>

Figure 11:
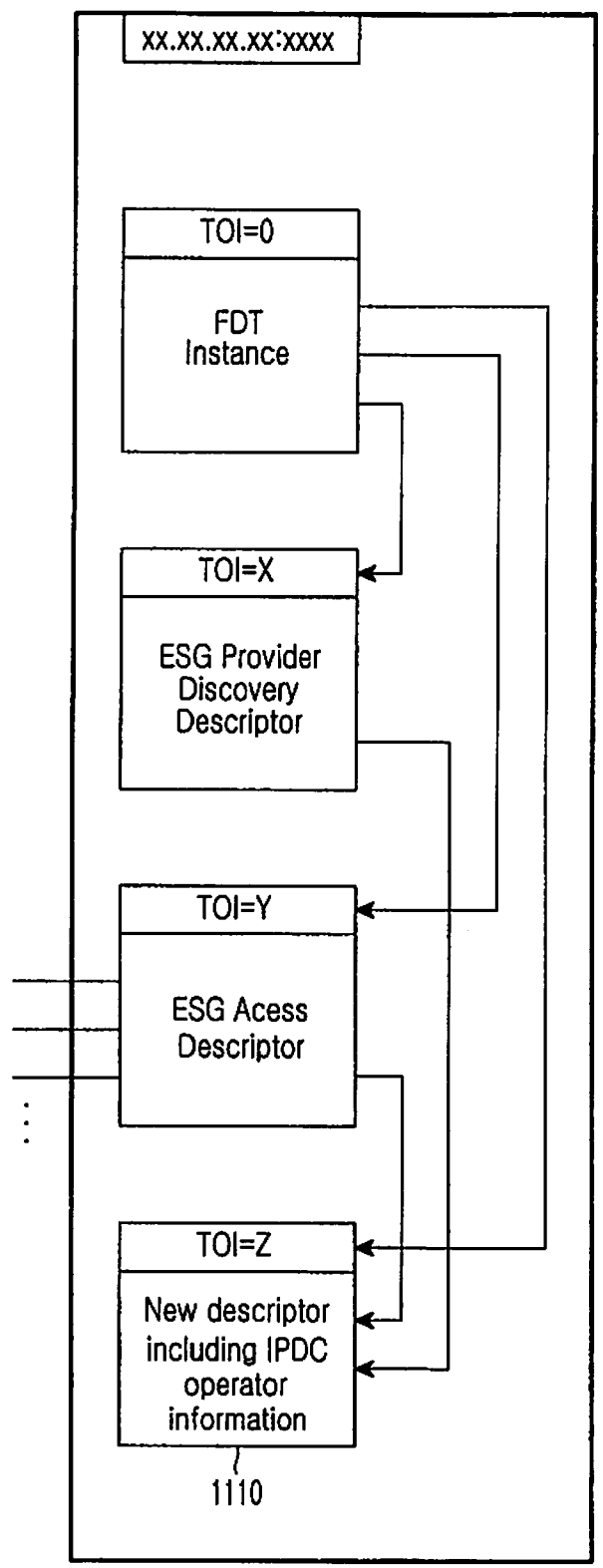
FIG. 11 is a diagram illustrating an exemplary structure of an ESG bootstrap session according to the present invention.

FIG. 11 illustrates an exemplary embodiment of where a new descriptor 1110 including IPDC operator information is included in the ESG bootstrap session. The new descriptor 1110 carries information about the IPDC operator of each ESG provider and/or ESG The expression of "xx.xx.xx.xx: xxxx" in FIG. 11 means "IP Address:port number".

With respect to FIG. 12, a description will now be made of an operation of a terminal in an exemplary embodiment of the present invention.

Figure 12:
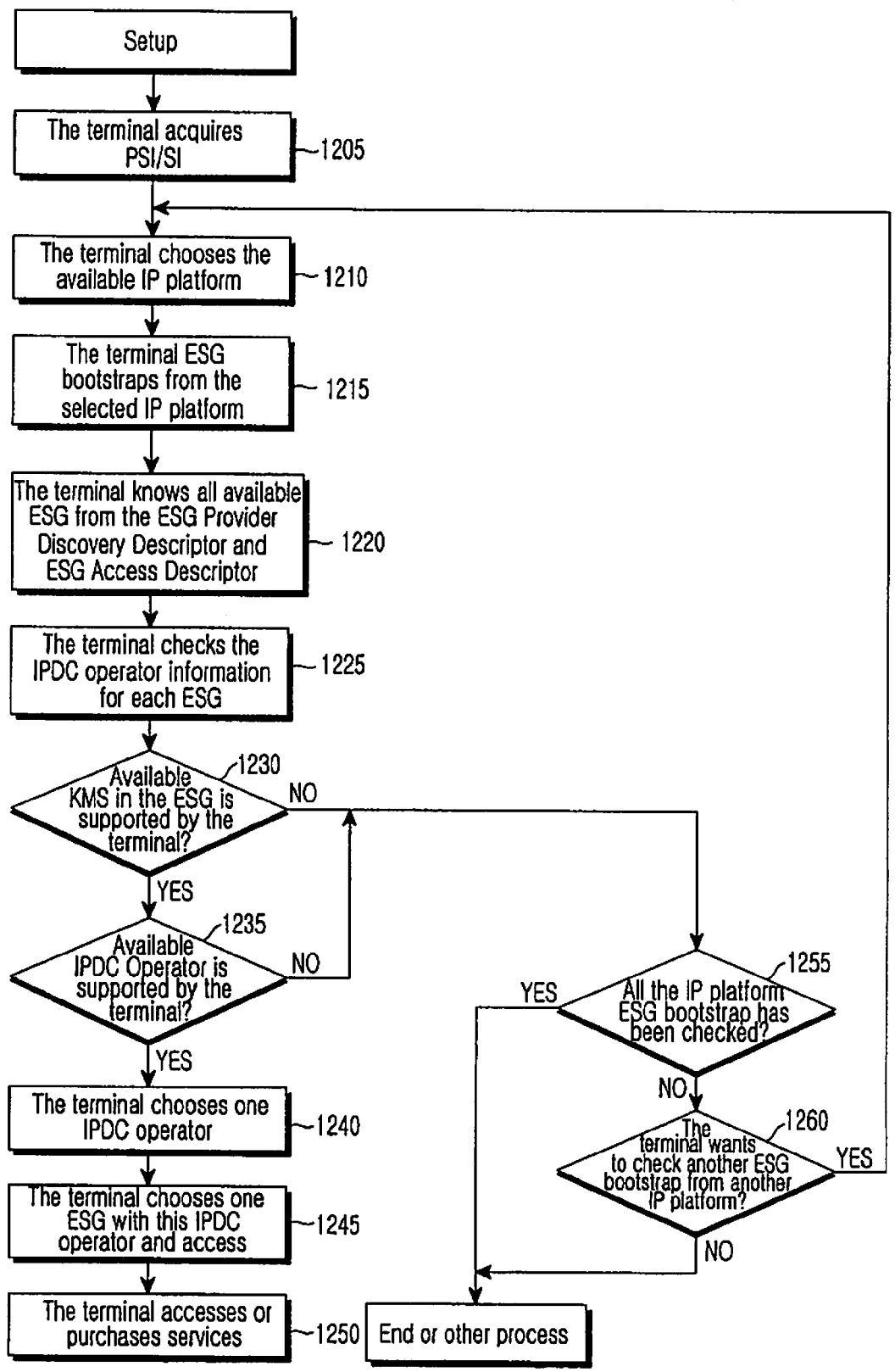
FIG. 12 is a flowchart illustrating an operation of a terminal according to an exemplary embodiment of the present invention.

As shown in FIG. 12, the terminal acquires broadcast service information (PSI/SI) in step 1205 and chooses an available IP platform in step 1210. The terminal ESG-bootstraps from the selected IP platform in step 1215 and recognizes all available ESGs from ESGProviderDiscoveryDescriptor and ESGAccessDescriptor in step 1220. The terminal checks an IPDC operator for each ESG in step 1225 and determines in step 1230 whether it supports an available KMS in the ESG. If it is determined in step 1230 that it supports the available KMS, the terminal determines in step 1235 whether it supports an available IPDC operator.

If it is determined in step 1235 that the terminal supports the available IPDC operator, the terminal chooses one IPDC operator in step 1240. The terminal chooses and accesses one ESG having the selected IPDC operator in step 1245, and then accesses or purchases services in step 1250.

However, if it is determined in step 1230 that the terminal does not support the available KMS, the terminal determines in step 1255 whether all of the IP platform's ESG bootstrap has been checked. If it is determined in step 1255 that all of the IP platform's ESG bootstrap has been checked, the terminal ends the operation. If the check has not been completed, the terminal determines in step 1260 whether it wants to check another ESG bootstrap from another IP platform. If it is determined in step 1260 that the terminal needs the check, the terminal proceeds to step 1210. If not, the terminal ends the operation.

Embodiment 2

In another exemplary embodiment, IPDC operator information is indicated in the bootstrap level, and ESG bootstrap information is classified by different IPDC operators. As described above, the terminal selects an ESG provider and selects one ESG having the ESG provider by parsing the ESGProviderDiscoveryDescriptor and ESGAccessDescriptor. Then the terminal checks the IPDC operator inside the ESG after retrieving one ESG.

Figure 13:
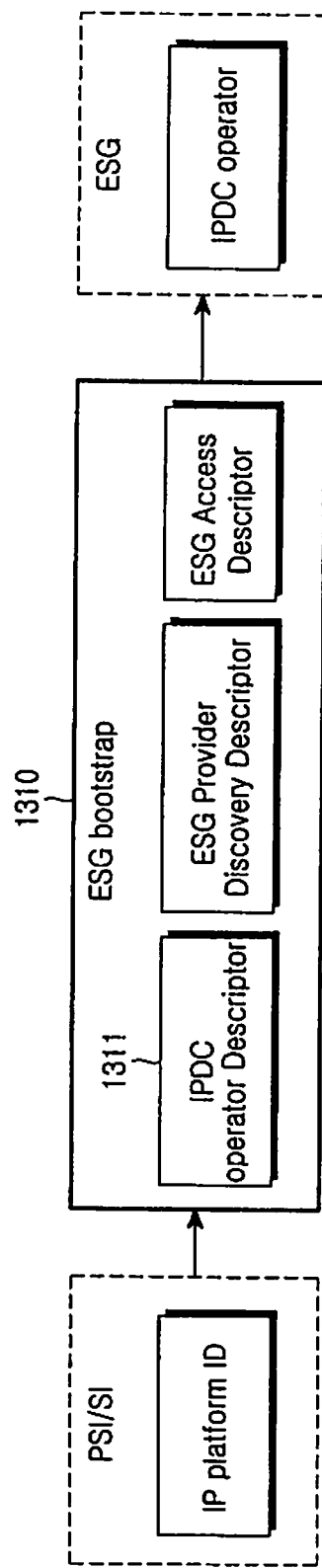
FIG. 13 is a diagram illustrating an exemplary structure of an ESG bootstrap according to the present invention.
Figure 14:
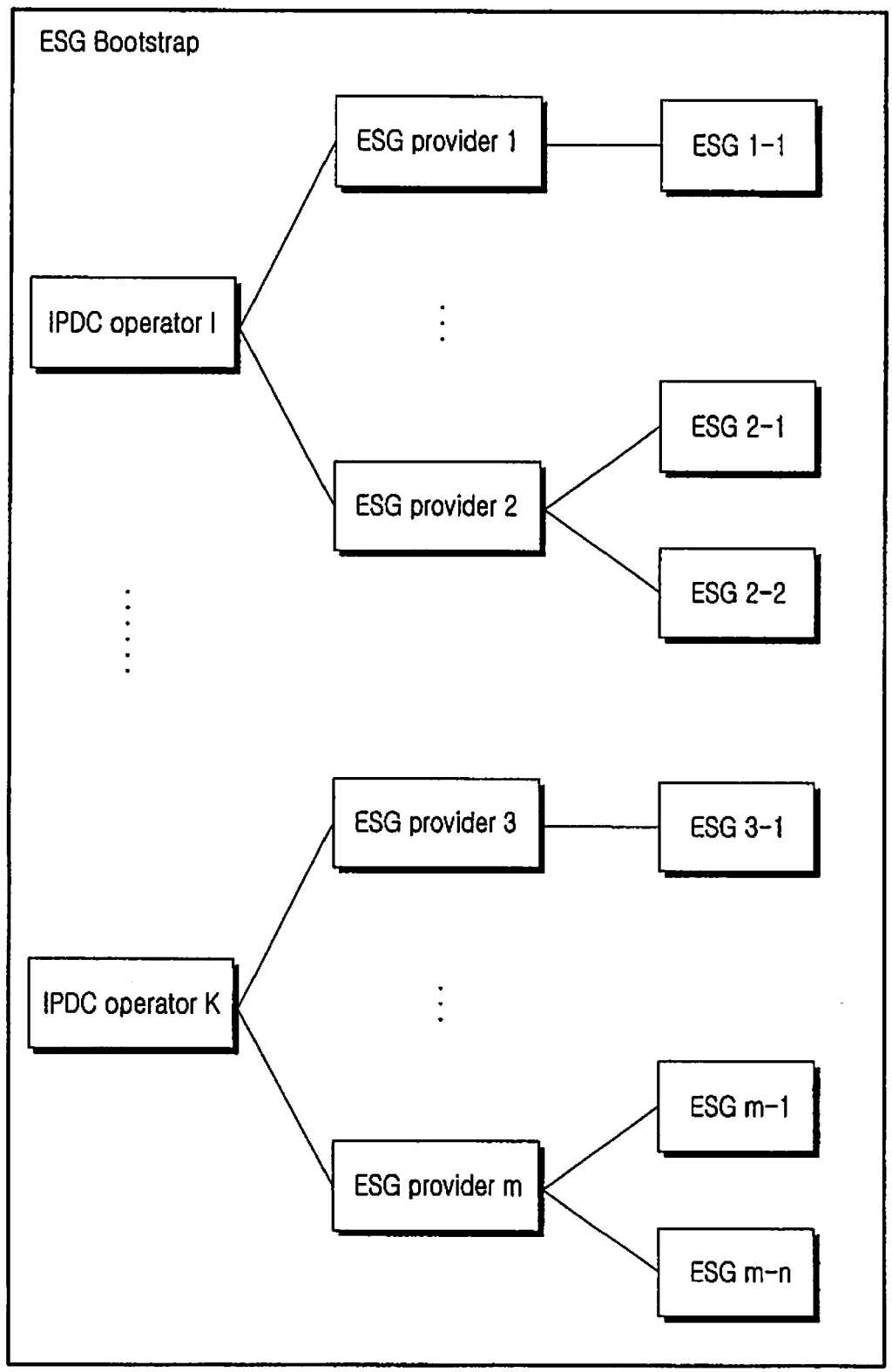
FIG. 14 is a diagram illustrating relationships between elements according to an exemplary embodiment of the present invention.
Figure 15:
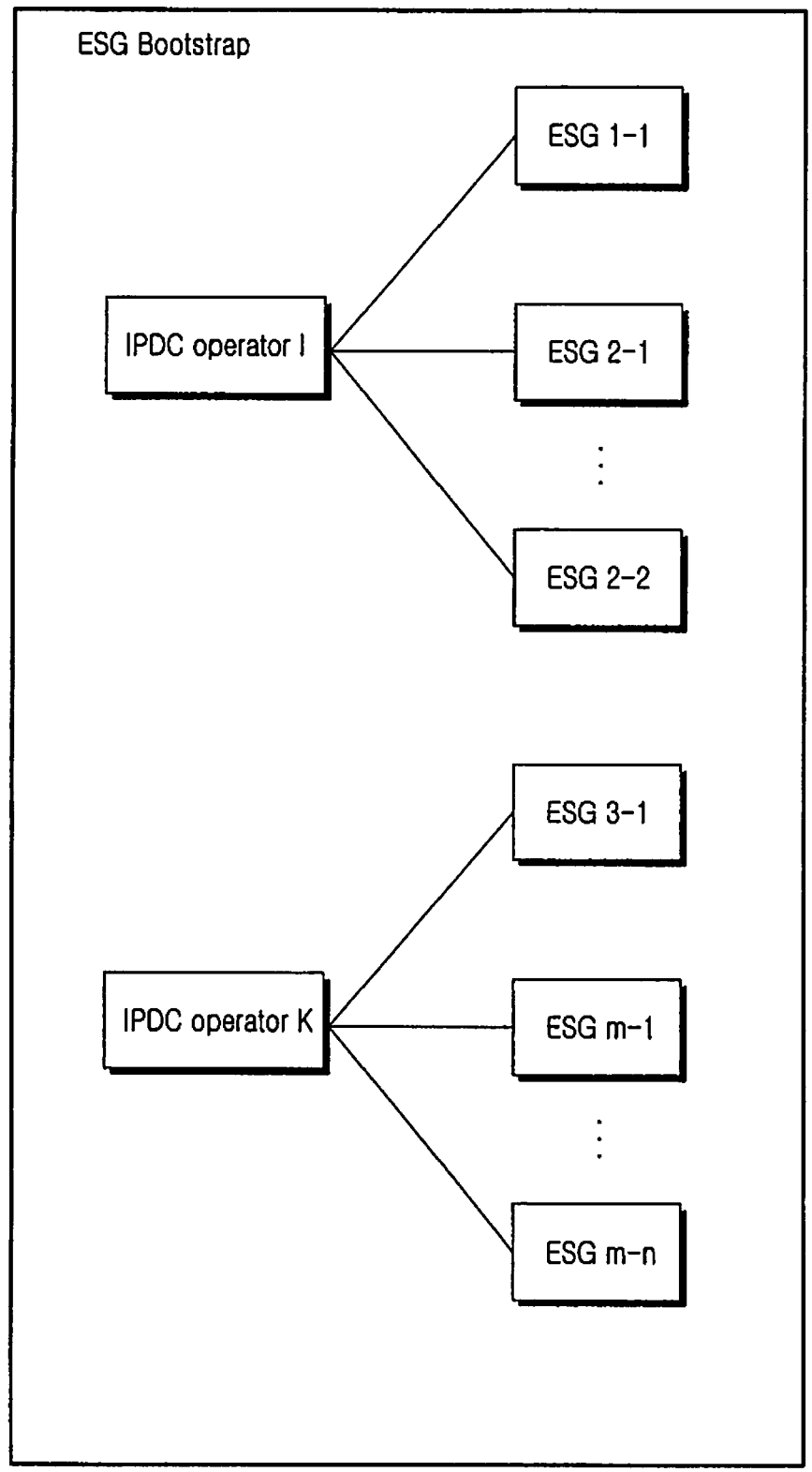
FIG. 15 is a diagram illustrating relationships between an IPDC operator and ESGs according to an exemplary embodiment of the present invention.

In the present exemplary embodiment, a new descriptor 1311 associated with an IPDC operator is added in an ESG bootstrap 1310, and the ESG provider and/or ESG information is classified based on each IPDC operator. FIG. 13 illustrates an example of the structure in accordance with an exemplary embodiment of the present invention. FIG. 14 illustrates an exemplary structure showing the entities included in the descriptor of the ESG bootstrap and their relationship. As shown in FIG. 14, the present exemplary embodiment in accordance with the present invention first checks the IPDCOperator information and then checks ESG-ProviderDiscoveryDescriptor and ESGAccessDescriptor, whereas the previous exemplary embodiment first checks ESGProviderDiscoveryDescriptor and ESGAccessDescriptor. In the present exemplary embodiment, the ESG may be uniquely identified. Thus, the relationship between IPDC operator and ESG may be directly indicated as shown in FIG. 15.

An example of the syntax of the new descriptor 1311 added to the ESG bootstrap 1310 may be as follows.

TABLE 13

```
<complexType name="IPDCOperatorDescriptor">
    <sequence>
        <element name="IPPlatformID" type="positiveInteger"/>
        <element name="IPDCKMSId" type="unsignedShort"/>
        <element name="IPDCOperatorId" type="string"/>
        <element name="ProviderURI" type="anyURI"/>
        <element name="ProviderID" type="positiveInteger"/>
        <element name="ESGURI" type="anyURI"/>
    </sequence>
</complexType>
```

Since each IPDC operator may be related to more than one ESG, it may be defined as shown in Table 14.

TABLE 14

```
<element name="IPDCOperatorDiscovery">
    <complexType>
        <sequence>
            <element name="IPDCOperator" type="IPDCOperatorType"
            maxOccurs="unbounded"/>
        </sequence>
    </complexType>
</element>
```

An example of the IPDCOperatorType is shown in Table 15.

TABLE 15

```
<complexType name="IPDCOperatorType">
    <sequence>
        <element name="IPDC"type="IPDCType"/>
        <element name="ProviderURI" type="anyURI"minOccurs="0"
        maxOccurs="unbounded" />
        <element name="ESGURI"
        type="anyURI"minOccurs="0"maxOccurs="unbounded" />
    </sequence>
</complexType>
<complexType name="IPDCType">
    <sequence>
        <element name="IPDCKMSId" type="unsignedShort"/>
        <element name="IPDCOperatorId" type="string"/ >
    </sequence>
</complexType>
```

More specifically, it may be defined as shown in Table 16.

TABLE 16

```
<complexType name="IPDCOperatorType">
    <sequence>
        <element name="IPDC"type="IPDCType"/>
        <element name"IPPlatformID" type="positiveInteger"
        maxOccurs="unbounded"/>
        <element name="ProviderURI"
        type="anyURI"maxOccurs="unbounded"/>
        <element name="ProviderID" type="positive Integer"
        maxOccurs="unbounded"/>
```

TABLE 16-continued

```
        <element name="ESGURI"
        type="anyURI"maxOccurs="unbounded" />
    </sequence>
</complexType>
<complexType name="IPDCType">
    <sequence>
        <element name="IPDCKMSId" type="unsignedShort"/>
        <element name="IPDCOperatorId" type="string"/>
    </sequence>
</complexType>
```

With respect to FIG. 16, a description will be made of an operation of a terminal according to an exemplary embodiment of the present invention.

Figure 16:
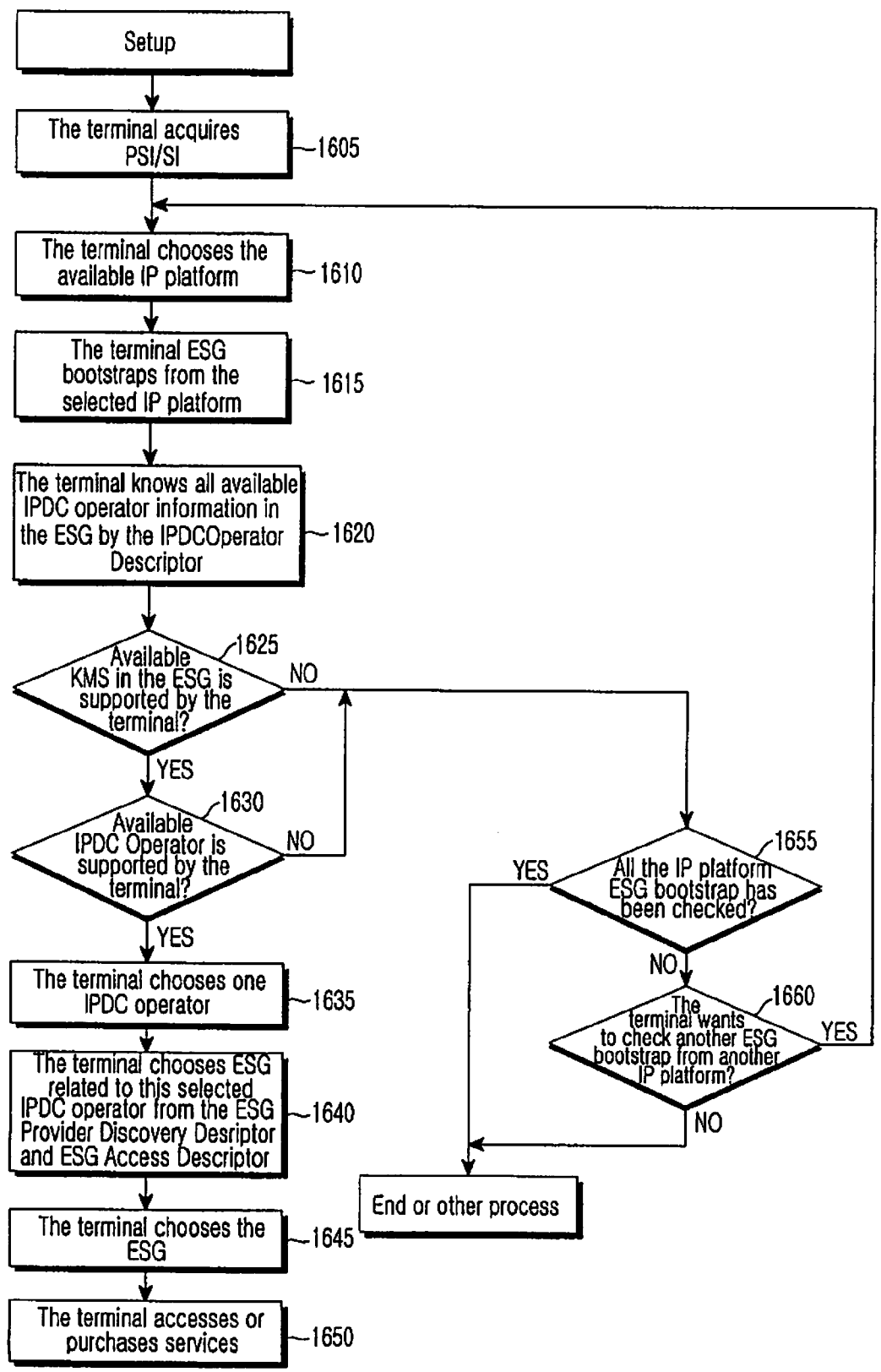
FIG. 16 is a flowchart illustrating an operation of a terminal according to an exemplary embodiment of the present invention.

As shown in FIG. 16, the terminal acquires broadcast service information (PSI/SI) in step 1605 and chooses an available IP platform in step 1610. The terminal ESG-bootstraps from the selected IP platform in step 1615. In step 1620, the terminal recognizes all available IPDC operator information in the ESG by the IPDCOperatorDescriptor.

In step 1625, the terminal determines whether it supports an available KMS in the ESG. If it is determined in step 1625 that the terminal supports the available KMS, the terminal determines in step 1630 whether it supports an available IPDC operator.

If it is determined in step 1630 that the terminal supports the available EPDC operator, the terminal chooses one of available IPDC operators in step 1635. The terminal chooses an ESG related to the selected IPDC operator from the ESG-ProviderDiscoveryDescriptor and the ESGAccessDescriptor in step 1640, accesses the ESG in step 1645, and accesses or purchases services in step 1650.

However, if it is determined in step 1625 that the terminal does not support the available KMS, the terminal determines in step 1655 whether all of the IP platform's ESG bootstrap has been checked. If it is determined in step 1655 that the check has been completed, the terminal ends the operation. If the check has not been completed, the terminal determines in step 1660 whether it wants to check another ESG bootstrap from another IP platform. If it is determined in step 1660 that the terminal wants the check, the terminal proceeds to step 1610. If not, the terminal ends the operation.

In the following exemplary embodiments, IPDC operator information may be indicated in the broadcast service information (PSI/SI). In the previous exemplary embodiments, the terminal obtains the IPDC operator information from the added IPDC operator information in the ESG bootstrap. However, because the IPDC operator information is indicated in the ESG bootstrap level, the terminal does not know which ESG bootstrap includes its IPDC operator information without the need of potentially retrieving every ESG bootstrap information until it finds the expected IPDC operator information. Accordingly, in the following exemplary embodiments, the IPDC operator information is indicated in the broadcast service information (PSI/SI) level.

Embodiment 3

In an exemplary embodiment, the ESG bootstrap is a unit for each IP platform, regardless of the number of IPDC operators existing in the corresponding IP platform. When there is more than one IPDC operator within one IP platform, the ESG bootstrap is separated for each of the IPDC operator in the IP platform.

To describe which IPDC operator that the ESG bootstrap is for, a new IPDC operator descriptor is added in an IP/MAC Notification Table (INT) of the broadcast service information (PSI/SI) as shown in the following example.

TABLE 17

```
IP/MAC_notification_section{
Platform_id
target_descriptor_loop()
    target_ip_slash_descriptor()      // => Fixed IP
    address for the ESG bootstrap
        IPDCOperator_descriptor() // => list all IPDC operator
        in this IP platform
operational_descriptor_loop()
}
```

An exemplary syntax of the new IPDC operator descriptor may be as follows.

TABLE 18

```
Syntax
IPDCOperator descriptor{
    IPDCKMSId
    IPDCOperatorId
    Reserved for other identifier
}
```

Figure 17:
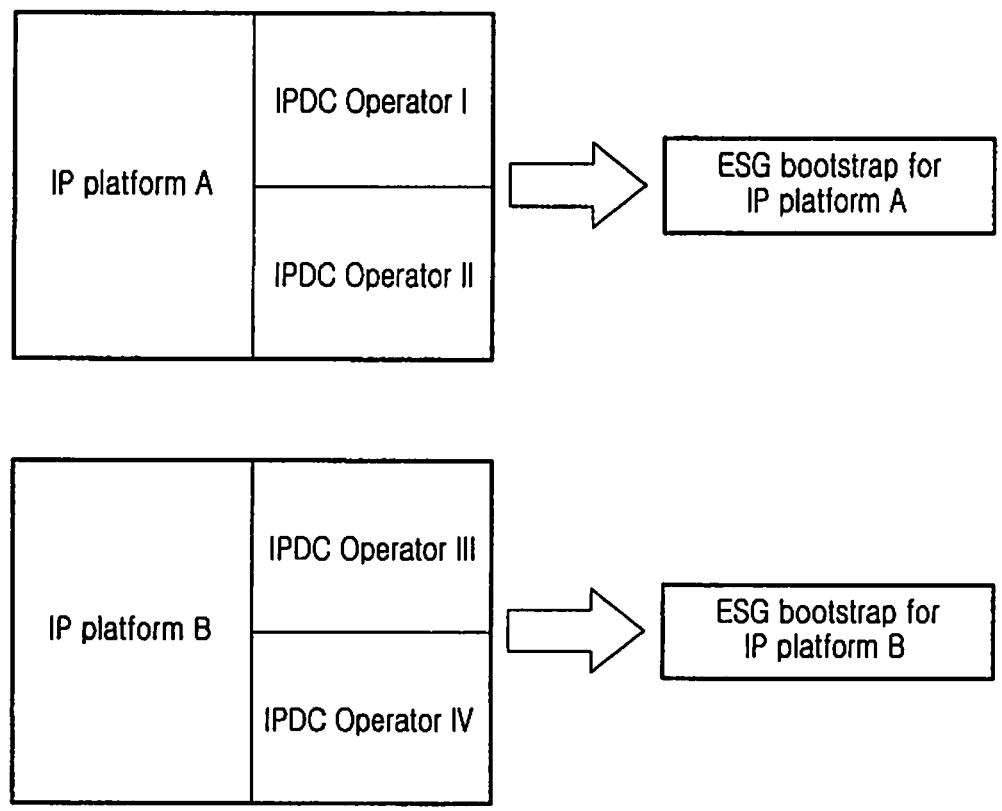
FIG. 17 is a diagram of an exemplary embodiment for the first scenario according to the present invention.

FIG. 17 is a diagram illustrating another exemplary embodiment in accordance with the present invention for Scenario 1 shown in FIG. 5. When the terminal already knows which IP platform includes its IPDC operator for an ESG bootstrap, the terminal can choose the ESG bootstrap for its IPDC operator in this IP platform. Further, even if the terminal does not know which IP platform includes its IPDC operator, the terminal can search for the IPDC operator information in each IP platform until it is found.

Figure 18:
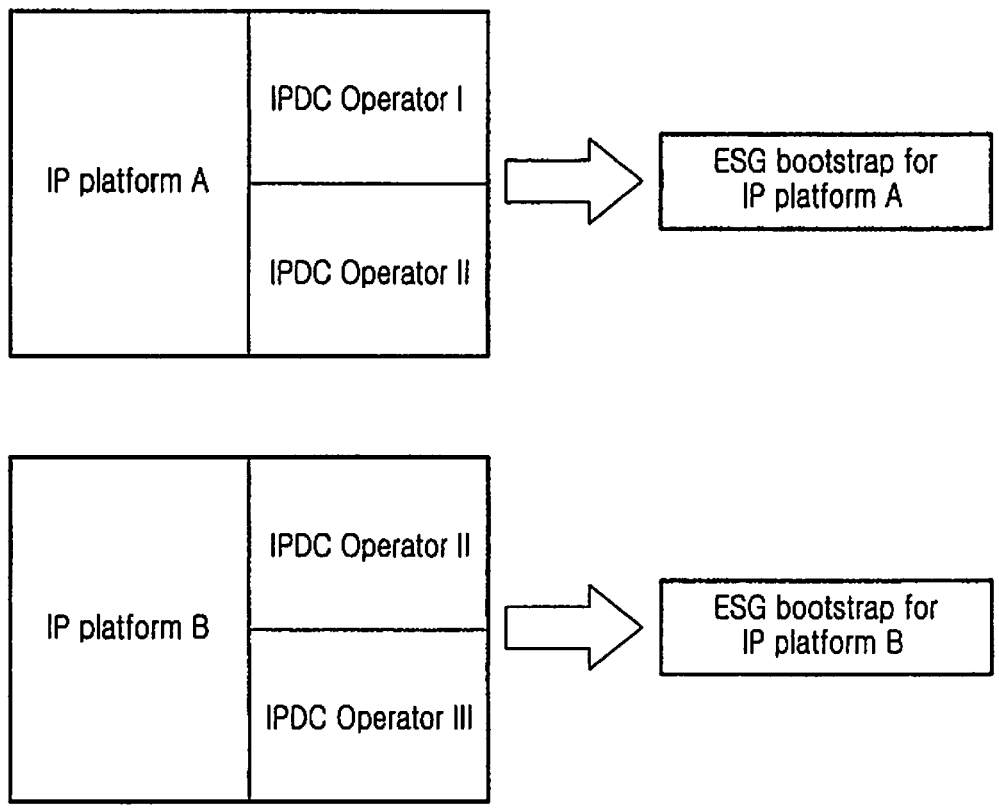
FIG. 18 is a diagram of an exemplary embodiment for the second scenario according to the present invention.

FIG. 18 is a diagram illustrating another exemplary embodiment in accordance with the present invention for Scenario 2 shown in FIG. 6. The terminal may need to retrieve more than one ESG bootstrap information when the same IPDC operator exists in more than one IP platform. Thus, there is more than one ESG bootstrap for this IPDC operator in different IP platforms.

With respect to FIGS. 19A and 19B, a description will now be made of an operation of a terminal according to an exemplary embodiment of the present invention.

Figure 19A:
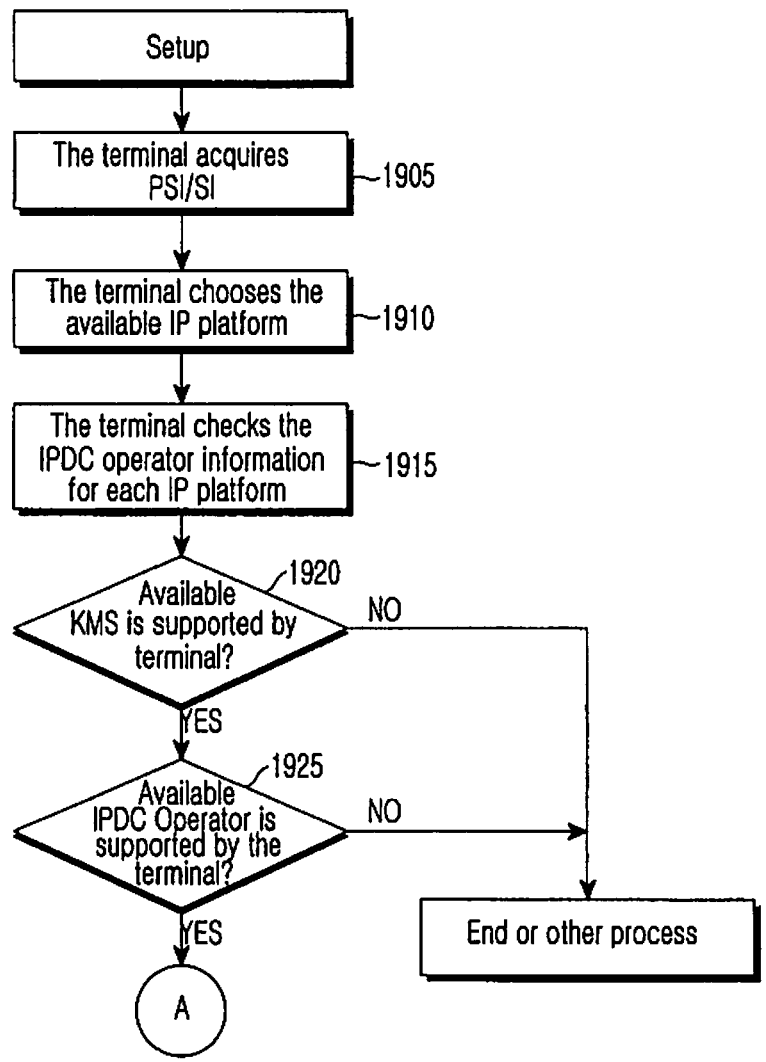
FIGS. 19A and 19B are flowcharts illustrating an operation of a terminal according to an exemplary embodiment of the present invention.
Figure 19B:
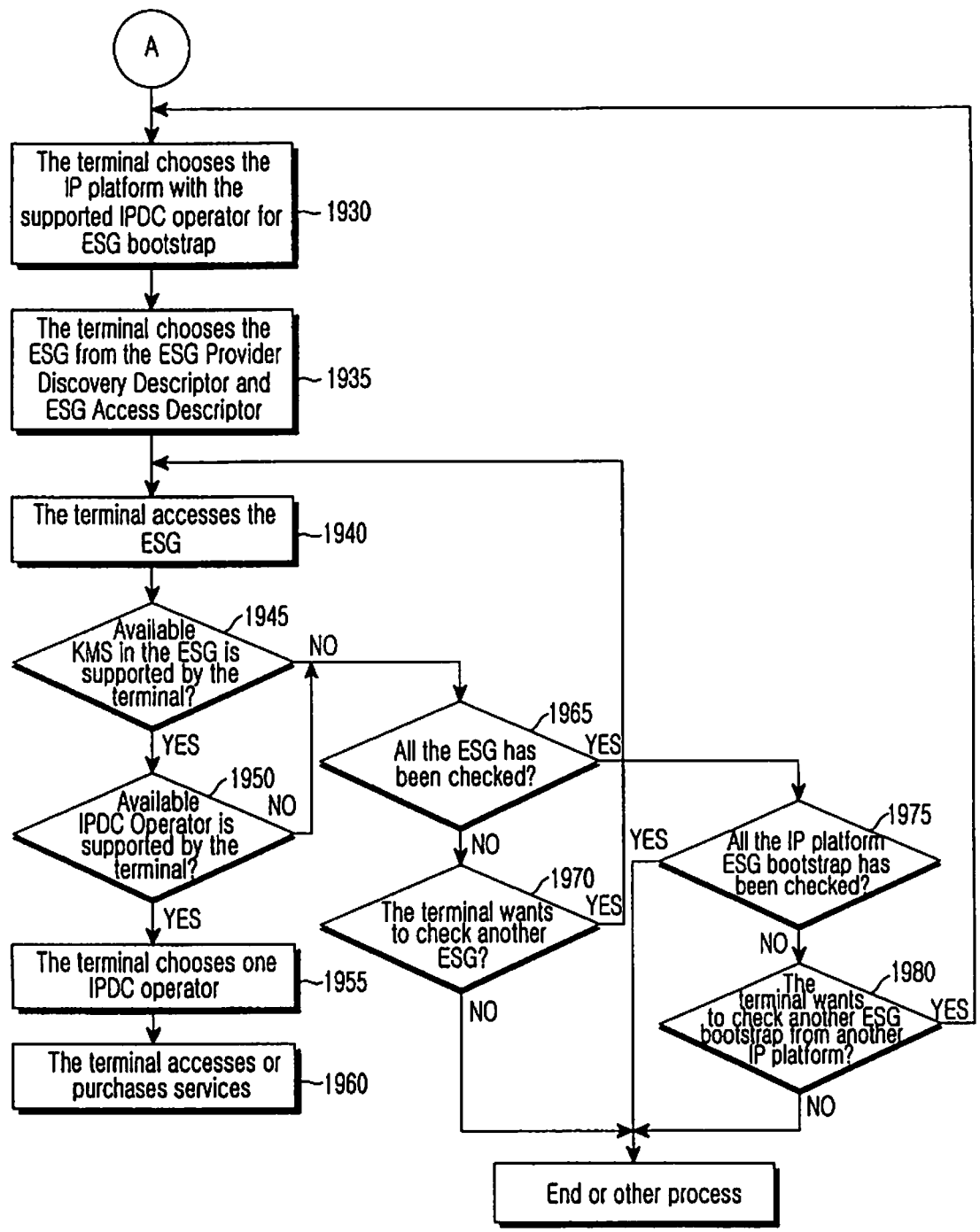

As shown in FIGS. 19A and 19B, the terminal acquires broadcast service information (PSI/SI) in step 1905 and chooses/parses an available IP platform in step 1910. In step 1915, the terminal checks IPDC operator information for each IP platform.

In step 1920, the terminal determines whether it supports an available KMS in the ESG. If it is determined in step 1920 that the terminal supports the available KMS, the terminal determines in step 1925 whether it supports an available IPDC operator. If it is determined in step 1925 that the terminal supports the available IPDC operator, the terminal chooses an IP platform having the supported IPDC operator for the ESG bootstrap in step 1930.

The terminal chooses an ESG from the ESGProviderDiscoveryDescriptor and the ESGAccessDescriptor of the ESG bootstrap in step 1935 and accesses the selected ESG in step 1940. In step 1945, the terminal determines whether it supports an available KMS in the ESG. If it is determined in step 1945 that the terminal supports the available KMS, the terminal determines in step 1950 whether it supports the available IPDC operator. If it is determined in step 1950 that the terminal supports the available IPDC operator, the terminal chooses one IPDC operator in step 1955 and then accesses or purchases services in step 1960.

However, if it is determined in step 1945 that the terminal does not support the available KMS, the terminal determines in step 1965 whether all the ESG has been checked. If it is determined in step 1965 that all the ESG has not been checked, the terminal determines in step 1970 whether it wants to check another ESG. If it is determined in step 1970 that it wants to check another ESG, the terminal proceeds to step 1975. Otherwise, the terminal ends the operation.

Meanwhile, if it is determined in step 1965 that all the ESG has been checked, the terminal determines in step 1975 whether all the IP platform's ESG bootstrap has been checked. If it is determined in step 1975 that all of the IP platform's ESG bootstrap has been checked, the terminal ends the operation. Otherwise, the terminal proceeds to step 1980.

In step 1980, the terminal determines whether it wants to check another ESG bootstrap from another IP platform. If it is determined in step 1980 that it wants to check another ESG bootstrap, the terminal proceeds to step 1930. Otherwise, the terminal ends the operation.

The present exemplary embodiment may be combinable with the previous exemplary embodiments. In other words, the IPDC operator information may be indicated in both the broadcast service information (PSI/SI) level and the ESG bootstrap level. Accordingly, from the IPDC operator information in the PSI/SI level, the terminal knows which IP platform includes its IPDC operator and could select this one for ESG bootstrap. In the ESG bootstrap level, the added IPDC operator information helps the terminal choose the ESG with its IPDC operator. However, because there may be more than one IPDC operator in one ESG bootstrap, the terminal needs to distinguish the IPDC operator for each ESG Embodiment 4

In another exemplary embodiment, it is assumed that ESG bootstrap is a unit for each IPDC operator in each IP platform. If there is more than one IPDC operator within one IP platform, the ESG bootstrap is separated for each of the IPDC operator in this IP platform. To describe which IPDC operator that the ESG bootstrap is for, a new IPDC operator descriptor is added in an INT of PSI/SI as shown in the following example.

TABLE 19

```
IP/MAC_notification_section{
Platform_id
target_descriptor_loop()
    target_ip_slash_descriptor() // => Fixed IP
    address for the ESG bootstrap
        IPDCOperator_descriptor()    //    for this IPDC
        operator in this IP platform
operational_descriptor_loop()
}
```

An exemplary syntax of the added descriptor may be as follows.

TABLE 20

Syntax
IPDCOperator descriptor{
   IPDCKMSId
   IPDCOperatorId
   Reserved for other identifier
}

Figure 20:
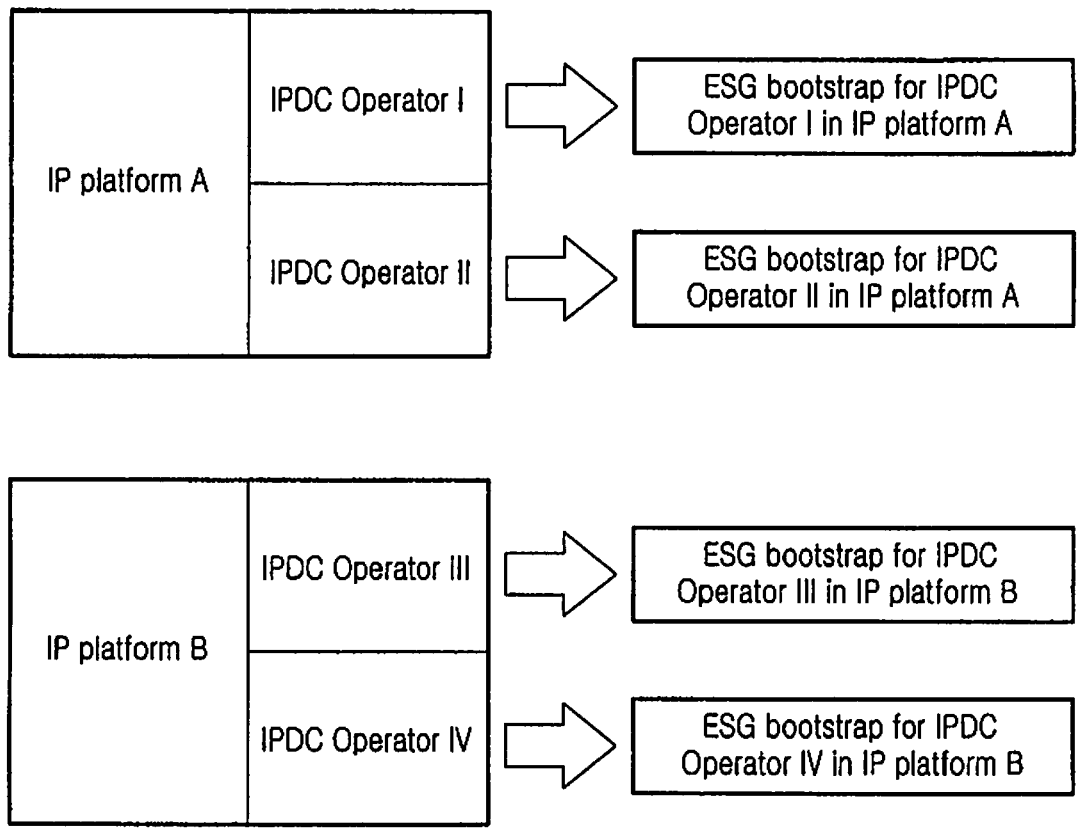
FIG. 20 is a diagram of an exemplary embodiment for the first scenario according to the present invention.

FIG. 20 is a diagram illustrating another exemplary embodiment of the present invention as applied to Scenario 1 described above, in which if the terminal already knows which IP platform includes its IPDC operator for ESG bootstrap, the terminal can choose the ESG bootstrap for its IPDC operator in this IP platform. Further, even though the terminal does not know which IP platform includes its IPDC operator, it may search for the IPDC operator information in each IP platform until it is found.

Figure 21:
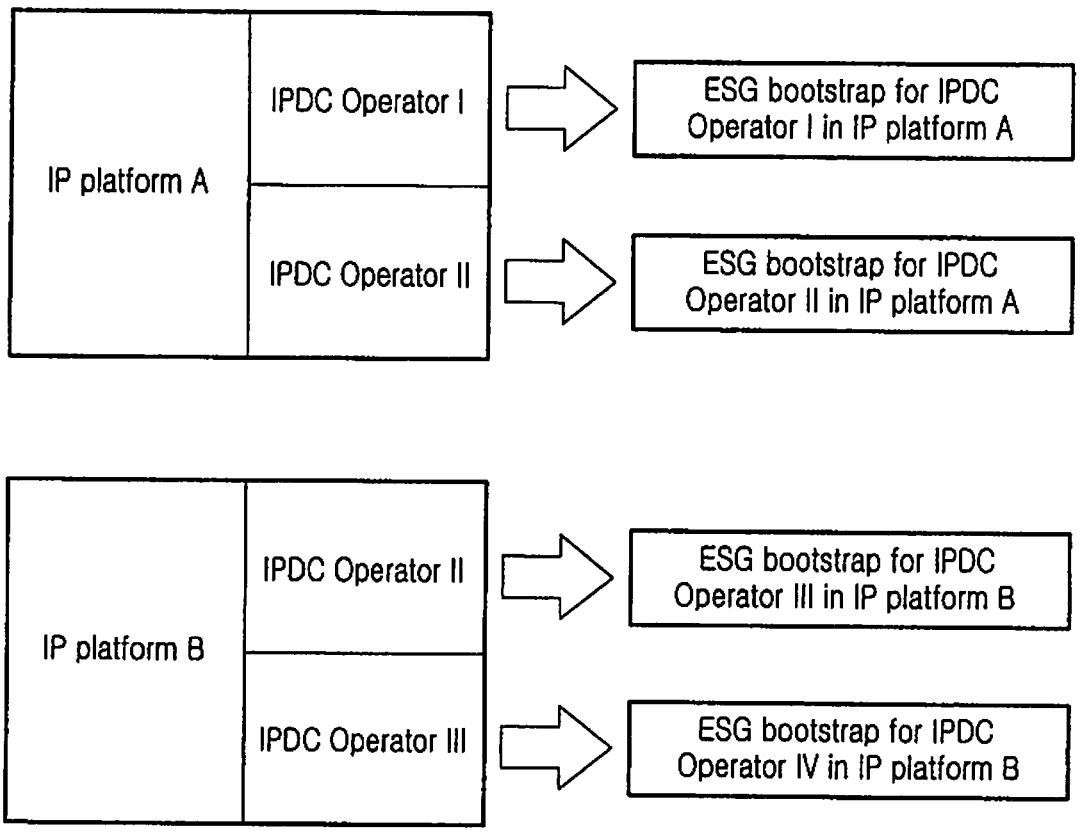
FIG. 21 is a diagram of an exemplary embodiment for the second scenario according to the present invention.

FIG. 21 is a diagram illustrating yet another exemplary embodiment of the present invention as applied to Scenario 2 described above, in which the terminal may need to retrieve more than one ESG bootstrap information if the same IPDC operator exists in more than one IP platform. Therefore, there is more than one ESG bootstrap for this IPDC operator in different IP platforms.

With respect to FIG. 22, a description will now be made of an operation of a terminal according to an exemplary embodiment of the present invention.

Figure 22:
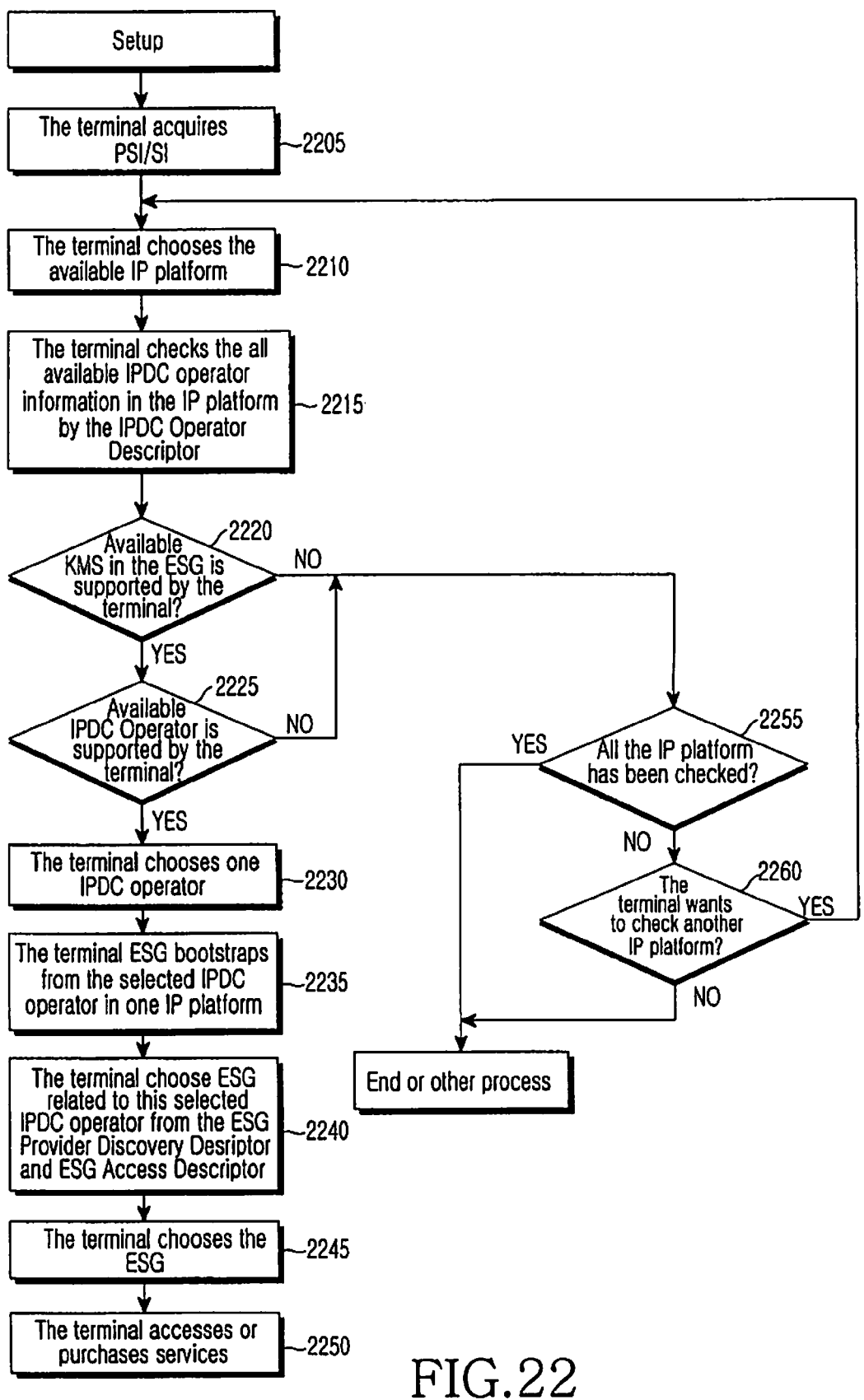
FIG. 22 is a flowchart illustrating an operation of a terminal according to an exemplary embodiment of the present invention.

As shown in FIG. 22, the terminal acquires broadcast service information (PSI/SI) in step 2205 and chooses/parses an available IP platform in step 2210. The terminal checks all available IPDC operator information in the ESG by the IPDCOperatorDescriptor in step 2215.

In step 2220, the terminal determines whether it supports an available KMS in the ESG. If it is determined in step 2220 that it supports the available KMS, the terminal determines in step 2225 whether it supports an available IPDC operator.

If it is determined in step 2225 that the terminal supports the available IPDC operator, the terminal chooses one IPDC operator in step 2230. In step 2235, the terminal ESG-bootstraps from the selected IPDC operator in one IP platform. The terminal chooses an ESG related to the selected IPDC operator from the ESGProviderDiscoveryDescriptor and the ESGAccessDescriptor of the ESG bootstrap in step 2240 and accesses the ESG in step 2245. In step 2250, the terminal accesses or purchases the services.

However, if it is determined in step 2220 that the terminal does not support the available KMS, the terminal determines in step 2255 whether all of the IP platform's ESG bootstrap has been checked. If it is determined in step 2255 that the check has been completed, the terminal ends the operation. If the check has not been completed, the terminal determines in step 2260 whether it wants to check another ESG bootstrap from another IP platform. If it is determined in step 2260 that the terminal wants the check, it proceeds to step 2210. Otherwise, the terminal ends the operation.

In the following exemplary embodiments, an ESG bootstrap is a unit for each IPDC operator, and IPDC operator information is included in the broadcast service information (PSI/SI).

These exemplary embodiments assume the followings.
1) ESG bootstrap is a unit for each IPDC operator;
2) The same IPDC operator may exist in the different IP platforms, and the terminal needs to retrieve more than one ESG bootstrap information when it wants to retrieve all IPDC operator-related ESG information; and
3) The ESG bootstrap is changed into the IPDC operator.

Embodiment 5

Figure 23:
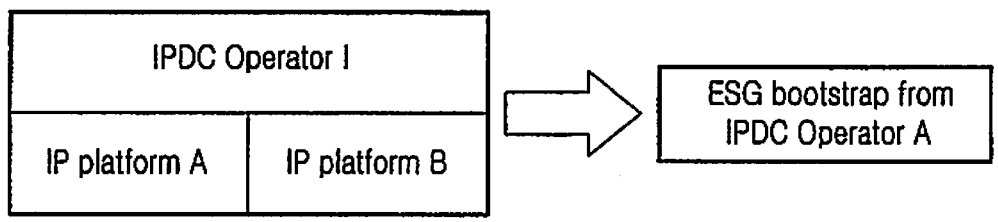
FIG. 23 is a diagram of an exemplary embodiment of the present invention.

As shown in FIG. 23, each IPDC operator has its unit ESG bootstrap in the present exemplary embodiment. Thus, a new ESG bootstrap descriptor may be defined and added in the broadcast service information (PSI/SI). In this new descriptor, IPDCOperator descriptor describes which IPDC operator that the ESG bootstrap is from. The ESG bootstrap's IP address describes the IP address and port number for the ESG bootstrap for this IPDC operator. The ESGBootstrap_descriptor may loop to list the ESG bootstrap information for all IPDC operators. An example thereof is shown as follows.

TABLE 21

Syntax
ESGBootstrap_descriptor{
   IPDCOperator_descriptor( )
   ESG bootstrap address
   Reserved for other identifier
}

With respect to FIG. 24, a description will now be made of an operation of a terminal according to embodiment 5 of the present invention.

Figure 24:
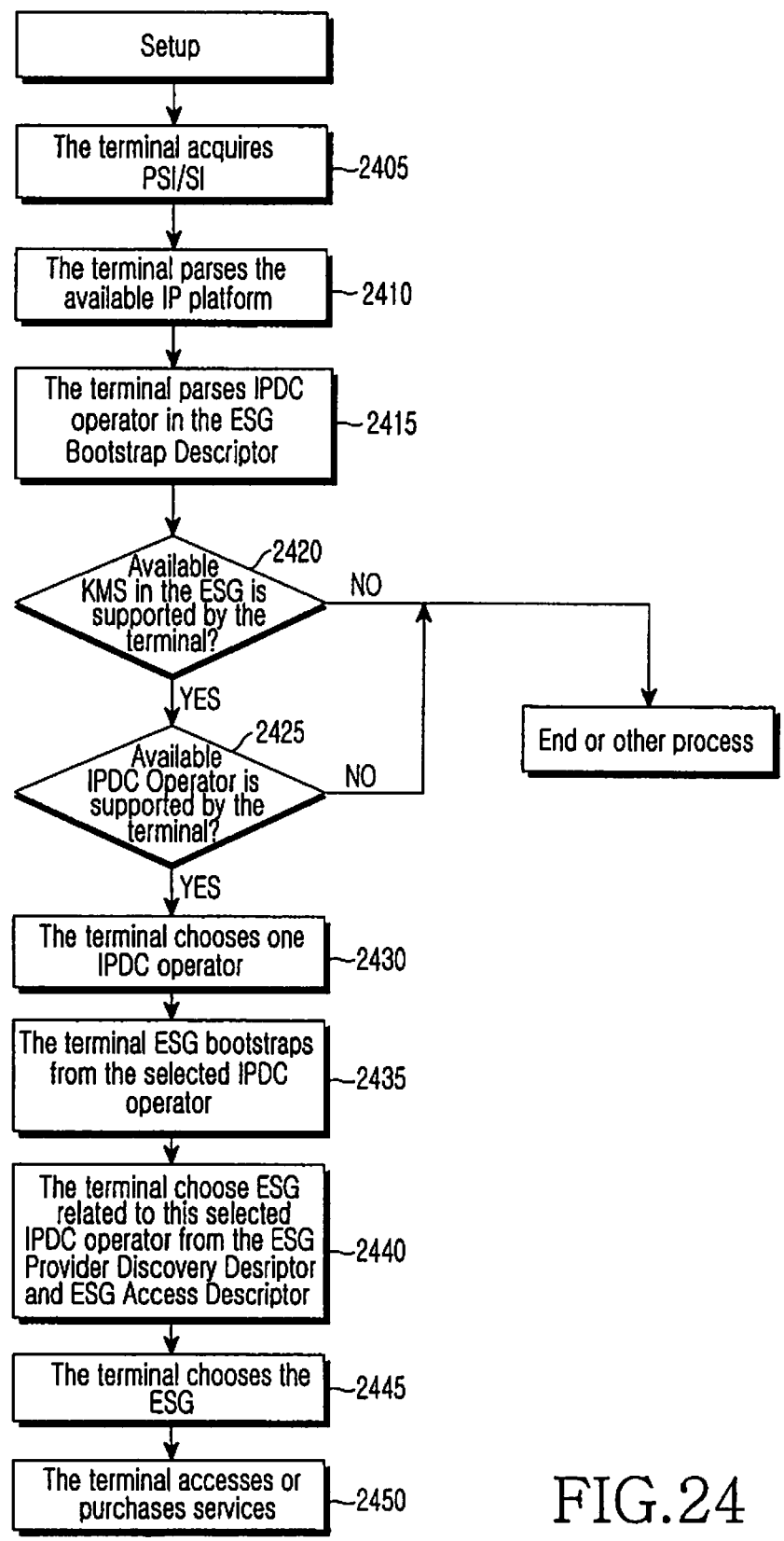
FIG. 24 is a flowchart illustrating an operation of a terminal according to an exemplary embodiment of the present invention.

As shown in FIG. 24, the terminal acquires broadcast service information (PSI/SI) in step 2405 and parses an available IP platform in step 2410. The terminal parses an IPDC operator in the ESGBootstrapDescriptor in step 2415 and determines in step 2420 whether it supports an available KMS in the ESG. If it is determined in step 2420 that the terminal supports the available KMS, the terminal determines in step 2425 whether it supports an available IPDC operator.

If it is determined in step 2425 that the terminal supports the available IPDC operator, the terminal chooses one IPDC operator in step 2430. The terminal ESG-bootstraps from the selected IPDC operator in the selected IP platform in step 2435 and chooses an ESG related to the selected IPDC operator from the ESGProviderDiscoveryDescriptor and the ESGAccessDescriptor in step 2440. The terminal accesses the ESG in step 2445 and then accesses or purchases services in step 2450.

Embodiment 6

Figure 25:
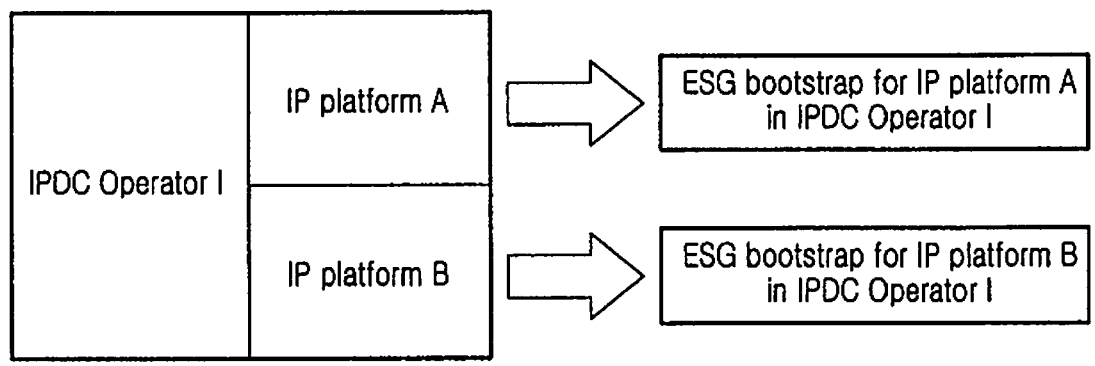
FIG. 25 is a diagram of an exemplary embodiment of the present invention.

In the present exemplary embodiment, the ESG bootstrap is a unit for each IP platform in each IPDC operator as shown in FIG. 25.

The ESGBootstrap_descriptor is provided in more detail in the present exemplary embodiment. An example thereof is shown as follows.

TABLE 22

Syntax
ESGBootstrap_descriptor{
   IPDCOperator_descriptor( )
   Platform_id
   ESG bootstrap address
   Reserved for other identifier
}

With respect to FIG. 26, a description will now be made of an operation of a terminal according to embodiment 6 of the present invention.

Figure 26:
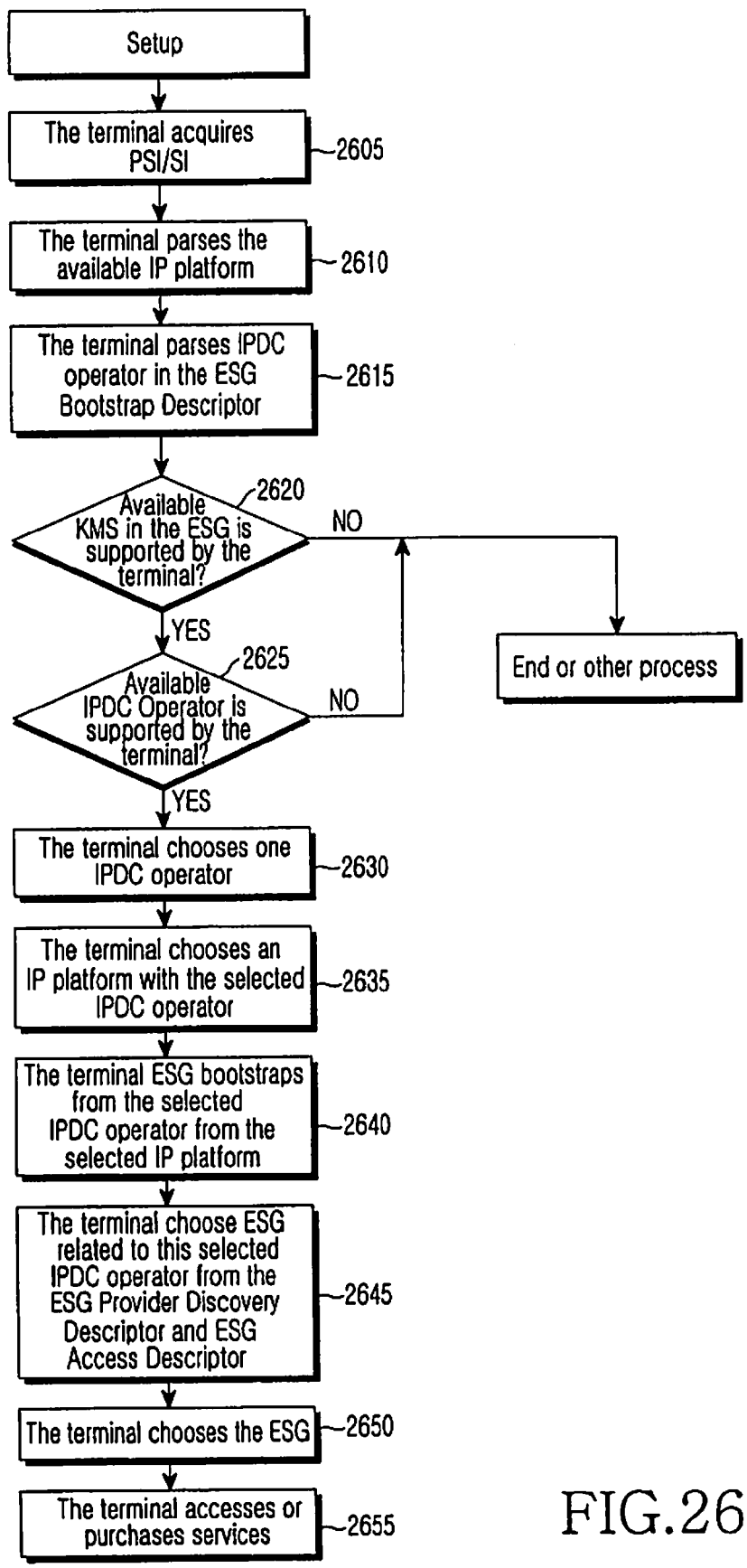
FIG. 26 is a flowchart illustrating an operation of a terminal according to an exemplary embodiment of the present invention.

As shown in FIG. 26, the terminal acquires broadcast service information (PSI/SI) in step 2605 and parses an available IP platform in step 2610. The terminal checks IPDC operator information for each IP platform in step 2615.

In step 2620, the terminal determines whether it supports an available KMS in the ESG. If it is determined in step 2620 that the terminal supports the available KMS, the terminal determines in step 2625 whether it supports an available IPDC operator. If it is determined in step 2625 that the terminal supports the available IPDC operator, the terminal chooses one IPDC operator in step 2630. The terminal chooses one IP platform from the selected IPDC operator in step 2635 and ESG-bootstraps from the selected IPDC operator in the selected IP platform in step 2640. In step 2645, the terminal chooses an ESG related to the selected IPDC operator from the ESGProviderDiscoveryDescriptor and the ESGAccessDescriptor. The terminal accesses the selected ESG in step 2650 and then accesses or purchases the services in step 2655.

While an IPDC operator is presently considered to own the rights to a service and manages the same, this concept may change in the future to another provider or operator that owns the right to and manage the service. Accordingly, the related parameter in each mechanism in accordance with the present invention may also be changed to the new related parameters. That is, some other than the IPDC operator information may also be indicated in a manner similar to that described above to provide a shortcut way for the terminal to find a suitable ESG. For example, geographic information and network information may also be indicated. Regarding geographic information, some ESGs may be only for some specific areas in consideration of the varying local services available in different areas.

Figure 27:
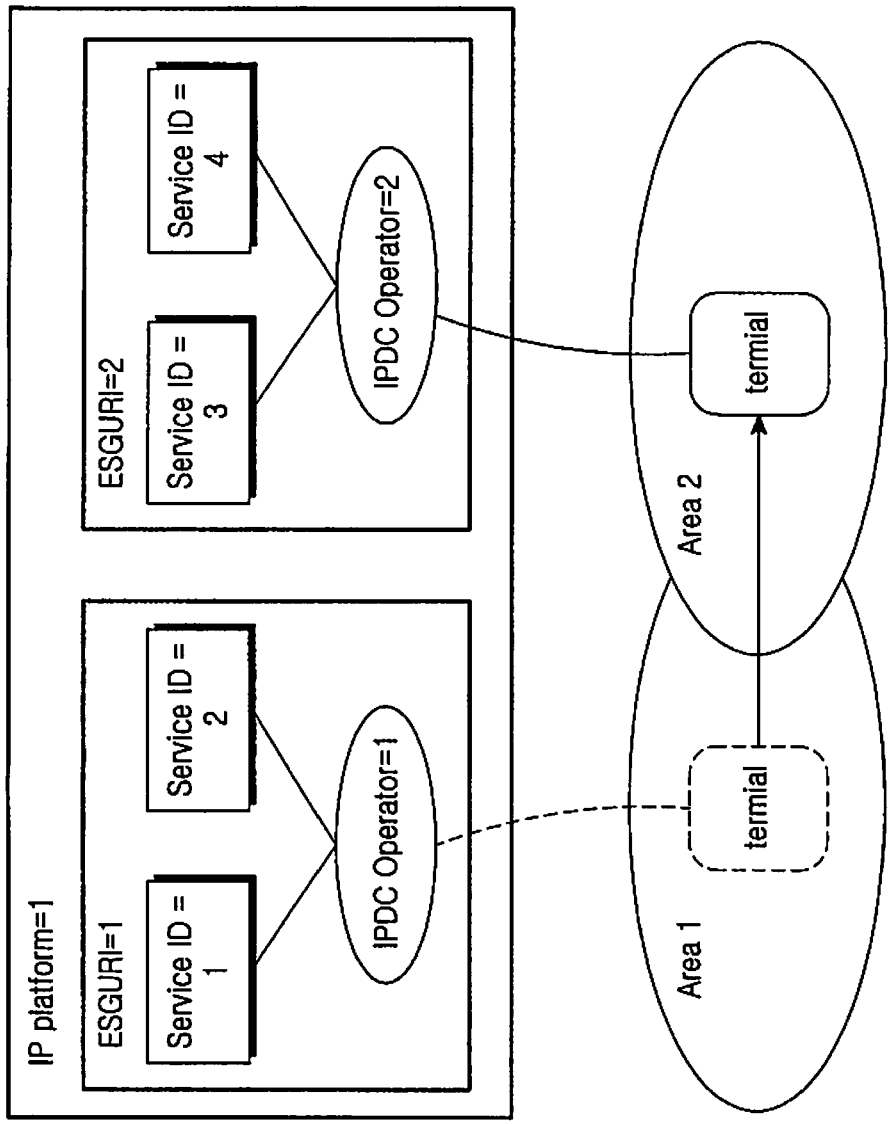
FIG. 27 is a diagram illustrating an example of an ESG for a particular area according to the present invention.
Figure 28:
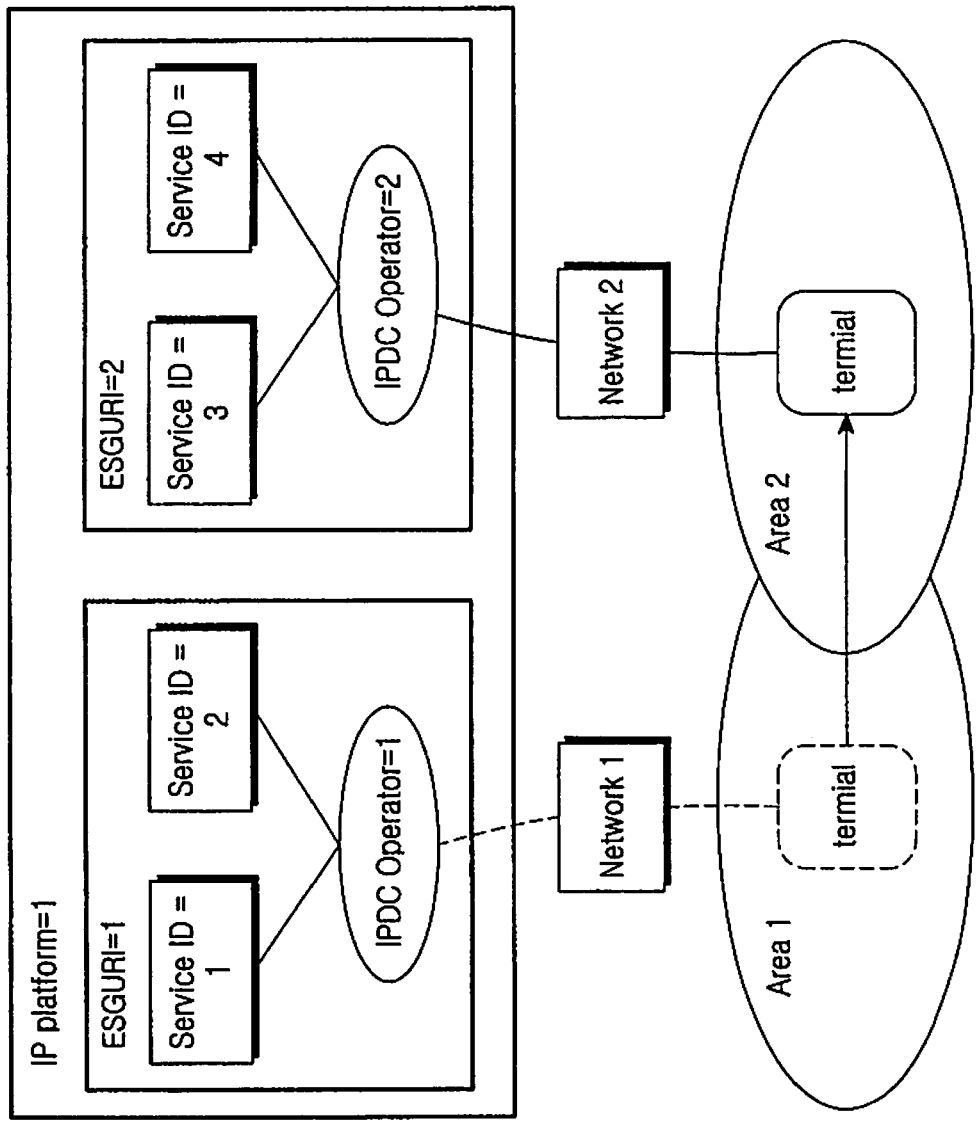
FIG. 28 is a diagram illustrating an example of a an ESG for a particular network according to the present invention.

Accordingly, Table 23 and FIG. 27 show an exemplary embodiment of the present invention where geographic information except IPDC operator information is added. Table 25 and FIG. 28 show an exemplary embodiment of the present invention where network information is added. Table 26 shows an exemplary embodiment of the present invention for mobility-related additional information.

FIG. 27 is a diagram illustrating an example of a particular ESG for a particular area. As shown in FIG. 27, geographic information for an ESG will help the terminal select a suitable ESG. Similar to IPDC operator information described above, the geographic information for the ESG may be indicated in advance by defining a new element or descriptor. For example, FIG. 27 shows an example where ESGUIR=1 (ESG1) is provided only to Area 1 and ESGURI=2 (ESG2) is provided only to Area 2, thereby designating the geographic information, such as Area 1 and Area 2, as information necessary for choosing each ESG. These new elements and/or descriptors may be indicated as IPDC operator information in the ESG bootstrap (e.g., embodiments 1 and 2) and/or may be indicated as IPDC operator information in the broadcast service information (PSI/SI) (e.g., embodiments 3 to 6) as described above.

TABLE 23

| New element or descriptor | Parameter |
|---|---|
| Geographic information for the ESG | Network ID<br>Cell id<br>GPS<br>Country code<br>Mcc: Mobile Country Code<br>Mnc: Mobile Network Code |

TABLE 23-continued

| New element or descriptor | Parameter |
|---|---|
| | Reserved for any parameter that could describe the geographic information for the ESG |

In the exemplary embodiments above where the IPDC operator information is provided in the ESG bootstrap level (e.g., embodiments 1 and 2), the terminal may be provided with geographic information for each ESG (e.g., ESG1 for Area 1, and ESG2 for Area 2) when the terminal parses the ESG bootstrap because the related information is added in the ESG bootstrap.

In the exemplary embodiments above where the IPDC operator information is provided in the broadcast service information (PSI/SI) level (e.g., embodiments 3 to 6), the terminal may be provided with geographic information for each ESG (e.g., ESG1 for Area 1, and ESG2 for Area 2) when the terminal parses the PSI/SI because the related information is added in the PSI/SI.

Accordingly, when the terminal is in Area 1, for example, it may access ESG1. When the terminal then moves to Area 2, for example, it may change to ESG2.

For instance, an example of the geographic information for an ESG may be defined as shown in Table 24.

TABLE 24

```
<element name="GeographicInformation"
 type="GeographicInformationType"/>
<complexType name=""IPDCRelatedInformationType">
 <sequence>
  <element name="ESGURI" type="anyURI"/>
  <element                    name="NetworkID"
type="positiveInteger" minOccurs="0"maxOccurs="unbounded"/>
  <element name="CellID"
   type="positiveInteger"minOccurs="0"maxOccurs="unbounded"/>
  <element name="MCC"
   type="positiveInteger"minOccurs="0"maxOccurs="unbounded"/>
  <element name="MNC"
   type="positiveInteger"minOccurs="0"maxOccurs="unbounded"/>
  <element name="GPS"
   type="anyURI" minOccurs="0"maxOccurs="unbounded"/
 </sequence>
</complexType>
</element>
```

In some situations, ESGs may be delivered over specific networks. FIG. 28 illustrates an exemplary embodiment of a specific ESG for a specific network.

As shown in FIG. 28, access network information for an ESG will assist the terminal in selecting a suitable ESG. Similar to IPDC operator information, access network information may be indicated for an ESG in advance by defining new element or descriptor. That is, FIG. 28 shows an example where ESGUIR=1 (ESG1) is provided only to Network 1 and ESGURI=2 (ESG2) is provided only to Network 2, thereby designating network information, such as Network 1 and Network 2, as information necessary for choosing each ESG. These new elements and/or descriptors may be indicated as IPDC operator information in the ESG bootstrap (e.g., embodiments 1 and 2) and/or may be indicated as IPDC operator information in the broadcast service information (PSI/SI) (e.g., embodiments 3 to 6) as described above.

Alternatively, the related geographic information for an ESG may also be indicated through ProviderURI or ESGURI. The geographic information may be defined as a format of networkID and cellID in URI. For example, it may be expressed in the form of a hypertext transfer protocol (e.g., "//www.dvb.org/cbms/kbs/network1/cell1/esg"). In the above example, the terminal recognizes the network and the cell that the corresponding ESG uses, based on the information of ProviderURI. In this case, the terminal may directly know geographic information related to the ESG through the URI.

The geographic information (NetworkID, cellID) may be specified in the URI (ProviderURI, ESGURI), and its location may be in the front (prefix) or rear (suffix) of the URI. However, it may be placed in another location without departing from the scope of the invention.

As for ProviderURI, the ESG may be classified as ProviderURI as described in, for example, ETSI TS 102471 v.1.2.1. To indicate which cell a specific ESG is for, the ProviderURI may be described as follows:

cellIDFFFF/ESGProviderIdentifier

Here, cellIDFFFF/ is attached to the head of the URI in the form of a prefix, FFFF denotes a cell ID in the form of a hexadecimal, and ESGProviderIdentifier is a separator of the ESG Provider. For example, "cellID0000/mycompany1.example.com," "cellID0001/mycompany1.example.com," and "cellID0002/mycompany1.example.com" represent ESGs of cell 0, cell 1, and cell 2, respectively, and these ESGs are provided by the ESG Provider "mycompany1.example.com."

If the same ESG and service are transported to different cells, each cellID may be arranged in a row at the head of the URI one by one. For example, "cellID0001/cellID0002/mycompany1.example.com" indicates that the same ESG is provided to cell 1 and cell 2.

In a similar way, when the networkID is delivered, the ProviderURI may be defined as follows.

networkIDFFFF/cellIDFFFF/ESGProviderIdentifier

Here, "networkFFFF/" exists at the head of the URI, and FFFF indicates network ID in the form of a hexadecimal. Even for ESGURI, geographic information may be specified in the same manner.

If the ESG Provider does not know the Cell ID to which each ESG will be delivered, a different type of geographic information, instead of the Cell ID, may be specified in the front, rear, or other location of the ESG Provider identifier. The geographic information may be any one of satellite, local, city name, area code, GPS, etc. When a terminal cannot determine the geographic information specified in the form of the prefix and suffix, the terminal selects an ESG for a specific area based on the corresponding geographic information. If the terminal cannot determine which ESG is delivered for the location where it is currently located, the terminal first finds an entry point of each ESG. Further, the terminal finds a service ID of an IP address for each entry point from the broadcast service information (PSI/SI) and determines which entry point is for a specific area based on a Service Description Table (SDT).

TABLE 25

| New element or descriptor | Parameter | | |
|---|---|---|---|
| Access network | Network ID | | |
| | Cell id | | |
| | Network type | DVB-H | |
| | | DVB-S | |
| | | DVB-SH | Satellite network |
| | | | Terrestrial network |
| | | 3GPP | |
| | | WIMAX | |

TABLE 25-continued

| New element or descriptor | Parameter |
|---|---|
| | Reserved for any network type |
| | Reserved for any parameter that could describe the geographic information for the ESG |

In some of the exemplary embodiments above (e.g., embodiments 1 and 2), the terminal may know the access network information for each ESG (e.g., ESG1 for network 1 and ESG2 for network 2, or ESG1 is for a satellite network and ESG2 is for a terrestrial network in a DVB-SH system) when the terminal parses the ESG bootstrap because the related information is added in the ESG bootstrap. In other exemplary embodiments above (e.g., embodiments 3 to 6), the terminal may know the access network information for each ESG (e.g., ESG1 for network 1 and ESG2 for network 2, or ESG1 is for a satellite network and ESG2 is for a terrestrial network in a DVB-SH system) when the terminal parses the broadcast service information (PSI/SI) because the related information is added in the PSI/SI. Therefore, when the terminal is over network 1, it can access ESG1. When the terminal changes to network2, it can change to ESG2.

Examples of other related information, especial information related to mobility of the terminal, is summarized in Table 26. If needed, some of the information may be selected and used in the above embodiments to support mobility of the terminals. Furthermore, other information that assists the terminal find a suitable ESG in a shortcut way may be adopted using the embodiments described above without departing from the scope of the present invention.

TABLE 26

| Field | Detailed parameters | | |
|---|---|---|---|
| ESG origin identifier | IP platform ID | | |
| | provider URI | | |
| | provider ID | | |
| | ESGURI | | |
| | The identifier of the IPDC operator (e.g. IPDCKMSID and IPDCOperatorID) | | |
| | Geographic location (e.g. Network ID, cell ID, GPS, or others) | | |
| | service provider URI | | |
| | service provider ID | | |
| | SM ID | | |
| | Any other parameter could identifier ESG origin | | |
| ESG user object | 1. all | | |
| | 2. specific | IP platform ID | |
| | | provider URI | |
| | | provider ID | |
| | | ESGURI | |
| | | The identifier of the IPDC operator (e.g. IPDCKMSID and IPDCOperatorID) | |
| | | Geographic location (e.g. Network ID, cell ID, GPS, or others) | |
| | | service provider URI | |
| | | service provider ID | |
| | | SM ID | |
| | | Any other parameter could identifier the user object | |
| | Reserved for new user object | | |
| Scope of the service in the | 1. local | 0: not | |

TABLE 26-continued

| Field | Detailed parameters | | |
|---|---|---|---|
| ESG | service | included | |
| | | 1: included | IP platform ID<br>provider URI<br>provider ID<br>ESGURI<br>The identifier of the IPDC operator (e.g. IPDCKMSID and IPDCOperatorID)<br>Geographic location (e.g. Network ID, cell ID, GPS, or others)<br>service provider URI<br>service provider ID<br>SM ID<br>Any other parameter could identifier the provider of local service |
| | 2. visited service | 0: not included | |
| | | 1: included | IP platform ID<br>provider URI<br>provider ID<br>ESGURI<br>The identifier of the IPDC operator (e.g. IPDCKMSID and IPDCOperatorID)<br>Geographic location (e.g. Network ID, cell ID, GPS, or others)<br>service provider URI<br>service provider ID<br>SM ID<br>Any other parameter could identifier the provider of visited service |
| | 3. service roaming service | 0: not included | |
| | | 1: included | IP platform ID<br>provider URI<br>provider ID<br>ESGURI<br>The identifier of the IPDC operator (e.g. IPDCKMSID and IPDCOperatorID)<br>Geographic location (e.g. Network ID, cell ID, GPS, or others)<br>service provider URI<br>service provider ID<br>SM ID<br>Any other parameter could identifier the provider of service roaming service |
| | Reserved for new scope of the service | | |
| Geographic location | Network ID, cell ID, GPS, or others | | |
| Access network | networkID, network type: DVB-H, DVB-S, DVB-SH (satellite network, terrestrial network), 3GPP, WIMAX.. | | |
| ESG access scope type | 1. local ESG<br>2. ESG only for roaming user<br>3. local and roaming combined ESG<br>Reserved for new access scope<br>Reserved for new indication information | | |

For purposes of expediting ESG discovery in accordance with the present invention when the IPDC operator information is indicated in the bootstrap, the following exemplary information may also be indicated at the same time in the same way. The detailed location of the information may be variable in the ESG bootstrap and PSI/SI as exemplified in embodiments 1 to 6 described above.

1. ESG Origin Identifier

First, the origin of an ESG may be indicated, from which the terminal can determine who generates and owns this ESG. The origin identifier of this ESG may be whole or part of the following parameters: IP platform ID, provider URI, ESGURI, IPDCKMSID, IPDCOperatorID, provider ID, network ID, service provider URI, service provider ID, SM ID, or any other parameters that is capable of identifying ESG origin.

2. ESG Access Scope Type

In order to support ESG roaming, there may be three types of ESGs defined: local ESG, ESG for roaming user only, local and roaming combined ESG "Local ESG" means that the ESG carries only the information about the service for the local user. "ESG for roaming user only" means that ESG carries only the information about the service especially for a roaming user. "Local and roaming combined ESG'" means part of the service information in this ESG is for the local user and another part is for the roaming user.

3. ESG User Object

An ESG object for "all" means this ESG may be for all of the users, whether the user is a local user or a roaming user. The ESG may also be just for some specific roaming users. For example, it may be for a roaming user from a specific IP operator. In this case, the detailed identifier of the user object is indicated clearly. If the ESG is available for multiple specific groups of roaming users, the identifier of each specific group of the roaming user is all listed one by one. The parameter that identify the user object may be whole or part of the following parameters: IPDCKMSID, IPDCOperatorID, IP platform ID, provider URI, provider ID, network ID, service provider URI, service provider ID, SM ID, or any other parameters that is capable of identify the user object.

4. Scope of the Service in the ESG

There may be several types of services available for a roaming user: local service, visited service, "service roaming" service. Local service is for providing information about a broadcast service that the roaming users can enjoy. Visited service is for providing information (e.g., geographic information, service, guideline, language, etc.) about the broadcast service provided for the roaming users, and the "service roaming" service is for providing information about the broadcast services available through service roaming, provided from the home network to which the terminal belongs.

Therefore, the kind of roaming service information that may be available in the ESG depends on the service in an ESG. For example, if there is information about whether local service is available or not, an identifier of a local service operator is provided in the ESG. If there is information about whether visited service is available or not, an identifier of a visited service operator is provided. Likewise, if there is information about whether service roaming service is available or not, an identifier of a service roaming service operator is provided. For each case, there may be more than one operator. Accordingly, identifier of each operator may be listed one by one. The parameters in Table 26, in whole or in part, may be used. Further, any new roaming service type may be added to the list.

The information described above for expediting ESG discovery is only exemplary. In practice, the provider may use all or selected combinations of the information, or modify and add new indication information. The format is as shown in Table 26 is also exemplary. The format and parameters of Table 26 may be modified, removed, or added without departing from the scope of the invention.

An exemplary syntax of the ESG attribute may be structured as shown in Table 27.

TABLE 27

```
<element name="ESGAttribute" type="ESGAttributeType" maxOccurs="unbounded"/>
<complexType name=" ESGAttributeType"/>
   <sequence>
      <element name=" ESGOriginIdentifier" type=" ESGOriginIdentifierType "/>
      <element name="ESGAccessScope" type=" ESGAccessScopeType "/>
      <element name="ESGUserObject" type=" ESGUserObjectType " minOccurs="0" maxOccurs="unbounded"/>
      <element name="ESGAccessScope" type=" ESGAccessScopeType "/> minOccurs="0" maxOccurs="unbounded"/>
      <element name="ServiceScope" type="ServiceScopeType"/> minOccurs="0" maxOccurs="unbounded"/>
      <element name="GographicInformation" type="GeographicInformationType"/>
      <element name="AccessNetwork" type="anyURI"/>
      <element name="ServiceProviderURI" type="anyURI"/>
      <element name="ServiceProviderID" type="positiveInteger"/>
      <element name="SMID" type="positiveInteger"/>
   </sequence>
</complexType>
```

An exemplary syntax of the ESG origin identifier may be structured as shown in Table 28.

TABLE 28

```
<complexType name="ESGOriginIdentifierType">
   <sequence>
      <element name="IPPlatformID" type="positiveInteger"/>
      <element name="ProviderURI" type="anyURI"/>
      <element name="ProviderID" type="positiveInteger"/>
      <element name="ESGURI" type="anyURI"/>
      <element name="IPDC" type="IPDCType"/>
      <element name="NetworkID" type="positiveInteger"/>
      <element name="CellID" type="positive Integer"/>
      <element name="GographicInformation" type="GeographicInformation Type"/>
```

TABLE 28-continued

```
      <element name="AccessNetwork" type="anyURI"/>
      <element name="ServiceProviderURI" type="anyURI"/>
      <element name="ServiceProviderID" type="positiveInteger"/>
      <element name="SMID" type="positive Integer"/>
   </sequence>
</complexType>
<complexTypename="IPDCType">
   <sequence>
      <element name="IPDCKMSId" type="unsignedShort"/>
      <element name="IPDCOperator" type="string"/>
   </sequence>
</complexType>
```

In an alternative exemplary embodiment, it may be structured as shown in Table 29.

TABLE 29

```
<element name="ESGAttribute" type="ESGAttributeType"

<complexType name=" ESGAttributeType"/>

<sequence>

<element name=" ESGOriginIdentifier" type="ESGOriginIdentifierType "/>

<element name="ESGAccessScope" type=" ESGAccessScopeType "/>

<element name="ESGUserObject" type=" ESGUserObjectType " minOccurs="0" maxOccurs="unbounded"/>

<element name="ESGAccessScope" type=" ESGAccessScopeType "/> minOccurs="0" maxOccurs="unbounded"/>

<element name="ServiceScope" type="ServiceScopeType"/> minOccurs="0" maxOccurs="unbounded"/>

<element name="GographicInformation" type="GeographicInformationType"/>
      <element name="AccessNetwork" type="anyURI"/>
      <element name="ServiceProviderURI" type="anyURI"/>
      <element name="ServiceProviderID" type="positiveInteger"/>
      <element name="SMID" type="positiveInteger"/>
   </sequence>
</complexType>
```

An exemplary syntax of the ESG origin identifier may be structured as shown in Table 30.

TABLE 30

```
<complexType name="ESGOriginIdentifierType">
  <sequence>
    <element name="IPPlatformID" type="positiveInteger"/>
    <element name="ProviderURI" type="anyURI"/>
    <element name="ProviderID" type="positiveInteger"/>
    <element name="ESGURI" type="anyURI"/>
    <element name="IPDC" type="IPDCType"
       minOccurs="0" maxOccurs="unbounded"/>
    <element name="NetworkID" type="positiveInteger"/>
    <element name="CellID" type="positiveInteger"/>
    <element name="GographicInformation"
       type="GeographicInformationType"/>
          <element name="AccessNetwork"
             type="anyURI"/>
    <element name="ServiceProviderURI" type="anyURI"/>
    <element name="ServiceProviderID" type="positiveInteger"/>
    <element name="SMID" type="positiveInteger"/>
  </sequence>
</complexType>
<complexType name="IPDCType">
  <sequence>
    <element name="IPDCKMSId" type="unsignedShort"/>
    <element name="IPDCOperatorId" type="string"/>
  </sequence>
</complexType>
```

In an alternative exemplary embodiment, it may be structured as shown in Table 31.

TABLE 31

```
<element name="ESGAttribute" type="ESGAttributeType"
<complexType name=" ESGAttributeType"/>
  <sequence>
    <element name=" ESGOriginIdentifier" type=" ESGOriginIdentifierType "/> minOccurs="0" maxOccurs="unbounded"/>
    <element name="ESGAccessScope" type=" ESGAccessScopeType "/>
    <element name="ESGUserObject" type=" ESGUserObjectType " minOccurs="0" maxOccurs="unbounded"/>
    <element name="ESGAccessScope" type=" ESGAccessScopeType "/> minOccurs="0" maxOccurs="unbounded"/>
    <element name="ServiceScope" type="ServiceScopeType"/> minOccurs="0" maxOccurs="unbounded"/>
    <element name="GographicInformation" type="GeographicInformationTypeI"/>
    <element name="AccessNetwork" type="anyURI"/>
    <element name="ServiceProviderURI" type="anyURI"/>
    <element name="ServiceProviderID" type="positiveInteger"/>
    <element name="SMID" type="positiveInteger"/>
  </sequence>
</complexType>
```

An exemplary syntax of the ESG origin identifier may be structured as shown in Table 32.

TABLE 32

```
<complexType name="ESGOriginIdentifierType">
  <sequence>
    <element name="IPPlatformID" type="positiveInteger"/>
    <element name="ProviderURI" type="anyURI"/>
    <element name="ProviderID" type="positiveInteger"/>
    <element name="ESGURI" type="anyURI"/>
    <element name="IPDC" type="IPDCType" minOccurs="0"/>
    <element name="NetworkID" type="positiveInteger"/>
    <element name="CellID" type="positiveInteger"/>
```

TABLE 32-continued

```
    <element name="GographicInformation"
       type="GeographicInformation Type"/>
          <element name="AccessNetwork"
             type="anyURI"/>
    <element name="ServiceProviderURI" type="anyURI"/>
    <element name="ServiceProviderID" type="positiveInteger"/>
    <element name="SMID" type="positiveInteger"/>
  </sequence>
</complexType>
<complexType name="IPDCType">
  <sequence>
    <element name="IPDCKMSId" type="unsignedShort"/>
    <element name="IPDCOperatorId" type="string"/>
  </sequence>
</complexType>
```

An exemplary ESG access scope type may be classified as shown in Table 33.

TABLE 33

```
<ClassificationScheme
  uri="urn:dvb:ipdc:esg:cs: ESGAccessScopeTypeCS:>
    <Term termID="1.0" Name xml:lang="en"> ESG access scope
    type </Name>
       <Definition xml:lang="en">Type of ESG access scope, e.g.
local ESG, ESG only for roaming user, local and roaming combined
ESG </Definition>
```

TABLE 33-continued

```
    <Term termID="1.1>
       <Name xml:lang="en"> local ESG </Name>
       <Definition xml:lang="en">A local ESG </Definition>
    <Term termID="1.2>
       <Name xml:lang="en" ESG only for roaming
       user </Name>
       <Definition xml:lang="en" A ESG only for roaming
       user </Definition>
    <Term termID="1.3>
       <Name xml:lang="en"> local and roaming combined
       ESG </Name>
       <Definition xml:lang="en"> local and roaming combined
       ESG </Definition>
    </Term>
    </Term>
</ClassificationScheme>
```

In an alternative exemplary embodiment, it may be classified as shown in Table 34.

TABLE 34

```
<simpleType name="ESGAccessScopeType">
  <restriction base="string">
        <enumeration value="local ESG"/>
        <enumeration value="ESG only for roaming user"/>
        <enumeration value="local and roaming combined ESG"/>
  </restriction>
</simpleType>
```

An ESG user object may be for all or specified users. If it is "true," it means the ESG is for all the users. Otherwise, it means that the ESG is only for the specific users, and a detailed identifier of the specific user object should be listed.

TABLE 35

```
<complexType name="ESGUserObjectType">
   <sequence>
      <element name="IPPlatformID" type=" positive Integer "/>
      <element name="ProviderURI" type="anyURI"/>
      <element name="ProviderID" type="positive Integer"/>
      <element name="SpecificIPDC" type="IPDCType"/>
      <element name="ESGURI" type="anyURI"/>
      <element name="NetworkID" type="positive Integer"/>
      <element name="CellID" type="positive Integer"/>
      <element name="GographicInformation"
         type="GographicInformation Type"/>
      <element name="ServiceProviderURI" type="anyURI"/>
      <element name="ServiceProviderID" type="positive Integer"/>
      <element name="SMID" type="positive Integer"/>
   </sequence>
   <atteribute name="AllPrSpecific" type="Boolean"/>
</complexType>
<compexType name="IPDCType">
   <sequence>
      <element name="IPDCKMSId" type="unsignedShort"/>
      <element name="IPDCOperatorId" type="string"/>
   </sequence>
</complexType>
```

An exemplary scope of service in the ESG is structured as shown in Table 36.

TABLE 36

```
<element name="ServiceScope" type="ServiceScopeType"/>
<complexType name=" ServiceScopeType">
<sequence>
    <element name="LocalService" type="anyURI" minOccurs="0"/>
    <element name="VisitedService" type="anyURI" minOccurs="0"/>
    <element name="ServiceRoamingService" type="anyURI"
     minOccurs="0"/>
</sequence>
</complexType>
<complexType name="IPDCType">
   <sequence>
      <element name="IPPlatformID" type=" positiveInteger "/>
       element name="ProviderURI" type="anyURI"/>
      <element name="ProviderID" type="positiveInteger"/>
        <element name="IPDC" type="IPDCType"/>
      <element name="ESGURI" type="anyURI"/>
      <element name="NetworkID" type="positiveInteger"/>
      <element name="CellID" type="positiveInteger"/>
      <element name="GographicInformation"
         type="GographicInformation Type"/>
      <element name="ServiceProviderURI" type="anyURI"/>
      <element name="ServiceProviderID" type="positiveInteger"/>
      <element name="SMID" type="positiveInteger"/>
                  </sequence>
</complexType>
```

TABLE 36-continued

```
<complexType name="IPDCType">
   <sequence>
      <element name="IPDCKMSId" type="unsignedShort"/>
      <element name="IPDCOperatorId" type="string"/>
   </sequence>
</complexType>
```

In the alternative, the scope of service in the ESG may be structured as shown in Table 37.

TABLE 37

```
Syntax
Scope of the service in the ESG {
    local service
    visited service
    service roaming service
    If(local service){
       IPPlatformID
       ProviderURI
       ProviderID
       IPDCKMSId
       IPDCOperatorId
       ESGURI
        NetworkID
        CellID
        GographicInformation
          ServiceProviderURI
          ServiceProviderID
          SMID
    }
    If(visited service){
       IPPlatformID
       ProviderURI
       ProviderID
       IPDCKMSId
       IPDCOperatorId
       ESGURI
        NetworkID
        CellID
        GographicInformation
          ServiceProviderURI
          ServiceProviderID
          SMID
    }
    If(service roaming service){
       IPPlatformID
       ProviderURI
       ProviderID
       IPDCKMSId
       IPDCOperatorId
       ESGURI
        NetworkID
        CellID
        GographicInformation
          ServiceProviderURI
          ServiceProviderID
          SMID
    }
}
```

In a mobile environment, rights management is the main parameter in supporting roaming. Handover, for example, is one scope of rights management. Roaming involves different rights management scopes due to subscription and roaming agreement issues, for example.

In the current CBMS system, an IPDC operator (specifically, the IPDC KMS system and IPDC operator) is considered to be the role in charge of the rights management, indicated by the identifier IPDCKMSID and IPDCOperatorID, for example. However, even if the roles of the rights management shifts in future systems, the various exemplary embodiments of the present patent may be modified and applied without departing from the scope of the present invention. For purposes of explanation, the present invention considers the IPDC KMS system and the IPDC operator as the rights management system.

Figure 29:
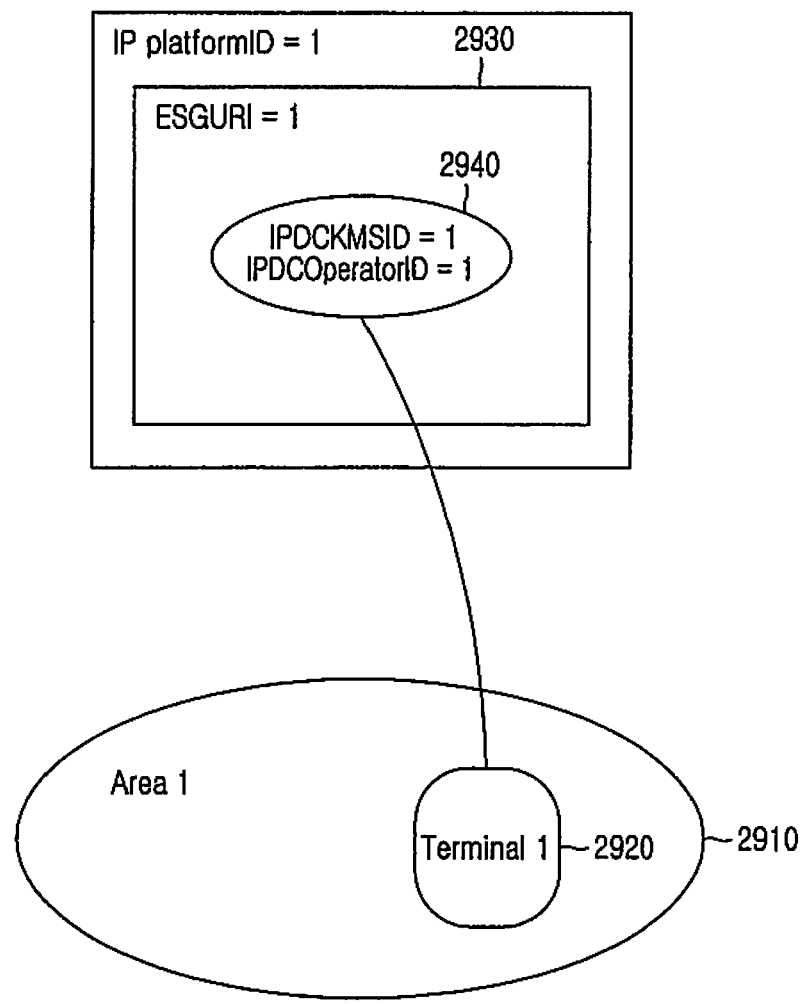
FIG. 29 is a diagram illustrating an example of an IPDC KMS system and an IPDC operator.

FIG. 29 illustrates a general example in which the IPDC KMS system and the IPDC operator manage the rights. As shown in FIG. 29, in Area 1 (2910), there is a local user, or a terminal 1 (2920). This local terminal 2920 subscribes to an operator with identifier IPDCKMSID=1 and IPDCOperatorID=1. Therefore, when the terminal 2920 accesses ESGURI=1 (2930), the terminal will find its subscribed operator (IPDC KMS system=1 and IPDC operator=1). Accordingly, these identifiers are referred to as ESG origin identifiers.

The IPDC KMS system and the IPDC operator (IPDCKMSID=1 and IPDCOperatorID=1) 2940 may have a roaming agreement with other KMS system and IPDC operator.

Figure 30:
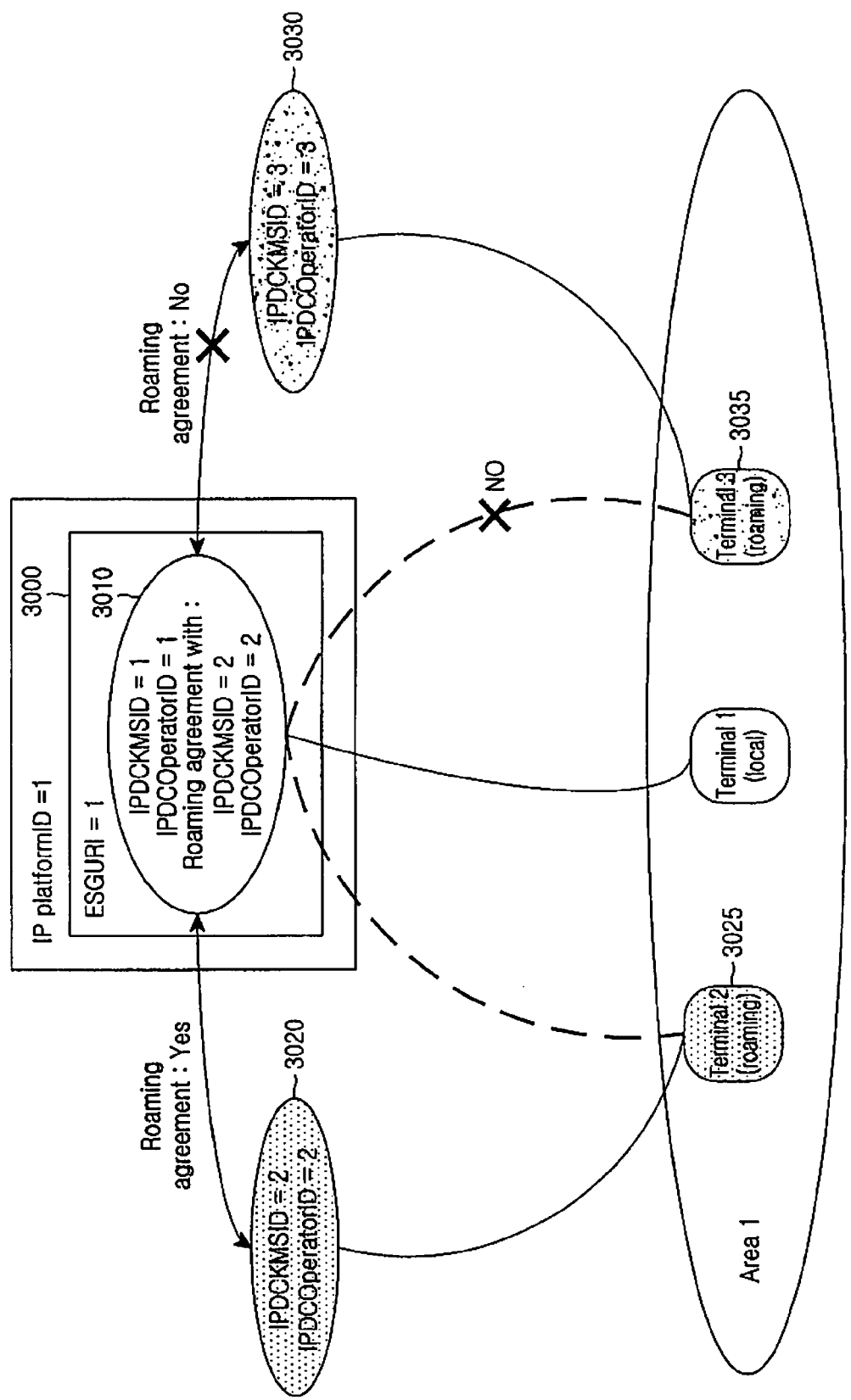
FIG. 30 is a diagram illustrating an example of a roaming service according to an exemplary embodiment of the present invention.

FIG. 30 shows an example of roaming. Here, operator 3010 (IPDCKMSID=1 and IPDCOperatorID=1) is in charge of local rights management. As shown in FIG. 30, operator 3010 (IPDCKMSID=1 and IPDCOperatorID=1) has a roaming agreement with operator 3020 (IPDCKMSID=2 and lPDCOperatorID=2). Therefore, terminal 3025 subscribing with operator 3020 (IPDCKMSID=2 and IPDCOperatorID=2) may also access services from operator 3010 (IPDCKMSID=1 and IPDCOperatorID=1) due to the roaming agreement between them.

Therefore, an ESG 3000 (ESGURI=1) is not only for users subscribed with operator 3010 (IPDCKMSID=1 and IPDCOperatorID=1) but also for users subscribed with operator 3020 (IPDCKMS=2, IPDCOperatorID=2).

As shown in FIG. 30, there is another operator 3030 (IPDCKMSID=3 and IPDCOperatorID=3). Because operator 3030 (IPDCKMSID=3 and IPDCOperatorID=3) has no roaming agreement with operator 3010 (IPDCKMSID=1 and IPDCOperatorID=1), the terminal 3 (3035) that subscribed to operator 3030 (IPDCKMSID=3 and IPDCOperatorID=3) does not have the right to access services managed by operator 3010 (IPDCKMSID=1 and IPDCOperatorID=1).

In order to support roaming, information about a roaming partner may be indicated in advance. As described above, the information about a roaming partner may be signaled by extending the broadcast service information (PSI/SI), ESG bootstrap (ESGProviderDiscoveryDescriptor, ESGAccessDescriptor, and/or a newly defined descriptor), ESG announcement carousel, and index or partition. It is one example of the ESG user object. The local (or "original") operator defined by IPDCKMSID and IPDCOperatorID in the ESG is indicated one by one. For each local (or original) operator IPDCOperatorID, its roaming partner is listed one by one. An example is shown in Table 38.

TABLE 38

| Local IPDC KMS system and IPDC operator (original) | | Roaming partner(s) (user object) | |
|---|---|---|---|
| Local IPDCKMSID | Local IPDCOperatorID | Roaming IPDCKMSID | Roaming IPDCOperatorID |

Figure 31:
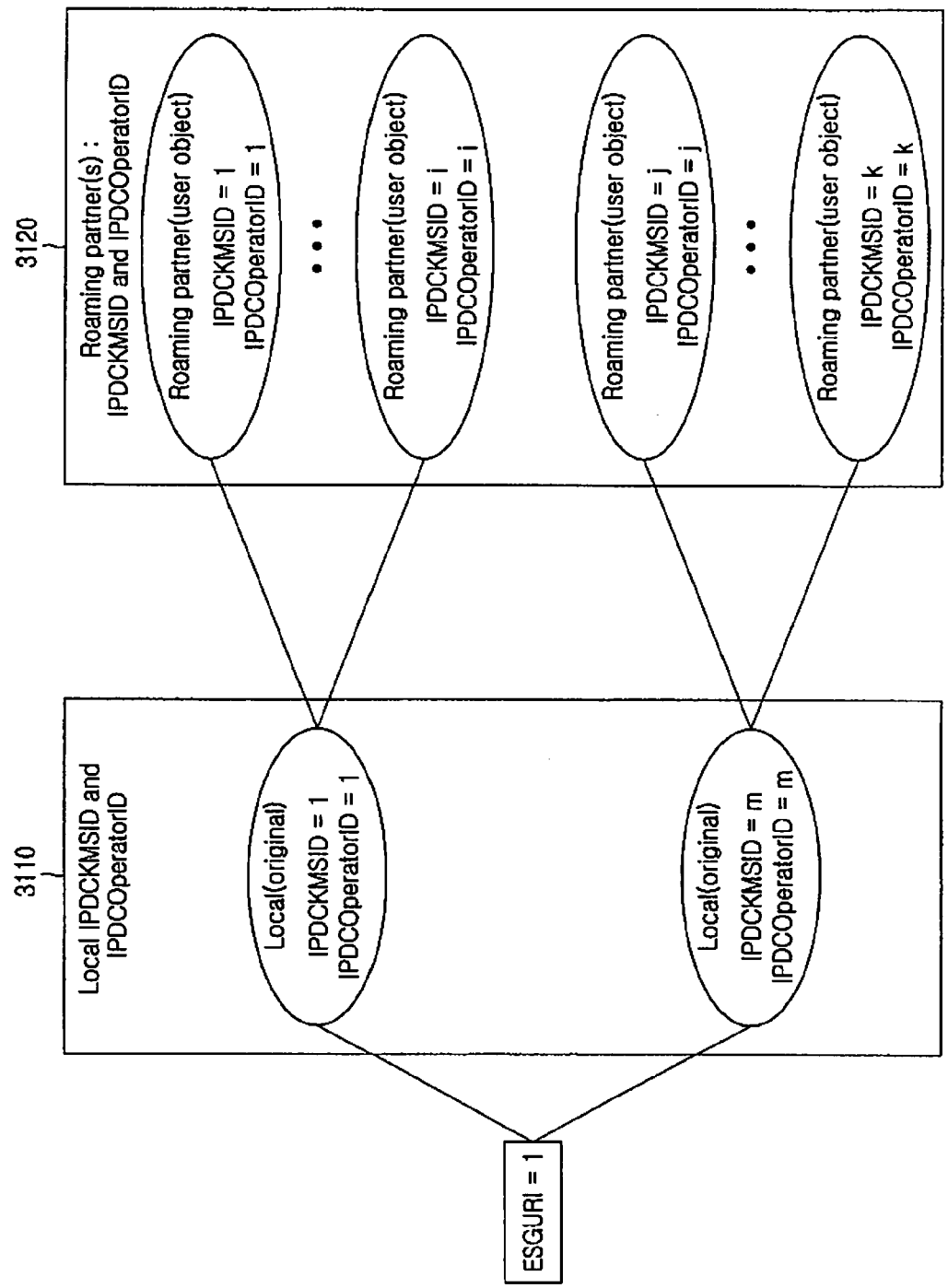
FIG. 31 is a diagram illustrating an exemplary roaming service according to an exemplary embodiment of the present invention.

In one ESG, there may be more than one local IPDCKMSID and IPDCOperatorID and each of them may have their own roaming partners. In this case, each local IPDCKMSID and IPDCOperatorID (3110) and its roaming partners (roaming IPDCKMSID and IPDCOperatorID) (3120) may be indicated one by one in advance as shown in FIG. 31. This corresponds to the PSI/SI in the ESG bootstrap in the exemplary embodiments described above.

IPDC operators that belong to the same IPDC KMS system may have roaming agreement with each other while IPDC operators belonging to different IPDC KMS systems may not have roaming agreement with each other. For example, IPDCKMSID=1 and IPDCOperatorID=1 may have a roaming agreement with IPDCKMSID=1 and IPDCOperatorID=2. However, IPDCKMSID=1 and IPDCOperatorID=1 may not have a roaming agreement with IPDCKMSID=2 and IPDCOperatorID=3. However, roaming agreements may be made between IPDC operators belonging to different IPDC KMS systems.

For purposes of explanation "i," "j," "k," "m," and "n" are used as symbols for IPDCKMSID and IPDCOperatorID. However, detailed values and limits may be assigned differently without departing from the scope of the present invention. Detailed information about every local IPDC operator and its roaming partners may be indicated in an exemplary manner as shown in Table 39.

TABLE 39

```
<element name="RoamingInformation"
type="IPDCRelatedInformationType"/>
    <complexType name="IPDCRelatedInformationType">
<sequence>
    <element name="ESGURI" type="anyURI"/>
    <element name="IPDC" type="IPDCInfoType"
      maxOccurs="unbounded"/>
</sequence>
</complexType>
<complexType name="IPDCInfoType">
    <sequence>
        <element name="IPDCKMSId" type="unsignedShort"/>
        <element name="IPDCOperatorId" type="string"/>
        <element name="RoamingPartner" minOccurs="0"
          maxOccurs="unbounded">
          <complexType>
            <sequence>
                <element name="IPDCKMSId" type="unsignedShort"/>
                <element name="IPDCOperatorId" type="string"/>
            </sequence>
          </complexType>
        </element>
    </sequence>
</complexType>
</element>
```

In one exemplary embodiment, only local IPDC operators and all roaming IPDC operators may be indicated without indicating the relationship between each local IPDC operator and its partner roaming IPDC operator. An example of its syntax may be structured as shown in Table 40.

TABLE 40

```
<element name="RoamingInformation"
type=""IPDCRelatedInformationType"/>
<complexType name="IPDCRelatedInformationType">
    <sequence>
        <element name="ESGURI" type="anyURI"/>
        <element name="IPDC" type="IPDCType" minOccurs="0"
          maxOccurs="unbounded"/>
        <element     name="RoamingPartner"
type="IPDCType"       minOccurs="0" maxOccurs="unbounded"/>
    </sequence>
</complexType>
<complexType name="IPDCType">
    <sequence>
        <element name="IPDCKMSId" type="unsignedShort"/>
        <element name="IPDCOperatorId" type="string"/>
    </sequence>
</complexType>
</element>
```

In an alternative exemplary embodiment, the relationship between the local IPDC operator and its roaming IPDC operator may be indicated as shown in Table 41.

TABLE 41

```
<element name="RoamingInformation"
type=""IPDCRelatedInformationType"/>
<complexType name=""IPDCRelatedInformationType">
  <sequence>
    <element name="ESGURI" type="anyURI"/>
    <element name="LocalIPDC" type="IPDCType"
    minOccurs="0" maxOccurs="unbounded"/>
      <element    name="RoamingPartner"    type="IPDCType"
minOccurs="0" maxOccurs="unbounded"/>
  </sequence>
</complexType>
<complexType name="IPDCType">
  <sequence>
    <element name="IPDCKMSId" type="unsignedShort"/>
    <element name="IPDCOperatorId" type="string"/>
  </sequence>
</complexType>
</element>
```

In yet another exemplary embodiment, the relationship between the local IPDC operator and all roaming IPDC operators may be indicated as shown in Table 42.

TABLE 42

```
<element name="RoamingInformation"
type=""IPDCRelatedInformationType"/>
<complexType name=""IPDCRelatedInformationType">
<sequence>
    <element name="ESGURI" type="anyURI"/>
    <element name="IPDC" type="IPDCOperatorInfoType"
    maxOccurs="unbounded"/>
</sequence>
</complexType>
<complexType name="IPDCOperaotorInfoType">
  <sequence>
    <element name="IPDCKMSId" type="unsignedShort"/>
    <element name="IPDCOperatorId" type="string"/>
  </sequence>
          <attribute name="LocalOrRoamingFlag"type="Boolean"/>
</complexType>
</element>
```

If each local IPDC operator has a plurality of roaming IPDC operators, listing every roaming IPDC operator information one by one may be a big burden. Accordingly, several of the most frequent roaming IPDC operators may be selected and listed here.

Roaming partners 3120 are also updated time to time. The newly compiled roaming IPDC operator information may be missing for each ESG in the ESG bootstrap, PSI/SI or other location in advance. In this case, when the terminal does not find its subscribed IPDC operator in the roaming IPDC operator list, it may nevertheless try to access the ESG if the same IPDCKMSID is found locally. This is because there is still a chance that the terminal may access the service from this IPDC operator if there is already a roaming agreement between them.

Figure 32:
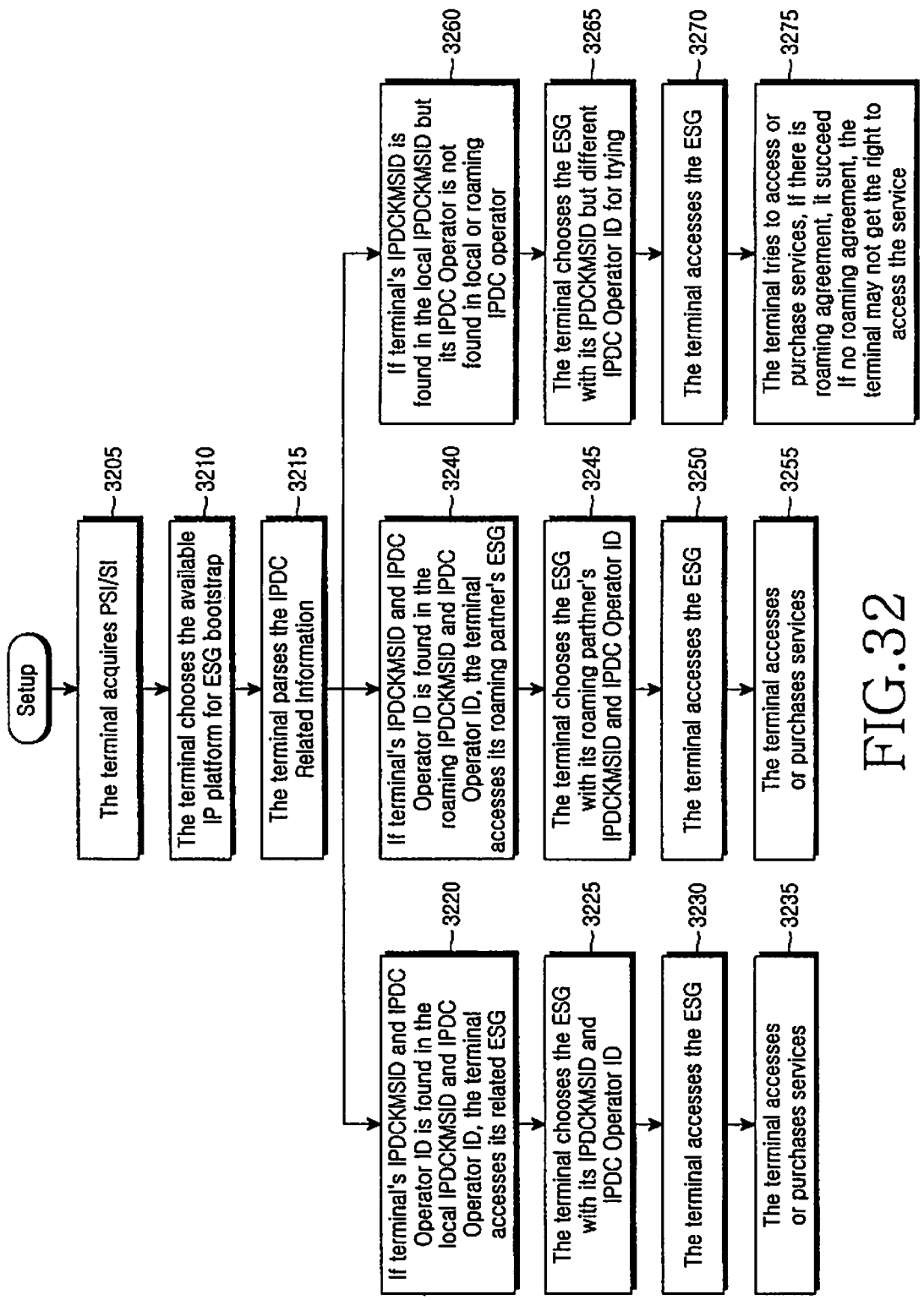
FIG. 32 is a flowchart illustrating an operation of a terminal according to an exemplary embodiment of the present invention.
Figure 33:
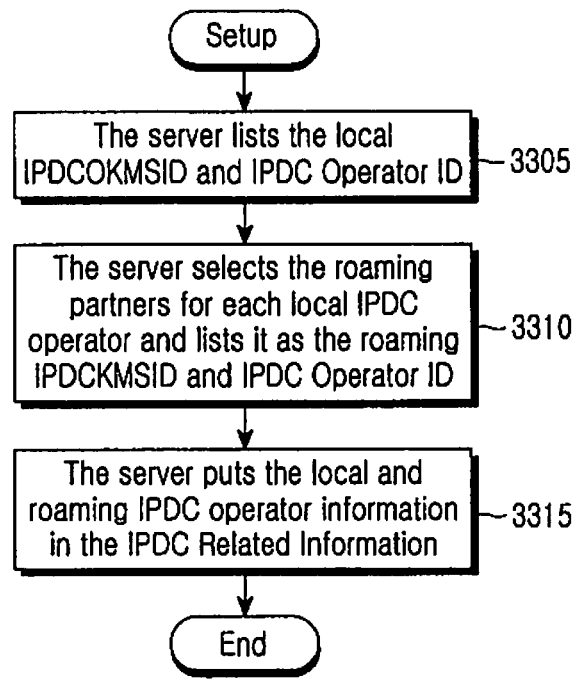
FIG. 33 is a flowchart illustrating an operation of a server according to an exemplary embodiment of the present invention.

If the above information is added in the ESG bootstrap, the terminal may operate as shown in FIG. 32 while the server may operate as shown in FIG. 33.

With respect to FIG. 32, a description will now be made of an exemplary operation of a terminal based on IPDCRelatedInformation.

As shown in FIG. 32, the terminal acquires broadcast service information (PSI/SI) in step 3205 and chooses an IP platform for an ESG bootstrap in step 3210. The terminal parses the IPDCRelatedInformation in step 3215.

In step 3220, if the terminal's IPDCKMSID and IPDCOperatorID is found in the local IPDCKMSID and IPDCOperatorID, the terminal may access its related ESG. In step 3225, the terminal chooses the ESG with its IPDCKMSID and IPDCOperatorID. The terminal accesses the ESG in step 3230 and accesses or purchases services in step 3235.

In step 3240, if the terminal's IPDCKMSID and IPDCOperatorID is found in the roaming IPDCKMSID and IPDCOperatorID, the terminal may access its roaming partner's ESG. In step 3245, the terminal chooses the ESG with its roaming partner's IPDCKMSID and IPDCOperatorID. The terminal accesses the ESG in step 3250 and accesses or purchases services in step 3255.

If the terminal's IPDCKMSID is found in the local IPDCKMSID but its IPDCOperator is not found in the local or roaming IPDC operator in step 3260, the terminal chooses the ESG with its IPDCKMSID but different IPDCOperatorID to try in step 3265. The terminal accesses the ESG in step 3270.

In step 3275, the terminal tries to access or purchase services. If there is a roaming agreement, the terminal may succeed in the try, but if there is no roaming agreement, the terminal may not get the right to access the service.

Next, with reference to FIG. 33, a description will be made of an operation of a server according to IPDCRelatedInformation.

As shown in FIG. 33, the server lists the local IPDCKMSID and IPDCOperatorID in step 3305. The server selects the roaming partners for each local IPDC operator and lists it as the roaming IPDCKMSID and IPDCOperatorID in step 3310. The server puts the local and roaming IPDC operator information in the IPDCRelatedInforamtion in step 3315.

For decreasing the size of the proposed signaling, the IPDCKMSID and IPDCOperatorID may be listed and assigned a number for each of them. When the server lists the local IPDC KMS and IPDC operator, and describes the roaming partner for each of them, the assigned number for each one may be used instead of the exact IPDCKMSID and IPDCOperatorID. Such roaming relationship of the index list may be assigned to the ESG. An exemplary syntax may be structured as shown in Table 43.

TABLE 43

```
<element name="RoamingInformation"
type="IPDCRelatedInformationType"/>
<complexType name=""IPDCRelatedInformationType">
<sequence>
  <element name="ESGURI" type="anyURI"/>
  <element name="IPDC" type="IPDCInfoType"
  maxOccurs="unbounded"/>
</sequence>
</complexType>
<complexType name="IPDCInfoType">
 <sequence>
   <element name="IDOfKMS" type="positiveInteger"/>
   <element name="IDOfIPDCOperator" type="positiveInteger"/>
   <element name="RoamingPartner"
   minOccurs="0"maxOccurs="unbounded">
      <complexType>
        <sequence>
          <element name="IDOfKMS" type="positiveInteger"/>
            <element name="IDOfIPDCOperatar" type="positiveInteger"/>
        </sequence>
      </complexType>
    </element>
  </sequence>
</complexType>
<complexType name="IPDCIDType">
 <sequence>
  <element name="IDOfKMS" type="positiveInteger"/>
    <complexType>
      <attribute name="IPDCKMSId" type="unsignedShort"/>
    </complexType>
  </element>
```

TABLE 43-continued

```
      <element name="IDOfIPDCOperator" type="positiveInteg
  <complexType>
          <attribute name="IPDCOperatorId" type="string"/>
      <complexType>
      </element>
    </sequence>
  </complexType>
</element>
```

If only the local IPDC operator and all roaming IPDC operators are indicated, but the relationship between each local IPDC operator and its partner roaming IPDC operator are not to be indicated, an exemplary syntax may be defined as shown in Table 44.

TABLE 44

```
<element name="RoamingInformation"
type=""IPDCRelatedInformationType"/>
<complexType name=""IPDCRelatedInformationType">
<sequence>
  <element name="ESGURI" type="anyURI"/>
  <element name="IPDC" type="IPDCType"
  minOccurs="0" maxOccurs="unbounded"/>
      <element     name="RoamingPartner"    type="IPDCType"
minOccurs="0" maxOccurs="unbounded">
  </sequence>
</complexType>
<complexType name="IPDCType">
  <sequence>
    <element name="IDOfKMS" type="positiveInteger"/>
    <element name="IDOfIPDCOperator" type="positiveInteger"/>
  </sequence>
</complexType>
<complexType name="IPDCIDType">
  <sequence>
    <element name="IDOfKMS" type="positiveInteger">
      <complexType>
        <attribute name="IPDCKMSId" type="unsignedShort"/>
      </complexType>
    </element>
    <element name="IDOfIPDCOperator" type="positiveInteger">
      <complexType>
        <attribute name="IPDCOperatorId" type="string"/>
      </complexType>
    </element>
  </sequence>
</complexType>
</element>
```

In an alternative exemplary embodiment, it may be defined as shown in Table 45.

TABLE 45

```
<element name="RoamingInformation"
type=""IPDCRelatedInformationType"/>
<complexType name=""IPDCRelatedInformationType">
<sequence>
  <element name="ESGURI" type="anyURI"/>
  <element name="LocalIPDC" type="IPDCType"
  minOccurs="0" maxOccurs="unbounded"/>
      <element     name="RoamingPartner"    type="IPDCType"
minOccurs="0" maxOccurs="unbounded">
  </sequence>
</complexType>
<complexType name="IPDCType">
  <sequence>
    <element name="IDOfKMS" type="positiveInteger"/>
    <element name="IDOfIPDCOperator" type="positiveInteger"/>
  </sequence>
</complexType>
```

TABLE 45-continued

```
<complexType name="IPDCIDType">
  <sequence>
    <element name="IDOfKMS" type="positiveInteger"/>
      <complexType>
        <attribute name="IPDCKMSId" type="unsignedShort"/>
      </complexType>
    </element>
    <element name="IDOfIPDCOperator" type="positiveInteger">
      <complexType>
        <attribute name="IPDCOperatorId" type="string"/>
      </complexType>
    </element>
  </sequence>
</complexType>
</element>
```

In yet another exemplary embodiment, it may be defined as shown in Table 46a.

TABLE 46a

```
<element name="RoamingInformation"
type=""IPDCRelatedInformationType"/>
<complexType name=""IPDCRelatedInformationType">
<sequence>
  <element name="ESGURI" type="anyURI"/>
  <element name="IPDC" type="IPDCOperatorInfoType"
  maxOccurs="unbounded"/>
</sequence>
</complexType>
<complexType name="IPDCOperaotorInfoType">
  <sequence>
    <element name="IDOfKMS" type="positiveInteger"/>
    <element name="IDOfIPDCOperator" type="positiveInteger"/>
  </sequence>
  <attribute name="LocalOrRoamingFlag"type="Boolean"
</complexType>
<complexType name="IPDCIDType">
  <sequence>
    <element name="IDOfKMS" type="positiveInteger"/>
      <complexType>
        <attribute name="IPDCKMSId" type="unsignedShort"/>
      </complexType>
    </element>
    <element name="IDOfIPDCOperator" type="positiveInteger">
      <complexType>
        <attribute name="IPDCOperatorId" type="string"/>
      </complexType>
    </element>
  </sequence>
</complexType>
</element>
```

Table 46a may be expressed in binary as shown in Table 46b.

TABLE 46b

| Syntax | No. of bits | Mnemonic |
| --- | --- | --- |
| Roaming Information Descriptor{ | | |
| n o Operators | 8 | uimbsf |
| for(i=0; i<n o Operators; i++){ | | |
| Operator ID[i] | 8 | uimbsf |
| IPDCOperatorId[i] | 16 | uimbsf |
| IPDCKMSId[i] | 16 | uimbsf |
| } | | |
| n o local Operators | 8 | uimbsf |
| for(i=0; i<n o local Operators; i++){ | | |
| local Operator Index[i] | 8 | uimbsf |
| n o Roaming Partners[i] | 8 | uimbsf |
| for(k=0; k<n o local Operators; k++){ | | |
| Roaming Partner Index[i][k] | 8 | uimbsf |
| } | | |
| } | | |

TABLE 46b-continued

| Syntax | No. of bits | Mnemonic |
|---|---|---|
| n o ESG accessPointIDs | 8 | uimbsf |
| for(i=0; i<n_o_ESG_accessPointIDs; i++){ | | |
|   ESG accessPointID | 8 | uimbsf |
|   n o local Operators on ESG[i] | 8 | uimbsf |
|   for(k=0, | | |
| k<n_o_local_Operators_on_ESG; k++){ | | |
|     local Operator on ESG Index[i][k] | 8 | uimbsf |
|   } | | |
| } | | |
| } | | |

Figure 34:
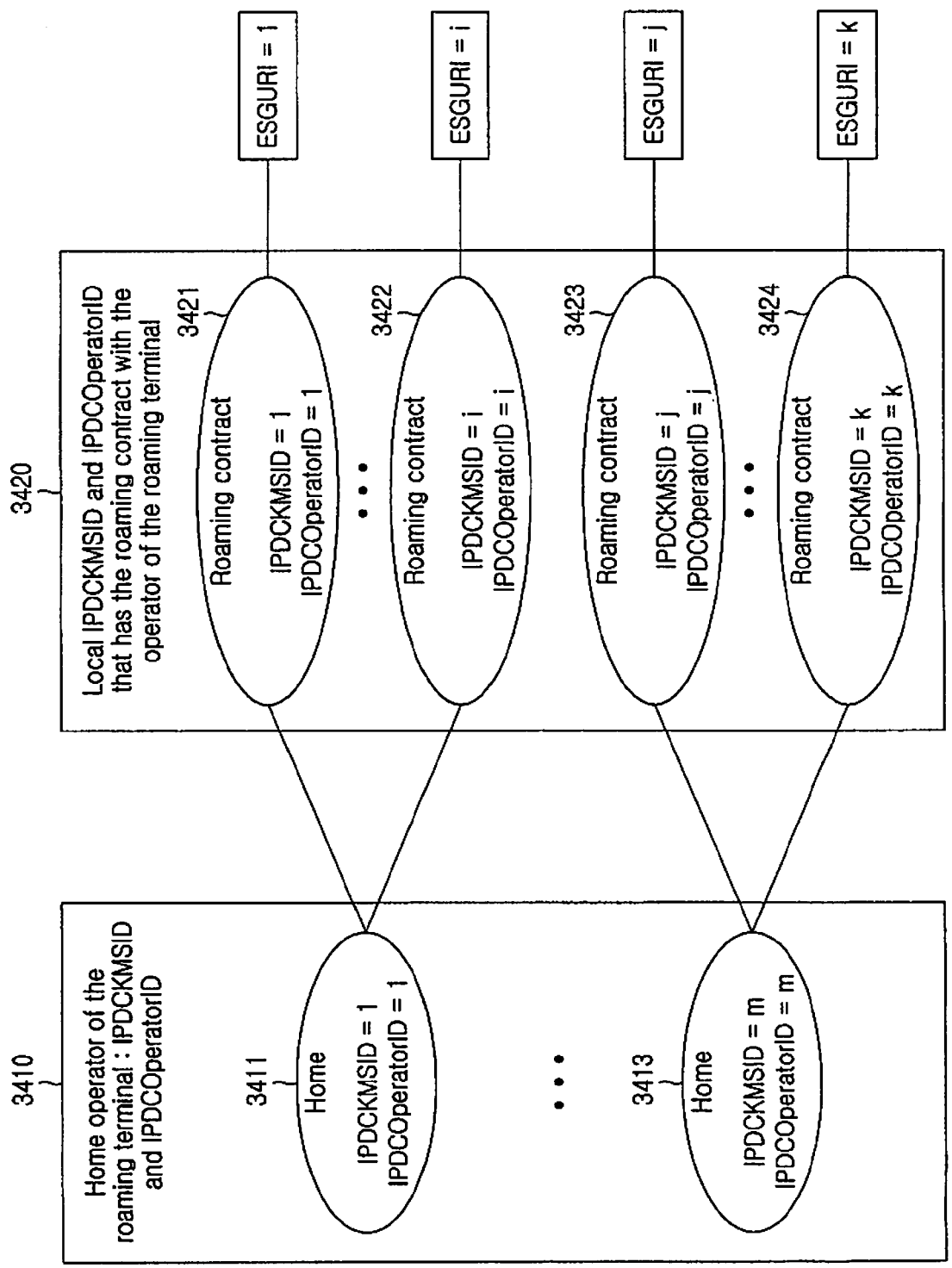
FIG. 34 is a diagram illustrating an example of a roaming agreement according to an exemplary embodiment of the present invention.

One roaming terminal may find several local IPDC operators that have the roaming contract with the home IPDC operator of the roaming terminal. FIG. 34 shows one such example.

First, a home operator of a roaming terminal is listed. Second, a local IPDC operator that has a roaming contract with the home operator of the roaming terminal is listed. Third, each related ESG is listed.

As shown in FIG. 34, IPDCKMSID and IPDCOperatorID for a home operator 3410 of the roaming terminal are written. That is, there are IPDCKMSIP=1 and IPDCOperatorID=1 of the first home, and IPDCKMSID=m and IPDCOperatorID=m for the m<sup>th</sup> home. The home operators are connected to the local IPDCKMSID and IPDCOperatorID that have the roaming agreement with an operator of the roaming terminal.

An exemplary syntax of the home operator of the roaming terminal and its roaming contracted local operator as shown in FIG. 34 may be defined as shown in Table 47.

TABLE 47

```
<element              name="RoamingTerminalInformation"
type="RoamingTerminalRelatedInformationType"/>
  <complexType name="RoamingTerminalRelatedInformationType">
    <sequence>
      <element name="IPDCKMSId" type="unsignedShort"/>
      <element name="IPDCOperatorId" type="string"/>
      <element name="RoamingContract"
      minOccurs="0"maxOccurs="unbounded">
        <complexType>
          <sequence>
            <element name="IPDCKMSId" type="unsignedShort"/>
            <element name="IPDCOperatorId" type="string"/>
            <element name="ESGURI" type="anyURI"/>
          </sequence>
        </complexType>
    </sequence>
  </complexType>
</element>
```

If an index is used, an exemplary syntax may be defined as shown in Table 48.

TABLE 48

```
<element              name="RoamingTerminalInformation"
type="RoamingTerminalRelatedInformationType"/>
  <complexType name="RoamingTerminalRelatedInformationType">
    <sequence>
      <element name="IDOfKMS" type="positiveInteger"/>
      <element name="IDOfIPDCOperator" type="positiveInteger"/>
      <element name="RoamingContract"
      minOccurs="0"maxOccurs="unbounded">
        <complexType>
          <sequence>
            <element name="IDOfKMS" type="positiveInteger"/>
```

TABLE 48-continued

```
            <element name="IDOfIPDCOperator"
              type="positiveInteger"/>
            <element name="ESGURI" type="anyURI"/>
          </sequence>
        </complexType>
    </sequence>
  </complexType>
<complexType name="IPDCIDType">
  <sequence>
    <element name="IDOfKMS" type="positiveInteger"/>
      <complexType>
        <attribute name="IPDCKMSId" type="unsignedShort"/>
      </complexType>
    </element>
    <element name="IDOfIPDCOperator" type="positiveInteger">
      <complexType>
        <attribute name="IPDCOperatorId" type="string"/>
      </complexType>
    </element>
  </sequence>
</complexType>
</element>
```

Meanwhile, roaming related information may also be put in the broadcast service information (PSI/SI).

If there is more than one IPDC operator within one IP platform, the ESG bootstrap is separated for each of the IPDC operator in this IP platform.

TABLE 49

```
IP/MAC_notification_section{
Platform_id
target_descriptor_loop( )
        target_ip_slash_descriptor( )   => Fixed IP address for the
        ESG bootstrap
        IPDCOperator_descriptor( ) =>list all IPDC operator in this
        IP platform
operational_descriptor_loop( )
}
```

As a new descriptor, an IPDC operator descriptor shown in Table 50 is added for describing which IPDC operator that the ESG bootstrap is for.

TABLE 50

```
Syntax
IPDCOperator descriptor{
    LocalIPDCOperator descriptor{
    IPDCKMSId
    IPDCOperatorId
    RoamingParter descriptor{
        IPDCKMSId
        IPDCOperatorId
    }
  }
    Reserved for other identifier
}
```

If there is more than one IPDC operator within one IP platform, the ESG bootstrap is separated for each of the IPDC operator in this IP platform.

TABLE 51

```
IP/MAC_notification_section{
Platform_id
target_descriptor_loop( )
        target_ip_slash_descriptor( )   => Fixed
        IP address for the ESG bootstrap
        IPDCOperator_descriptor( )       for this IPDC operator
        in this IP platform
```

TABLE 51-continued

```
operational_descriptor_loop( )
}
```

As the new descriptor, an IPDC operator descriptor shown in Table 52 is added for describing which IPDC operator that the ESG bootstrap is for.

TABLE 52

```
Syntax
IPDCOperator descriptor{
    LocalIPDCOperator descriptor{
    IPDCKMSId
    IPDCOperatorId
    RoamingParter descriptor{
        IPDCKMSId
        IPDCOperatorId
    }
}
    Reserved for other identifier
}
```

For each home (i.e., local) terminal, the information about its roaming partner in a foreign network may also be provided in advance. In this case, the terminal may already have lots of roaming information in its home network and uses the information when it actually moves to the foreign network, as shown in FIG. 35.

Figure 35:
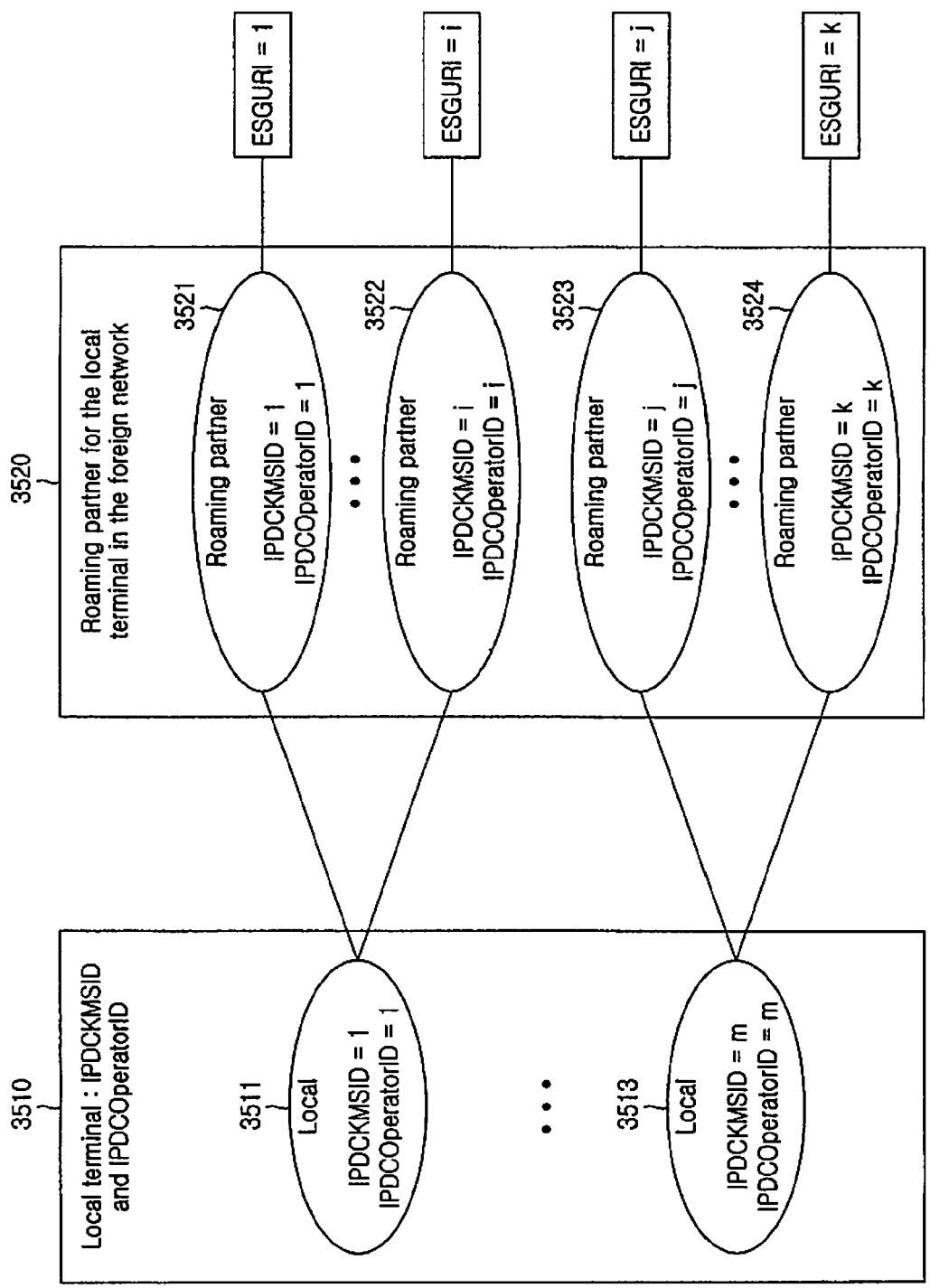
FIG. 35 is a diagram illustrating an example of a local IPDC operator and its roaming partner according to an exemplary embodiment of the present invention.

As shown in FIG. 35, there are local terminals with IPD-CKMSID and IPDCOperatorID. Also, there are roaming partners in the foreign network connected to each of the local terminals.

An exemplary syntax of the local IPDC operator and its roaming partner in the foreign network, shown in FIG. 35, may be defined as shown in Table 53.

TABLE 53

```
<element      name="LocalTerminalRoamingOutsideInformation"
type="LocalTerminalRoamingOutsideRelatedInformationType"/>
  <complexType name=
  "LocalTerminalRoamingOutsideRelatedInformationType">
  <sequence>
    <element name="IPDCKMSId" type="unsignedShort"/>
    <element name="IPDCOperatorId" type="string"/>
    <element name="RoamingPartnerOutside"
    minOccurs="0"maxOccurs="unbounded">
      <complexType>
        <sequence>
          <element name="IPDCKMSId" type="unsignedShort"/>
          <element name="IPDCOperatorId" type="string"/>
        </sequence>
      </complexType>
  </sequence>
  </complexType>
</element>
```

If an index is used, an exemplary syntax may be defined as shown in Table 54.

TABLE 54

```
<element      name="LocalTerminalRoamingOutsideInformation"
type="LocalTerminalRoamingOutsideRelatedInformationType"/>
  <complexType name=
  "LocalTerminalRoamingOutsideRelatedInformationType">
  <sequence>
    <element name="IDOfKMS" type="positiveInteger"/>
    <element name="IDOfIPDCOperator" type="positiveInteger"/>
    <element name="RoamingPartnerOutside"
```

TABLE 54-continued

```
    minOccurs="0"maxOccurs="unbounded">
      <complexType>
        <sequence>
          <element name="IDOfKMS" type="positiveInteger"/>
          <element name="IDOfIPDCOperator" type="positiveInteger"/>
        </sequence>
      </complexType>
  </sequence>
</complexType>
<complexType name="IPDCIDType">
  <sequence>
    <element name="IDOfKMS" type="positiveInteger"/>
    <complexType>
      <attribute name="IPDCKMSId" type="unsignedShort"/>
    </complexType>
    </element>
    <element name="IDOfIPDCOperator" type="positiveInteger">
    <complexType>
      <attribute name="IPDCOperatorId" type="string"/>
    </complexType>
    </element>
  </sequence>
</complexType>
</element>
```

If the ESGURI in the foreign network may be known in advance, it may also be indicated to the terminal. An exemplary syntax may be defined as shown in Table 55.

TABLE 55

```
<element      name="LocalTerminalRoamingOutsideInformation"
type="LocalTerminalRoamingOutsideRelatedInformationType"/>
  <complexType
  name="LocalTerminalRoamingOutsideRelatedInformationType">
  <sequence>
    <element name="IPDCKMSId" type="unsignedShort"/>
    <element name="IPDCOperatorId" type="string"/>
    <element name="RoamingPartnerOutside"
    minOccurs="0"maxOccurs="unbounded">
      <complexType>
        <sequence>
          <element name="IPDCKMSId" type="unsignedShort"/>
          <element name="IPDCOperatorId" type="string"/>
          <element name="ESGURI" type="anyURI"/>
        </sequence>
      </complexType>
  </sequence>
  </complexType>
</element>
```

If an index is used, an exemplary syntax may be defined as shown in Table 56.

TABLE 56

```
<element      name="LocalTerminalRoamingOutsideInformation"
type="LocalTerminalRoamingOutsideRelatedInformationType"/>
  <complexType
  name="LocalTerminalRoamingOutsideRelatedInformationType">
  <sequence>
    <element name="IDOfKMS" type="positiveInteger"/>
    <element name="IDOfIPDCOperator" type="positiveInteger"/>
    <element name="RoamingPartnerOutside"
    minOccurs="0"maxOccurs="unbounded">
      <complexType>
        <sequence>
          <element name="IDOfKMS" type="positiveInteger"/>
          <element name="IDOfIPDCOperator"
            type="positiveInteger"/>
          <element name="ESGURI" type="anyURI"/>
          <element name="ProviderURI" type="anyURI"/>
          <element name="IPPlatformID" type="positiveInteger"/>
          <element name="NetworkID" type="positiveInteger"/>
        </sequence>
      </complexType>
  </sequence>
```

TABLE 56-continued

```
  </complexType>
  <complexType name="IPDCIDType">
    <sequence>
      <element name="IDOfKMS" type="positiveInteger"/>
        <complexType>
          <attribute name="IPDCKMSId" type="unsignedShort"/>
        </complexType>
      </element>
      <element name="IDOfIPDCOperator" type="positiveInteger">
        <complexType>
          <attribute name="IPDCOperatorId" type="string"/>
        </complexType>
      </element>
    </sequence>
  </complexType>
</element>
```

Except the ESGURI, other information, such as IP platform, may also be indicated in advance. Information to be indicated in advance will be decided by the application. This information may be indicated in the similar way as ESGURI.

If the information about IP platform, ESG provider, ESG, access network is indicated, an exemplary syntax may be defined as shown in Table 57.

TABLE 57

```
<element         name="LocalTerminalRoamingOutsideInformation"
type="LocalTerminalRoamingOutsideRelatedInformationType"/>
  <complexType
  name="LocalTerminalRoamingOutsideRelatedInformationType">
    <sequence>
      <element name="IPDCKMSId" type="unsignedShort"/>
      <element name="IPDCOperatorId" type="string"/>
      <element name="RoamingPartnerOutside"
      minOccurs="0" maxOccurs="unbounded">
        <complexType>
          <sequence>
            <element name="IPDCKMSId" type="unsignedShort"/>
            <element name="IPDCOperatorId" type="string"/>
            <element name="ESGURI" type="anyURI"/>
              <element name="ProviderURI" type="anyURI"/>
            <element name="IPPlatformID" type="positiveInteger"/>
            <element name="NetworkID" type="positiveInteger"/>
          </sequence>
        </complexType>
      </sequence>
    </complexType>
  </element>
```

If an index is used, an exemplary syntax may be defined as shown in Table 58.

TABLE 58

```
<element         name="LocalTerminalRoamingOutsideInformation"
type="LocalTerminalRoamingOutsideRelatedInformationType"/>
  <complexType
  name="LocalTerminalRoamingOutsideRelatedInformationType">
    <sequence>
      <element name="IDOfKMS" type="positiveInteger"/>
      <element name="IDOfIPDCOperator" type="positiveInteger"/>
      <element name="RoamingPartnerOutside"
      minOccurs="0" maxOccurs="unbounded">
        <complexType>
          <sequence>
            <element name="IDOfKMS" type="positiveInteger"/>
            <element name="IDOfIPDCOperator"
            type="positiveInteger"/>
            <element name="ESGURI" type="anyURI"/>
              <element name="ProviderURI" type="anyURI"/>
            <element name="IPPlatformID"
            type="positiveInteger"/>
            <element name="NetworkID" type="positiveInteger"/>
          </sequence>
        </complexType>
      </sequence>
    </complexType>
  </complexType>
  <complexType name="IPDCIDType">
    <sequence>
      <element name="IDOfKMS" type="positiveInteger"/>
        <complexType>
          <attribute name="IPDCKMSId" type="unsignedShort"/>
        </complexType>
      </element>
      <element name="IDOfIPDCOperator" type="positiveInteger">
        <complexType>
          <attribute name="IPDCOperatorId" type="string"/>
        </complexType>
      </element>
    </sequence>
  </complexType>
</element>
```

Based on this provisioned information, the terminal may select a suitable IP platform among all available IP platforms for ESG bootstrap and select a suitable ESG provider and ESG among multiple ESG providers and ESGs. Then the terminal may select the service to access.

Next, a description will be made of the terminal/network implementing the above ESG discovery method according to the present invention.

Figure 36:
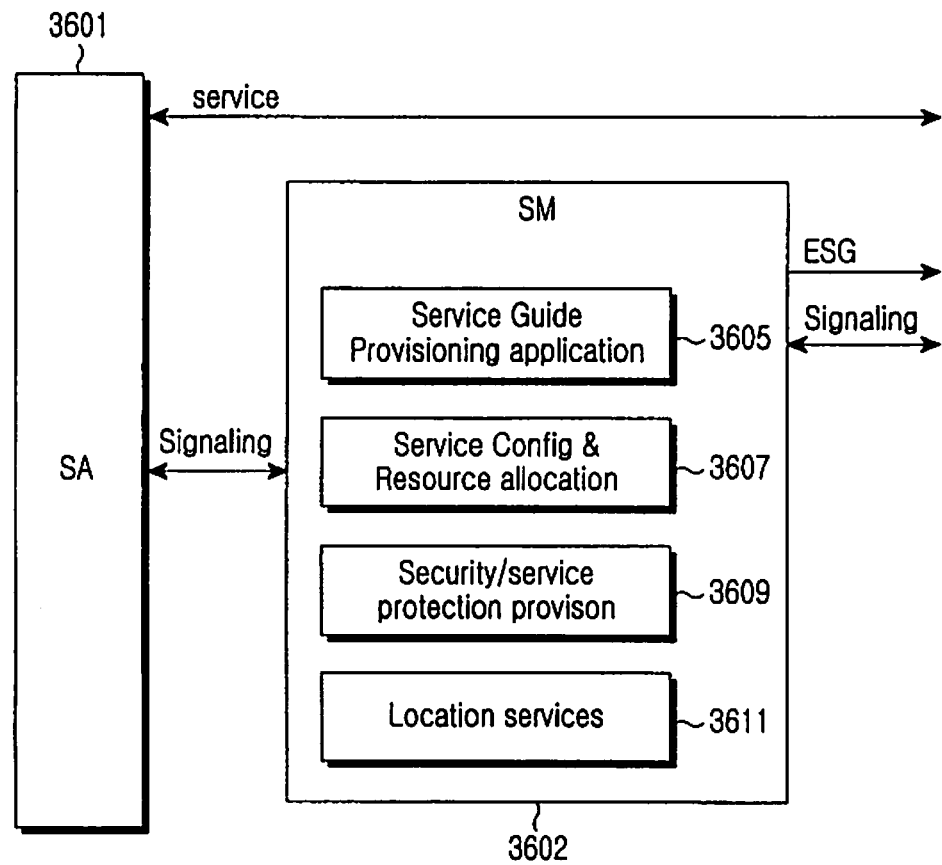
FIG. 36 is a diagram illustrating an exemplary structure of a network in a mobile broadcasting system according to an exemplary embodiment of the present invention.
Figure 37:
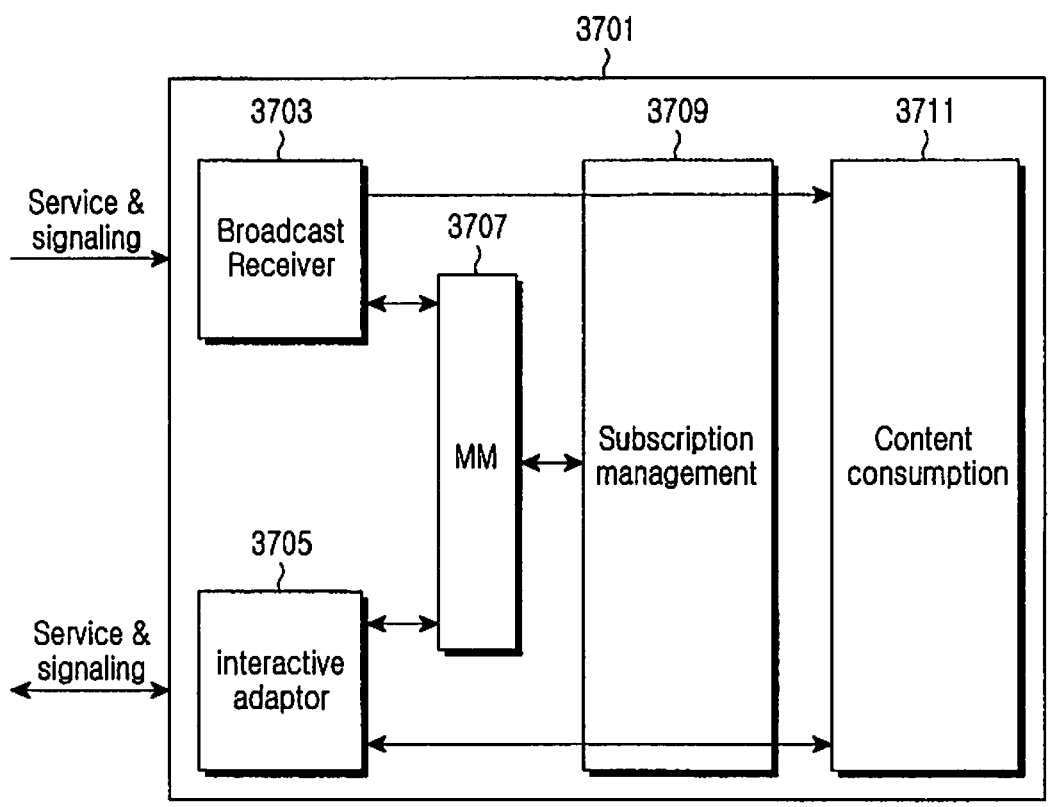
FIG. 37 is a diagram illustrating an exemplary structure of a terminal in a mobile broadcasting system according to an exemplary embodiment of the present invention.

FIG. 36 is a diagram illustrating an exemplary structure of a network in which the ESG discovery method is implemented according to the present invention. FIG. 37 is a diagram illustrating an exemplary structure of a terminal in which the ESG discovery method is implemented according to the present invention. A detailed description thereof is given in Table 59.

TABLE 59

| Functional Entity Name | Description |
| --- | --- |
| Service Application (3601) | Aggregates content from multiple sources and their related metadata in order to provide a particular service application. Provides the head-end application logic. Responsible to provide content encoded in the format understood by the terminal either via streaming or file carousel delivery. Generates service description metadata to be used in the Electronic Service Guide. Interaction end-point for terminals to interact with service application. Service Protection provision. A Service Application entity may exist for each application that is provided in IP Datacast. |

TABLE 59-continued

| Functional Entity Name | Description |
| --- | --- |
| Service Management (3602) | Consists of four sub-entities, which may be instantiated independently:<br>1. Service configuration & resource allocation (3607)<br>Registration of service applications that contend for bandwidth of the broadcast bearer (e.g. one DVB-H IP platform in one DVB transport stream).<br>Assignment of services to location (about Broadcast network topology), to bandwidth and schedules services over time.<br>There is one instance of this sub-entity associated with a broadcast bandwidth contention domain.<br>2. Service Guide Provisioning application (3605)<br>Aggregation of ESG (metadata information) pieces from the service applications.<br>There may be multiple instances of this sub-entity.<br>3. Security/service protection provision (3609)<br>Management of user access to service applications<br>4. Location services (3611)<br>The service management entity may provide location services to service application(s) in a manner that is independent of the way they are actually obtained (such as interaction bearer network functionality or GPS). |
| Terminal (3701) | Sub entities:<br>DVB-H receiver (3703)<br>Receive service or signaling over broadcasting network interactive adaptor (3705)<br>Receive/send service or signaling over interactive network.<br>Mobility Management (MM) (3707)<br>In charge of mobility process.<br>subscription management (3709)<br>Manage rights acquisition and keeps track of rights acquired for the terminal and controls the decryption process of service content.<br>content consumption (3711)<br>Consume the service. |

The exemplary embodiments in accordance with the present invention (e.g., embodiments 1 to 6) as described above is directed to finding a suitable ESG in the PSI/SI or ESG bootstrap level.

It one ESG includes multiple IPDC operators, it is possible that one subset of the ESG is for one IPDC operator while another subset of the ESG is for another IPDC operator. Further, it is possible that one subset of the ESG is for one geographical area while another subset of the ESG is for another geographical area. It is also possible that one subset of the ESG is assessable for one network or one type of the network (e.g., DVB-H, DVB-S, 3GPP, WIMAX, etc.) while another subset of the ESG is assessable by another network or network type. Accordingly, one issue is how a terminal finds a suitable part inside an ESG The above-described indication information (e.g., Table 26) may also be used here modify for a subset of an ESG

TABLE 60

| Field | Detailed parameters | |
| --- | --- | --- |
| Sub set ESG origin identifier | IP platform ID<br>provider URI<br>provider ID<br>ESGURI<br>The identifier of the IPDC operator (e.g. IPDCKMSID and IPDCOperatorID)<br>Geographic location (e.g. Network ID, cell ID, GPS, or others)<br>service provider URI<br>service provider ID<br>SM ID<br>Any other parameter that could identify ESG origin | |
| Sub set ESG user object | 1. all<br>2. specific | IP platform ID<br>provider URI<br>provider ID<br>ESGURI<br>The identifier of the IPDC operator (e.g. IPDCKMSID and IPDCOperatorID)<br>Geographic location (e.g. Network ID, cell ID, GPS, or others)<br>service provider URI |

TABLE 60-continued

| Field | Detailed parameters | | |
|---|---|---|---|
| | | | service provider ID |
| | | | SM ID |
| | | | Any other parameter that could identify the user object |
| | Reserved for new user object | | |
| Scope of the service in the subset ESG | 1. local service | 0: not included | |
| | | 1: included | IP platform ID |
| | | | provider URI |
| | | | provider ID |
| | | | ESGURI |
| | | | The identifier of the IPDC operator (e.g. IPDCKMSID and IPDCOperatorID) |
| | | | Geographic location (e.g. Network ID, cell ID, GPS, or others) |
| | | | service provider URI |
| | | | service provider ID |
| | | | SM ID |
| | | | Any other parameter that could identify the provider of local service |
| | 2. visited service | 0: not included | |
| | | 1: included | IP platform ID |
| | | | provider URI |
| | | | provider ID |
| | | | ESGURI |
| | | | The identifier of the IPDC operator (e.g. IPDCKMSID and IPDCOperatorID) |
| | | | Geographic location (e.g. Network ID, cell ID, GPS, or others) |
| | | | service provider URI |
| | | | service provider ID |
| | | | SM ID |
| | | | Any other parameter that could identify the provider of visited service |
| | 3. service roaming service | 0: not included | |
| | | 1: included | IP platform ID |
| | | | provider URI |
| | | | provider ID |
| | | | ESGURI |
| | | | The identifier of the IPDC operator (e.g. IPDCKMSID and IPDCOperatorID) |
| | | | Geographic location (e.g. Network ID, cell ID, GPS, or others) |
| | | | service provider URI |
| | | | service provider ID |
| | | | SM ID |
| | | | Any other parameter that could identify the provider of service roaming service |
| | Reserved for new scope of the service | | |
| Geographic location | Network ID, cell ID, GPS, or others | | |
| Access network | networkID, network type: DVB-H, DVB-S, DVB-SH (satellite network and terrestrial network), 3GPP, WIMAX.. | | |
| Sub set ESG access scope type | 1. local ESG | | |
| | 2. ESG only for roaming user | | |
| | 3. local and roaming combined ESG | | |
| | Reserved for new access scope | | |
| Reserved for new indication information | | | |

Furthermore, similar embodiments as described above may be provided in different locations inside the ESG Detailed locations for the related information for the indication information may be varied without departing from the scope of the present invention. For purposes of explanation, two locations are described. One example is to locate it in an ESG announcement carousel, and another example is using an ESG partitioning mechanism.

Embodiment 7

An exemplary embodiment of the present invention uses an ESG partitioning method as a method for recognizing each ESG. In a DVB-CBMS system, one ESG may be partitioned into multiple IP flows for its transmission. Information indicating a criterion, based on which IP flows are partitioned, may be defined as shown in Table 61. Further, if one ESG is applied to two or more IP platforms, then different parts of the ESG may be prepared for different IP platforms that exist in this ESG.

In Table 61, other values except values with 0x00 and 0x01 have been proposed by the present invention. As IPDCKMSId value and/or NetworkID value are put in a start_field_value and an end_field_value that indicate intervals of their partitions, the NetworkID may be known only with the services corresponding to the parts of the ESG that are created. The IPDCKMSId may also be known only with the services corresponding to the parts of the ESG that are created.

TABLE 61

| Value | Encoding | Meaning |
|---|---|---|
| 0x00 | 0x0101 (unsigned short) | The number of hours for which the fragments are valid. This may be used to split the ESG into various schedule depths. |
| 0x01 | 0x0000 (string) | The URI of the Service fragments ServiceID. This may be used to carry all fragments relevant to a particular service. |
| 0x30 | 0x0101 (unsigned short)/0x0204 (boolean) | Roaming ESG |
| 0x40 | 0x0101 (unsigned short) | IPDCKMSId |
| 0x50 | 0x0000 (string) | IPDCOperatorId |
| 0x60 | 0x0000 (string) | Access network type |
| 0x70 | 0x0101 (positive Integer) | Network ID |
| 0x80 | 0x0101 (positive Integer) | Cell id |
| 0x90 | 0x0000 (string) | GPS |
| 0xA0 | 0x0101 (positive Integer) | IP platformID |

The present invention has already provided some embodiments about how to indicate the ESG or sub ESG related information in the PSI/SI and ESG bootstrap, inside the ESG, to assist the terminal in finding a suitable ESG or part of the ESG. The present invention may also indicate the ESG or sub ESG related information as shown in Table 26 and Table 60 in different ways, e.g. notification and independent signaling.

Embodiment 8

An exemplary embodiment of the present invention provides a structure for acquiring the information discussed above using an HTTP request query to identify the ESG. In this structure, the terminal sends its information to the server and queries an available ESG list using the information. The server transfers the available ESG list to the terminal using the corresponding information. That is, if the terminal requests an available ESG list while delivering the previously stored information, such as NetworkID, CellID, and IPDC operator identifier to the server, then the server parses this information and delivers an available ESG list to the terminal.

The terminal could also query the ESG based on the IPDC operator, geographic information, access network or other information described in the Table 26 and Table 60.

1. Query ESG Based on IPDC Operator

The terminal wants to query the ESG with some specific IPDC operator, e.g., its home IPDC operator. In this case, the server sends the ESG related only to this specific IPDC operator to the terminal.

TABLE 62

| Query message | Key | Value |
|---|---|---|
| Request the ESG for some specific IPDC operator over IA (InterActive) channel | Request the ESG for some specific IPDC operator over IA channel IPDC operator | IPDCKMSId IPDCOperatorId |

2. Query ESG Based on Geographic Information

The terminal wants to query the ESG for some specific area, e.g., one roaming network. In this case, the server sends the ESG related only to this specific area to the terminal.

TABLE 63

| Query message | Key | Value |
|---|---|---|
| Request the ESG for some specific geography | Request the ESG for some specific geography Geographic information | Network id Cell id GPS Reversed for other geographic information |

3. Query ESG Based on Access Network

The terminal wants to equerry the ESG for some specific network, e.g., DVB-H network 1 or 3GPP network 2. In this case, the server sends the ESG related to only this specific network to the terminal.

TABLE 64

| Query message | Key | Value |
|---|---|---|
| Request the ESG for some specific access network | Request the ESG for some specific access network Access network | Network id Network type: DVB-H DVB-S 3GPP satellite network in DVB-SH terrestrial network in DVB-SH Reserved for other access network information |

The queried information may also be combined. For instance, the terminal may query ESG from IPDC operator I in network 1.

TABLE 65

| Query message | Key | Value |
|---|---|---|
| Request the ESG for some specific IPDC operator in some specific area through some specific network over IA channel | Request the ESG for some specific IPDC operator in some specific area through some specific network over IA channel | |
| | IPDC operator | IPDCKMSId IPDCOperatorId |
| | Geographic information | Network id Cell id GPS Reversed for other geographic information |
| | Access network | Network id Network type: DVB-H DVB-S 3GPP satellite network in DVB-SH terrestrial network in DVB-SH Reserved for other access network information |

Therefore, the present invention includes new keys and values (in bold) into the query message as shown in Table 66.

TABLE 66

| Key | Value | Semantics |
|---|---|---|
| Type | ESGContainer DeliveryList | The Type of expected response. E.g. if an ESG Delivery List or Containers are requested. |
| containerID | 16-bit positive integer | The ContainerID as signaled in the FLUTE FDT or DeliveryList. Multiple values are possibly separated by comma. |
| fragmentID | 16-bit positive integer | A transport FragmentID as signaled in the DeliveryList. Multiple values are possibly separated by comma |
| IPDCKMSId | unsignedShort | A transport IPDCKMSId as signaled in the DeliveryList. Multiple values are possibly separated by comma |
| IPDCOperatorId | String | A transport IPDCOperatorId as signaled in the DeliveryList. Multiple values are possibly separated by comma |
| NetworkID | 16-bit positive integer | A transport NetworkID as signaled in the DeliveryList. Multiple values are possibly separated by comma |
| CellID | 16-bit positive integer | A transport CellID as signaled in the DeliveryList. Multiple values are possibly separated by comma |
| DLVersion | LASTUPDATED dateTime value (NTP timestamp, unsignedInt) | LASTUPDATED version of a DeliveryList |
| EsgURI | ESG_URI as signaled in ProviderDiscovery | Send to an "interactive" AccessPoint associated to the ESG_URI |

Embodiment 9

Another exemplary embodiment provides ESG bootstrap information for some specific IPDC operator over an interactive network. The terminal may also send to the server a request for the ESG bootstrap information for some specific IPDC operator (e.g., its subscribed IPDC operator). The server may aggregate the ESG bootstrap information only related to this specific IPDC operator and send it to the terminal over the interactive network. In this way, the terminal need not parse all the bootstrap information but can easily get what it wants.

If the terminal wants to query the ESG bootstrap associated with one specific IPDC operator in some specific IP platform, the query message may be structured as shown in Table 67.

TABLE 67

| Query message | Key | Value |
|---|---|---|
| Request the ESG Bootstrap information for some specific IPDC operator in some IP platform over IA channel | Request the ESG bootstrap information for some specific IPDC operator over IA channel | |
| | IPDC operator | IPDCKMSId IPDCOperatorId |
| | IP platform | IP platform ID |

If the terminal wants to query the ESG bootstrap from one specific IPDC operator in all IP platforms, the query message may be structured as shown in Table 68.

TABLE 68

| Query message | key | value |
|---|---|---|
| Request the ESG Bootstrap information for some specific IPDC operator over IA channel | Request the ESG bootstrap information for some specific IPDC operator over IA channel | |

TABLE 68-continued

| Query message | key | value |
|---|---|---|
| | IPDC operator | IPDCKMSId<br>IPDCOperatorId |

This exemplary embodiment may be used independently or used with the other exemplary embodiments that indicate the IPDC operator information in advance over broadcast way.

Figure 38:
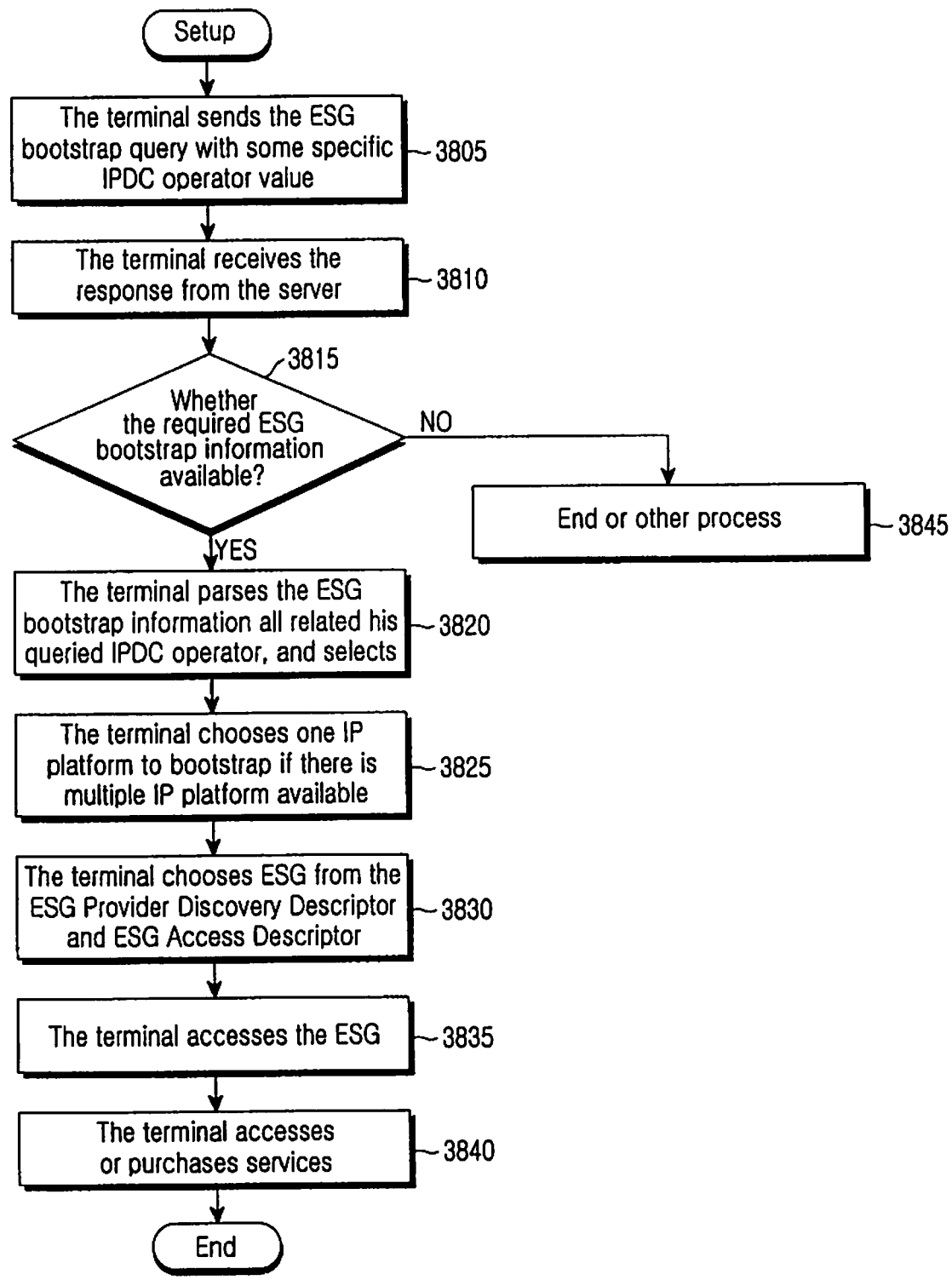
FIG. 38 is a flowchart illustrating an operation of a terminal according to an exemplary embodiment of the present invention.

FIG. 38 is a flowchart illustrating an operation of a terminal according to an exemplary embodiment of the present invention.

As shown in FIG. 38, the terminal sends a query message for an ESG bootstrap with some specific IPDC operator values to a server in step 3805. The terminal receives a response message to the query message from the server in step 3810. The terminal determines in step 3815 whether the requested ESG bootstrap information received from the server is available.

If it is determined in step 3815 that the requested ESG bootstrap information is available, the terminal parses all the ESG bootstrap information related to the queried IPDC operator and selects the corresponding ESG bootstrap in step 3820. The terminal chooses one UP platform to bootstrap if there are multiple IP platforms available, in step 3825. The terminal chooses an ESG from the ESGProviderDiscoveryDescriptor and the ESGAccessDescriptor in the selected ESG bootstrap in step 3830. Thereafter, the terminal accesses the selected ESG in step 3835, and accesses or purchases services through the accessed ESG in step 3840.

Figure 39:
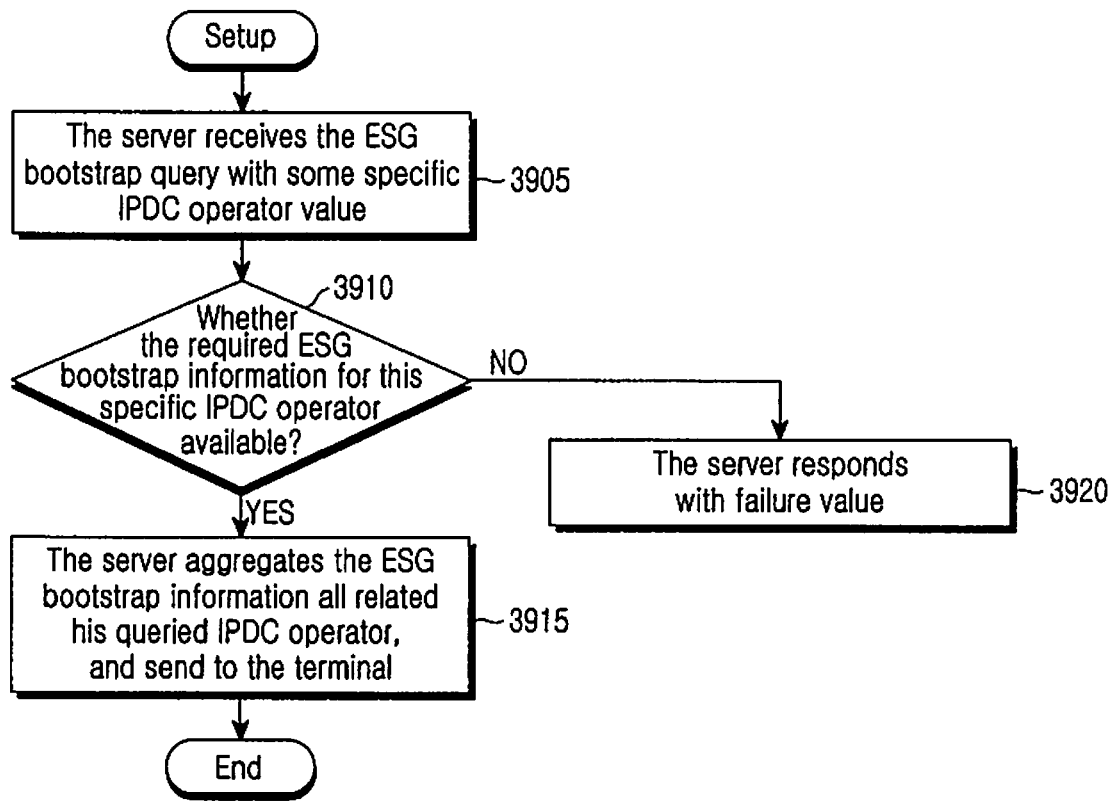
FIG. 39 is a flowchart illustrating an operation of a server according to an exemplary embodiment of the present invention.

FIG. 39 is a flowchart illustrating an operation of a server according to an exemplary embodiment of the present invention.

As shown in FIG. 39, the server receives a query message for an ESG bootstrap with some specific IPDC operator values from the terminal in step 3905. The server determines in step 3910 whether the ESG bootstrap information for the specific IPDC operator, requested from the terminal, is available.

If it is determined in step 3910 that the ESG bootstrap information is available, the server aggregates all the ESG bootstrap information related to the IPDC operator requested from the terminal and sends it to the terminal with a response message in step 3915. However, if it is determined in step 3910 that the ESG bootstrap information is unavailable, the server responds to the terminal with a failure value in step 3920.

In the roaming scenario, even though the local IPDC operator information is indicated in the ESG bootstrap, the roaming partners for each local IPDC operator may not be indicated or the list of the roaming partners may not be complete. In this case, it is very difficult for the roaming terminal to select a suitable ESG that includes the accessible service. However, the query mechanism in accordance with the present invention resolves this problem.

The server will indicate all local IPDC operator information for each ESG in advance, e.g., in the ESG bootstrap. After the server receives the ESG bootstrap query from the terminal with some specific IPDC operator information in step 3905, the server checks whether it is the roaming partner with the some local IPDC operator in step 3910. If it is the roaming partner, the server will aggregate all ESG bootstrap information related to this local IPDC operator and send it to the terminal in step 3915. Otherwise, the server will responds with the failure information in step 3920.

Figure 40:
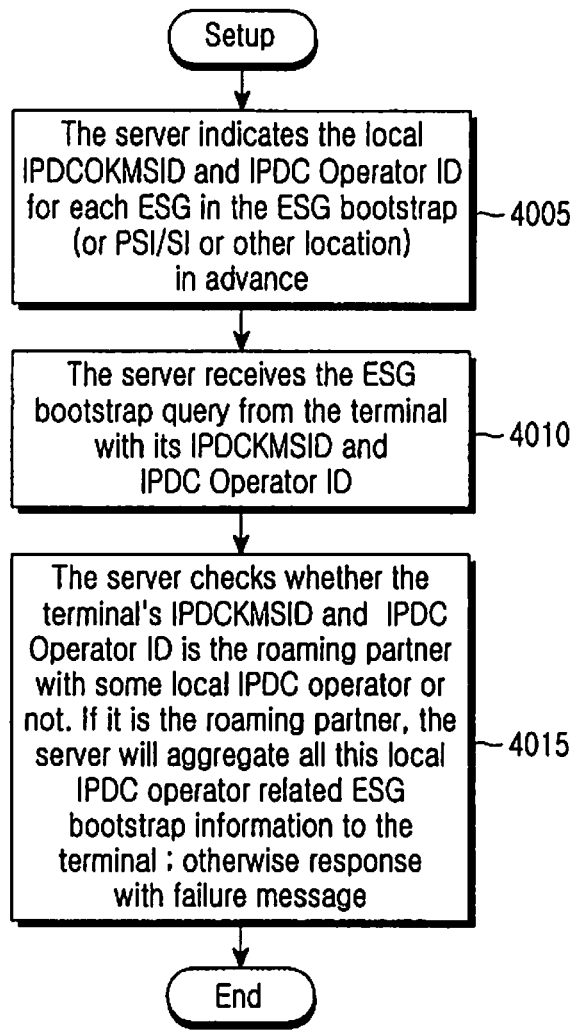
FIG. 40 is a flowchart illustrating an operation of a server according to an exemplary embodiment of the present invention.

FIG. 40 is a flowchart illustrating an operation of a server according to an exemplary embodiment of the present invention.

As shown in FIG. 40, the server indicates the local IPDCKMSID and IPDCOperatorID for each ESG in the ESG bootstrap (or in the PSI/SI, or other location) in advance in step 4005. The server receives the ESG bootstrap query message with the IPDCKMSID and IPDCOperatorID from the terminal in step 4010. In step 4015, the server checks whether or not the IPDCKMSID and IPDCOperatorID requested by the terminal is a roaming partner with some local IPDC operator, and if it is the roaming partner, the server will send all the ESG bootstrap information related to the local IPDC operator to the terminal. Otherwise, the server responds with failure information.

Figure 41:
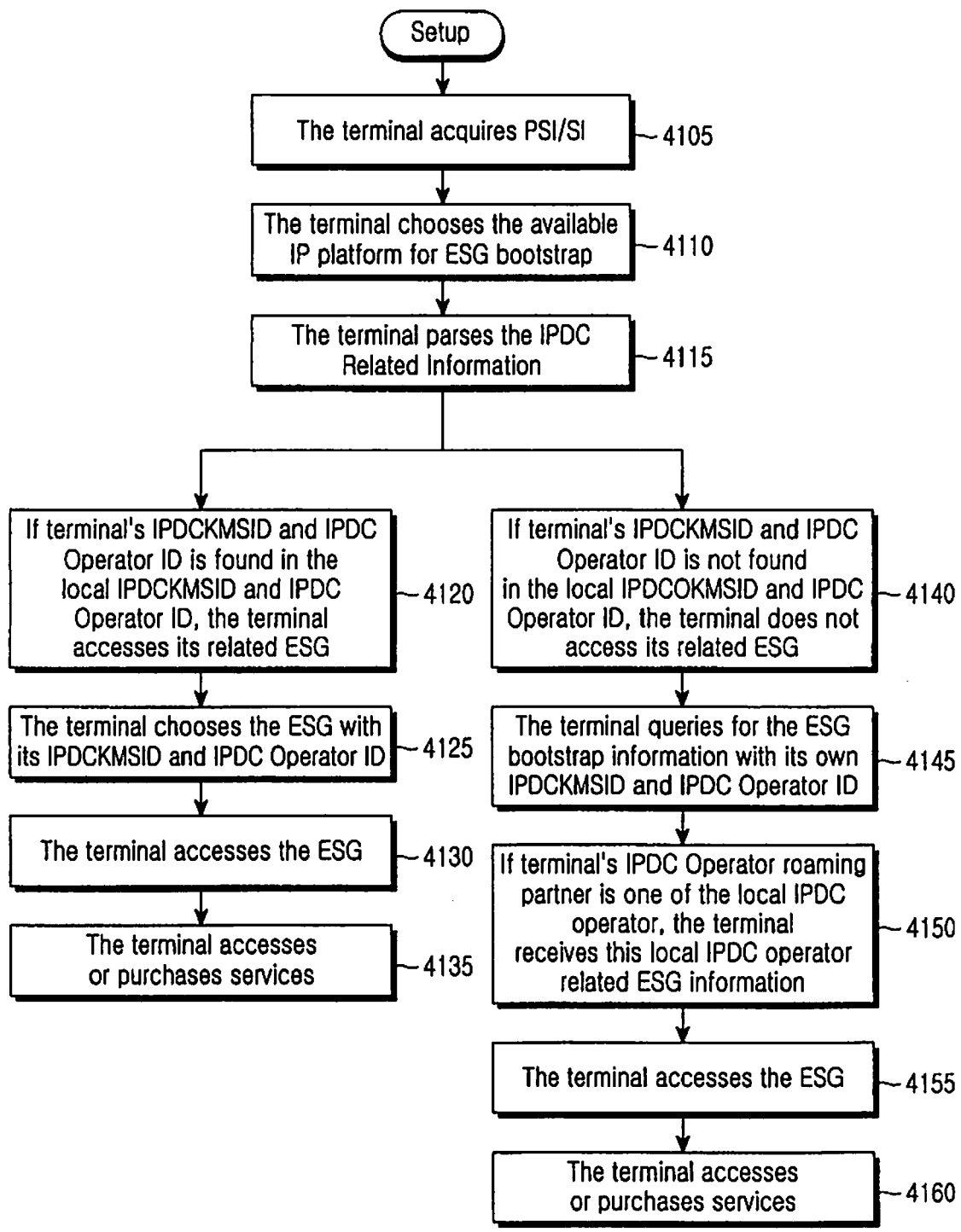
FIG. 41 is a flowchart illustrating an operation of a terminal according to an exemplary embodiment of the present invention.

FIG. 41 is a flowchart illustrating an operation of a terminal according to an exemplary embodiment of the present invention.

As shown in FIG. 41, the terminal searches the local IPDC operator information that has already been indicated, for example, in the ESG bootstrap. If the terminal subscribed with an IPDC operator information is not found among them, the terminal sends the ESG bootstrap query information to the server with its own IPDC operator information. If the server finds its roaming partner in the local IPDC operator, the server sends all related ESG bootstrap information to the terminal. Then the terminal selects the ESG and accesses or purchases the services.

As shown in FIG. 41, the terminal acquires broadcast service information (PSI/SI) in step 4105 and chooses an available IP platform for the ESG bootstrap in step 4110. The terminal parses the IPDCRelatedInformation in step 4115. In step 4120, if the terminal's IPDCKMSID and IPDCOperatorID is found in the local IPDCKMSID and IPDCOperatorID, the terminal accesses its related ESG. The terminal chooses the ESG with its IPDCKMSID and IPDCOperatorID in step 4125 and accesses the ESG in step 4130. The terminal accesses or purchases the services in step 4135.

In step 4140, if the terminal does not find its IPDCKMSID and IPDCOperatorID in the local IPDCKMSID and IPDCOperatorID, the terminal accesses its related ESG.

In this case, the terminal queries the server about the ESG bootstrap information with its own LPDCKMSID and IPDCOperatorID in step 4145. In step 4150, if the terminal's IPDC operator roaming partner is one of the local IPDC operators, the terminal receives the ESG information related to the local IPDC operator from the server. Thereafter, the terminal, which has received the ESG information, accesses the ESG in step 4155 and accesses or purchases services in step 4160.

Embodiment 10

In an exemplary embodiment, the server and the terminal may signal ESG subset related information in the ESG announcement carousel. The roaming ESG related information shown in Table 44 may also be added in the ESG announcement carousel.

These parameters may be put in the ESG init container, and a field containing the attribute or subset attribute of an ESG may be allocated for them as shown by reference numeral 4010 in FIG. 40. An independent container referred to as an attribute container may also be allocated to carry these subset ESG related information as shown by reference numeral 4240 in FIG. 42. Alternatively, some may be put in the init container or any other existing containers, and some in the new container. These parameters may also exist in other locations in the ESG announcement carousel without departing from the scope of the present invention.

Figure 42:
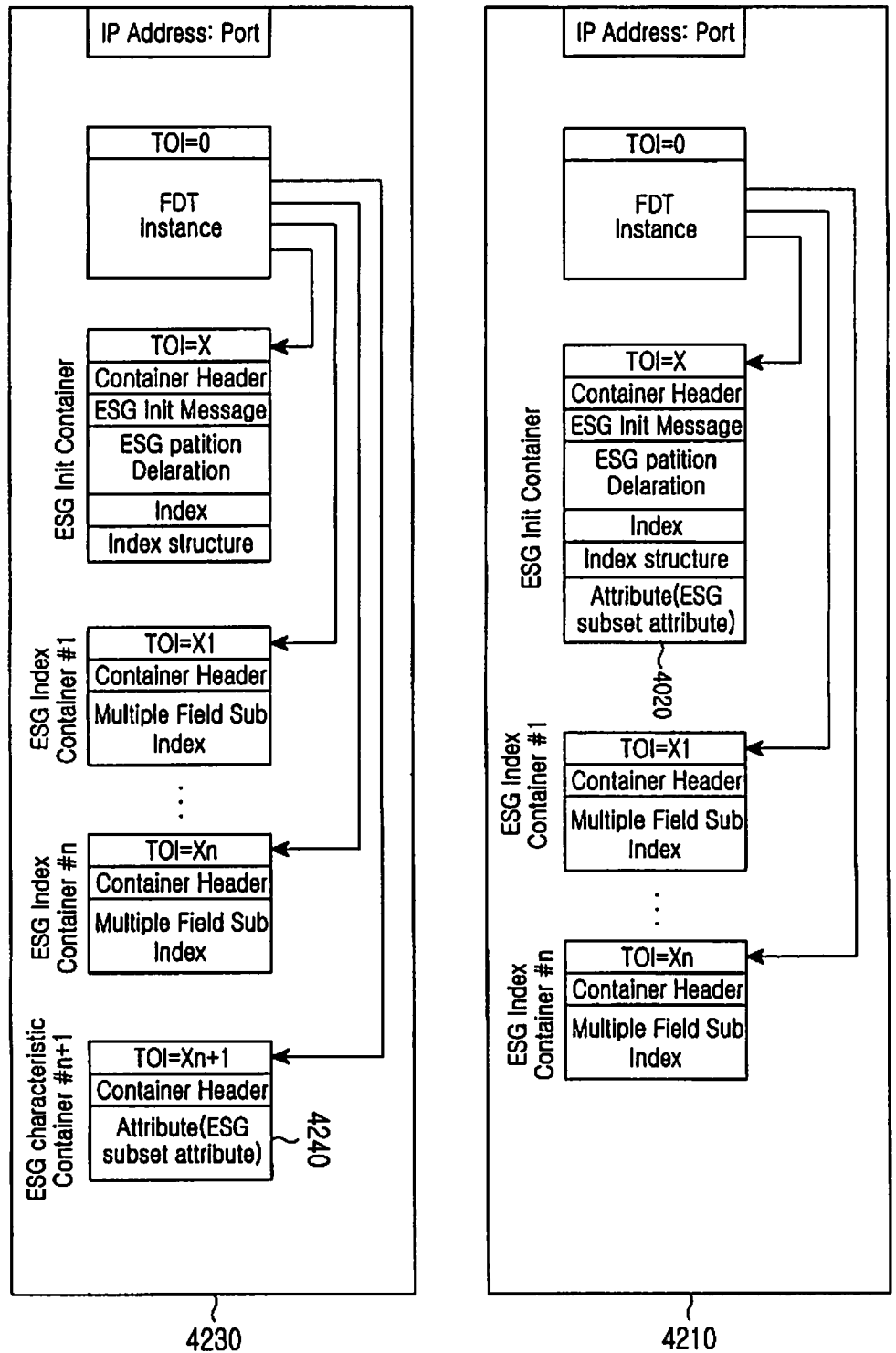
FIG. 42 is a diagram illustrating an exemplary ESG announcement carousel according to the present invention.

FIG. 42 illustrates an ESG announcement carousel with a new element or container in accordance with an exemplary embodiment of the present invention.

As shown in FIG. 42, there may be more than one ESG announcement carousel FLUTE sessions 4210 and 4230. Each ESG announcement carousel FLUTE session is for one ESG subset with some attribute.

For example, one ESG announcement carousel FLUTE session may be for the ESG subset over a satellite network, and another ESG announcement carousel FLUTE session may be for the ESG subset over a terrestrial network. As a second example, one ESG announcement carousel FLUTE session may be for the ESG subset related to one IPDC operator (IPDCKMSID, IPDCOperatorID), and another ESG announcement carousel FLUTE session may be for the ESG subset related to another IPDC operator (IPDCKMSID, IPDCOperatorID). As a third example, one ESG announcement carousel FLUTE session may be for the ESG subset related to one area, and another ESG announcement carousel FLUTE session may be for the ESG subset related to another area. As a fourth example, one ESG announcement carousel FLUTE session may be for the ESG subset related to a local user, and another ESG announcement carousel FLUTE session may be for the ESG subset related to a roaming user. It is to be understood that if one ESG may be applied for two or more IP platforms, then different ESG announcement carousel FLUTE sessions may be prepared for different IP platforms that exist in this ESG.

Figure 43:
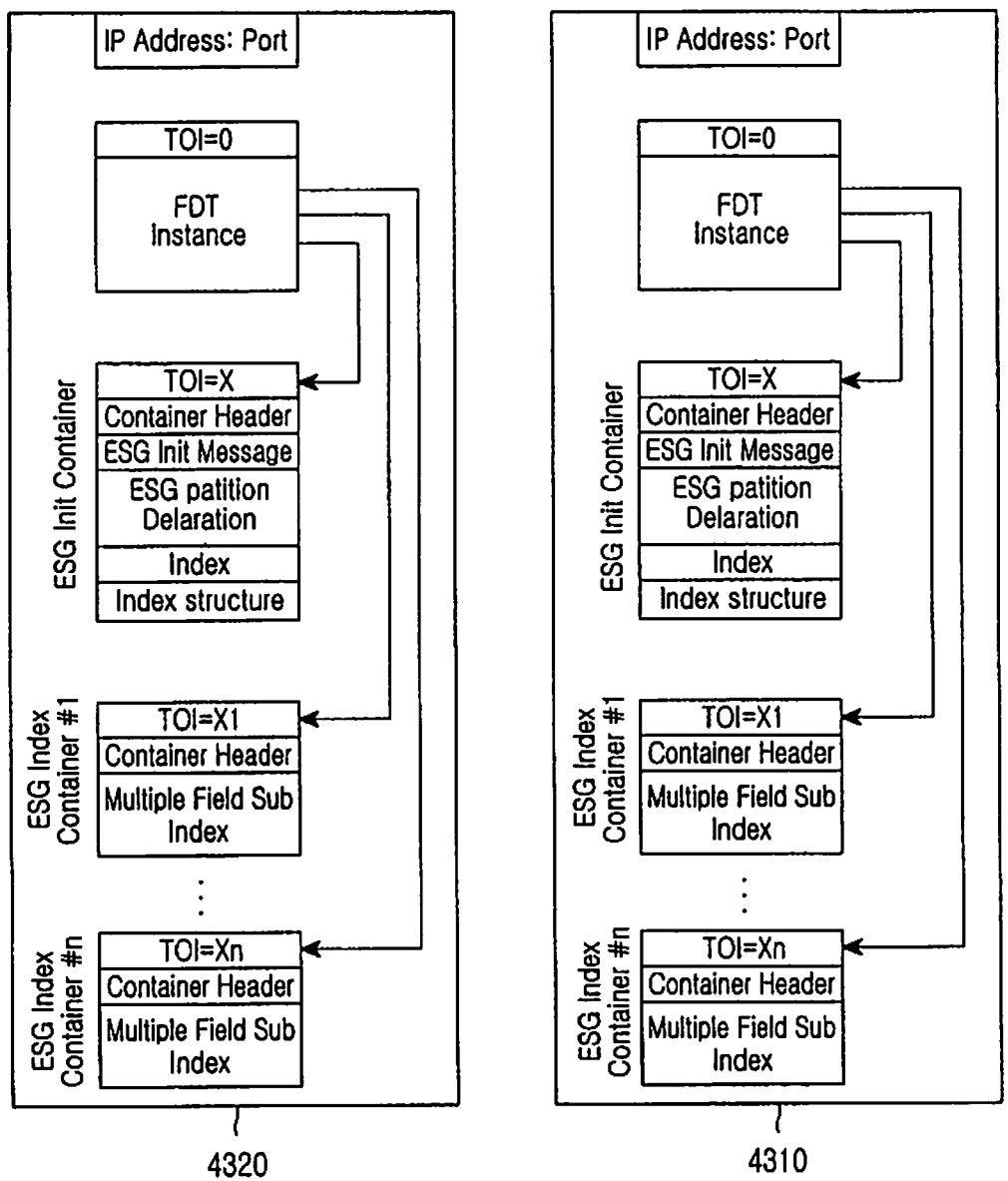
FIG. 43 is a diagram illustrating an example of an ESG announcement carousel according to an exemplary embodiment of the present invention.

Reference numeral 4310 of FIG. 43 represents an ESG announcement carousel FLUTE session for one ESG subset with one kind of attribute (e.g., ESG subset over satellite, ESG subset related to one IPDC operator, or ESG subset related to some area). Reference numeral 4320 of FIG. 43 represents an ESG announcement carousel FLUTE session for another ESG subset with another kind of attribute (e.g., ESG subset over terrestrial, ESG subset related to another IPDC operator, or ESG subset related to another area).

The different ESG announcement carousel FLUTE sessions 4310 and 4320 may be indicated in different ways. As one example, the original ESG announcement carousel FLUTE session may indicate the access information related to another ESG announcement carousel for another ESG subset, as shown in FIG. 44.

Figure 44:
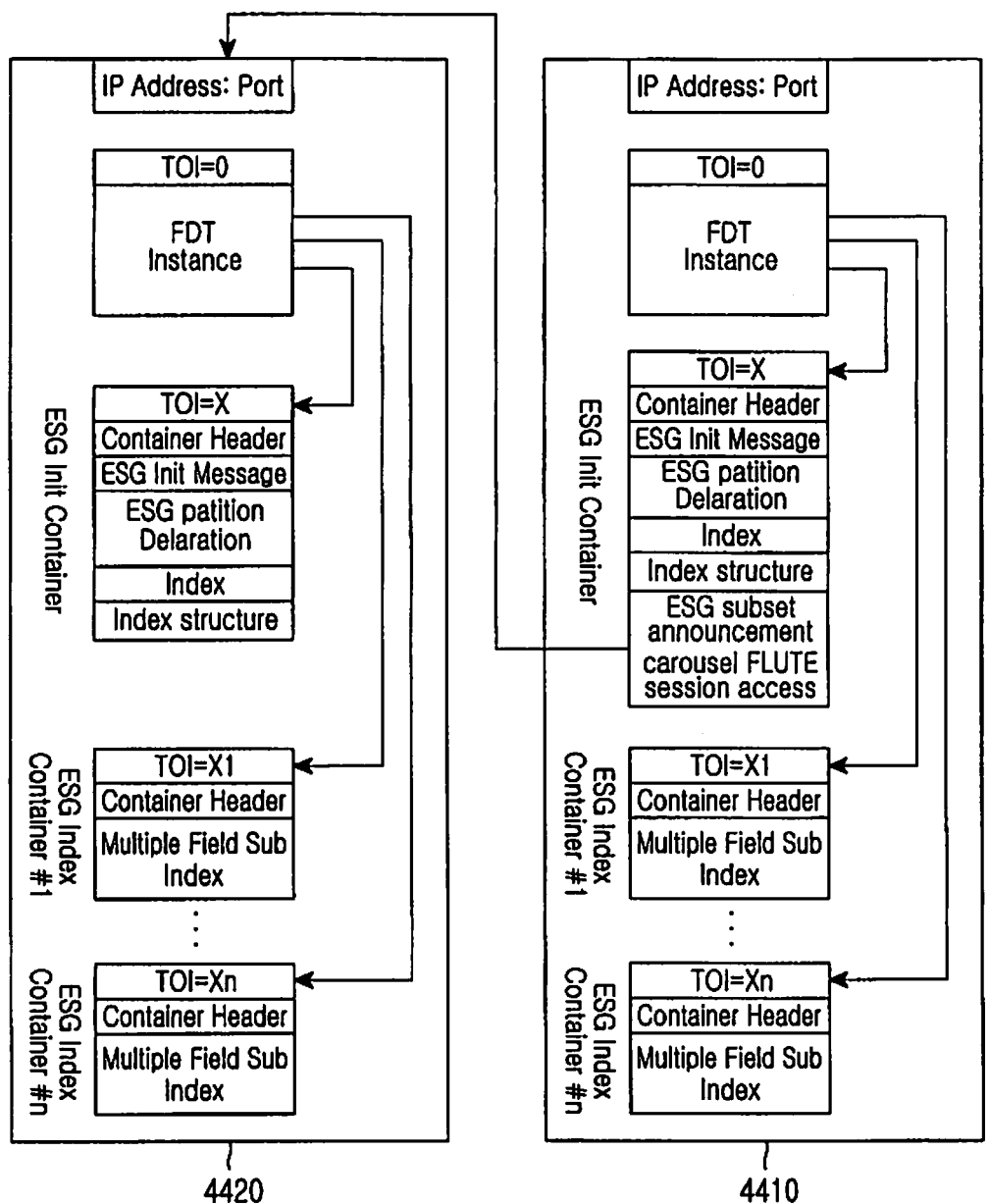
FIG. 44 is a diagram illustrating another example of an ESG announcement carousel according to an exemplary embodiment of the present invention.

As shown in FIG. 44, reference numeral 4410 represents an ESG announcement carousel FLUTE session for one ESG subset with one kind of attribute (e.g., ESG subset over satellite, ESG subset related to one IPDC operator, or ESG subset related to some area). Reference numeral 4420 represents an ESG announcement carousel FLUTE session for another ESG subset with another kind of attribute (e.g., ESG subset over terrestrial, ESG subset related to another IPDC operator, or ESG subset related to another area).

Figure 45:
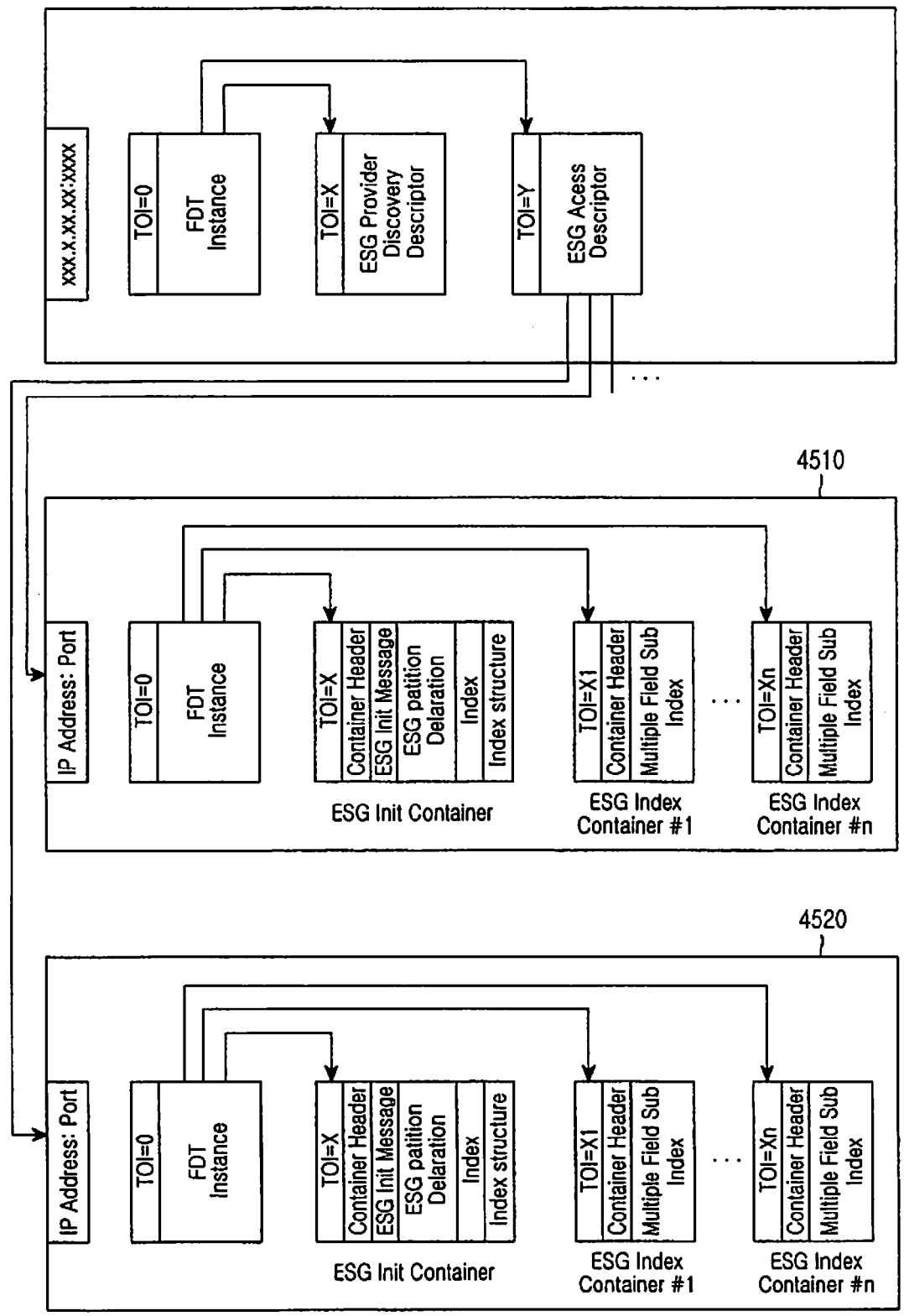
FIG. 45 is a diagram illustrating another example of an ESG announcement carousel according to an exemplary embodiment of the present invention.

As another example, the ESG access descriptor may indicate each IP address, port number, and TSI for them as shown in FIG. 45. The expression of "xx.xx.xx.xx:xxxx" in FIG. 45 means "IP Address:port number". For example, in the CDP specification (ETSI TS 102 472), it is said that the combination of the TSI and the IP source address identifies a FLUTE session.

Accordingly, as shown in FIG. 45, reference numeral 4510 represents an ESG announcement carousel FLUTE session for one ESG subset with one kind of attribute (e.g., ESG subset over satellite, ESG subset related to one IPDC operator, or ESG subset related to some area). Reference numeral 4520 represents an ESG announcement carousel FLUTE session for another ESG subset with another kind of attribute (e.g., ESG subset over terrestrial, ESG subset related to another IPDC operator, or ESG subset related to another area).

In the example of FIG. 45, different ESG announcement carousel FLUTE sessions are for the different ESG subsets of the same ESG. On the server side, different ESG announcement carousel FLUTE sessions are prepared for the different ESG subsets with different attributes (e.g., for satellite and terrestrial networks). Each one may have its own identifier.

There are different ways on how to deliver these ESG announcement carousel FLUTE sessions in accordance with the present invention.

(1) Multiple ESG Announcement Carousel Flute Sessions are Transmitted in a Distributed Fashion.

In one exemplary embodiment, all the ESG announcement carousel FLUTE sessions may be transmitted in a distributed fashion using multiple networks or multiple cells or in any other fashions. Each ESG announcement carousel FLUTE session may be delivered according to its attribute and the delivery condition. For example, the ESG announcement carousel FLUTE session for a satellite network may be delivered when it is over the satellite, and the ESG announcement carousel FLUTE session for a terrestrial network may be delivered when it is over the terrestrial network. Therefore, the terminal receives the ESG announcement carousel and ESG subset for the satellite when it receives the signal from satellite network and receives the ESG announcement carousel and ESG subset for the terrestrial when it receives the signal from the terrestrial network.

In this exemplary embodiment, what the terminal receives may not be the complete ESG but only one subset of the ESG in one time. That means that the terminal may receive different ESG data with the same ESGURI differently (e.g., receiving from satellite and receiving from the terrestrial network). However, how the terminal knows whether the received ESG is complete one or not, and whether the terminal need to update and receive a new subset of the ESG when receiving has changed is unclear. Therefore, an exemplary embodiment of the present invention adds a label to indicate whether the ESG announcement carousel FLUTE session for one ESG is transmitted in a distributed fashion.

For example, MultipleESGAnnouncementCarousel is added as a label. This is a new element added for indicating whether multiple ESG Announcement Carousels are applied for the given ESG. If the MultipleESGAnnouncementCarousel is set as "1," for example, it means the multiple ESG announcement carousels are applied for this ESG. If the MultipleESGAnnouncementCarousel is set as "0," for example, it means only one ESG announcement carousel is applied for this ESG.

TABLE 69

| Field | Semantics |
| --- | --- |
| MultipleESGAnnouncementCarousel | If it is set as "1," it means the multiple ESG announcement carousels are applied for this ESG. If it is set as "0," it means only one ESG announcement carousel is applied for this ESG. |

The location of this label may be in various places without departing from the scope of the present invention. Non-limited examples are given below. For example, Table 70 to Table 73 show examples in which the new label is added in an ESGAccessDescriptor.

A first exemplary location is as shown in Table 70.

TABLE 70

Syntax
ESGEntry{
  ESGEntryVersion
  ESGEntryLength
  MultipleStreamTransport
  MultipleESGAnnouncementCarousel
  IPVersion6
  Reserved
  ProviderID
  if(IPVersion6){
SourceIPAddress
DestinationIPAddress
  }else{
SourceIPAddress
DestinationIPAddress
  }
  Port
  TSI
}

A second exemplary location is as shown in Table 71.

TABLE 71

Syntax
ESG Access Descriptor{
  n_o_ESGEntries
  for(i=0; i<n_o_ESGEntries; i++){
    ESGEntry[i]( )
  MultipleESGAnnouncementCarousel
}
}

A third exemplary location is as shown in Table 72.

TABLE 72

Syntax
ESG Access Descriptor{
  MultipleESGAnnouncementCarousel
  n_o_ESGEntries
  for(i=0; i<n_o_ESGEntries; i++){
    ESGEntry[i]( )
  }
}

In another exemplary embodiment, this new element may be added in the ESGProviderDiscoveryDescriptor as shown in Table 73.

TABLE 73

```
<schema targetNamespace="urn:dvb:ipdc:esgbs:2005"
xmlns:bs="urn:dvb:ipdc:esgbs:2005"
xmlns:mpeg7="urn:mpeg:mpeg7:schema:2001"
xmlns="http://www.w3.org/2001/XMLSchema"
elementFormDefault="qualified" attributeFormDefault="unqualified">
  <import namespace="urn:mpeg:mpeg7:schema:2001" />
  <complexType name="ESGProviderType">
    <sequence>
      <element name="ProviderURI" type="anyURI"/>
      <element name="ProviderName" type="mpeg7:TextualType"/>
      <element name="ProviderLogo" type="mpeg7:TitleMediaType"
        minOccurs="0"/>
      <element name="ProviderID" type="positiveInteger"/>
      <element name="ProviderInformationURL" type="anyURI"
        minOccurs="0"/>
      <element name="PrivateAuxiliaryData" type="anyType"
        minOccurs="0"/>
      <element name="IPDCKMSId" type="unsignedShort"/>
      <element name="IPDCOperatorId" type="string"/>
    </sequence>
```

TABLE 73-continued

```
    <attribute
      name="MultipleESGAnnouncementCarousel"type="Boolean"
  </complexType>
  <element name="ESGProviderDiscovery">
    <complexType>
      <sequence>
        <element name="ServiceProvider"
          type="bs:ESGProviderType" maxOccurs="unbounded"/>
      </sequence>
    </complexType>
  </element>
</schema>
```

(2) Attribute for Multiple ESG Announcement Carousel Flute Session are Signaled.

In another exemplary embodiment, multiple ESG announcement carousel FLUTE sessions are transmitted simultaneously. In this case, how the terminal selects a suitable FLUTE session is the main issue. Therefore, in the exemplary embodiment of the present invention, the attribute for each ESG announcement carousel FLUTE session is signaled (e.g., for satellite or terrestrial, for Area 1 or Area 2, for IPDC operator 1 or IPDC operator 2, for local or roaming user). Based on this signaling, the terminal may select a suitable one to access.

For example, in a DVB-SH system, the network ID and cell ID may be signaled for each ESG access announcement carousel. The satellite cell and terrestrial cell use different regions of cell ID. Thus, the terminal may know whether it is a satellite cell or a terrestrial cell based on the cell ID.

TABLE 74

| Field | Semantics |
|---|---|
| Network id | Specifies the target network where this ESG subset is used for. |
| Cell id | Specifies the target cell where this ESG subset is used for. |

The location of the new element may be in various places without departing from the scope of the present invention. This new element "cell ID" may be added in ESGAccessDescriptor, for example, in various ways. An example thereof is shown in Table 75.

TABLE 75

Syntax
ESGEntry{
  ESGEntryVersion
  ESGEntryLength
  MultipleStreamTransport
  MultipleESGAnnouncementCarousel
  IPVersion6
  Reserved
  ProviderID
  if(IPVersion6){
SourceIPAddress
DestinationIPAddress
  }else{
SourceIPAddress
DestinationIPAddress
  }
  Port
  TSI
    Network id
    Cell id
}

Alternatively, it may be located as shown in Table 76.

TABLE 76

```
Syntax
ESG Access Descriptor{
    n_o_ESGEntries
    for(i=0; i<n_o_ESGEntries; i++){
        ESGEntry[i]( )
    MultipleESGAnnouncementCarousel
        Network id
        Cell id
    }
}
```

The cell information for each ESG announcement carousel FLUTE session may be signaled in detail as shown in Table 77 and Table 78.

TABLE 77

| Field | Semantics |
| --- | --- |
| MultipleESGAnnouncementCarousel | If it is set as "1," it means the multiple ESG announcement carousels is applied for this ESG. If it is set as "0," it means only one ESG announcement carousel is applied for this ESG. |
| MultipleESGAnnouncementCarousel AttributeIndication | If it is set as "1," it means the attribute about the multiple ESG announcement carousels is indicated. If it is set as "0," it means the attribute about the multiple ESG announcement carousels is not indicated. |
| n_o_AnnoucmentCarousel | Specifies the number of ESG announcement carousel FLUTE session for the ESG |
| Network id | Specifies the target network where this ESG subset is used for. |
| Cell id | Specifies the target cell where this ESG subset is used for. |

TABLE 78

```
Syntax
ESGEntry{
    ESGEntryVersion
    ESGEntryLength
    MultipleStreamTransport
    MultipleESGAnnouncementCarousel
MultipleESGAnnouncementCarouselAttributeIndication
IPVersion6
Reserved
ProviderID
If(MultipleESGAnnouncementCarousel){
    If(MultipleESGAnnouncementCarouselAttributeIndication){
        For(i=0;i<n_o_AnnoucmentCarousel i++){
```

TABLE 78-continued

```
            if(IPVersion6){
                SourceIPAddress
                DestinationIPAddress
            }else{
                SourceIPAddress
                DestinationIPAddress
            }
            Port
            TSI
            Network id
            Cell id
        }else{
            For(i=0;i<n_o_AnnoucmentCarousel; i++){
                if(IPVersion6){
                    SourceIPAddress
                    DestinationIPAddress
                }else{
                    SourceIPAddress
                    DestinationIPAddress
                }
                Port
                TSI
            }
        }else{
            if(IPVersion6){
                SourceIPAddress
                DestinationIPAddress
            }else{
                SourceIPAddress
                DestinationIPAddress
            }
            Port
            TSI
        }
    }
```

So far, the example for the SH system has been described. Multiple ESG announcement carousel FLUTE sessions used for other purpose (e.g., for different IPDC operators, for different areas, for local or roaming users) may be applied in a similar way.

Examples for both cases are shown in Table 79 and Table 80.

TABLE 79

| Field | Value | Semantics |
| --- | --- | --- |
| MultipleESGAnnouncementCarousel-AttributeIndication | 0x01 | Specifies the different ESG announcement carousel for the different cells, e.g. for the satellite cell and terrestrial cell in the DVB-SH system. |
| | 0x02 | Specifies the different ESG announcement carousel for the different IPDC operators |
| | 0x03~0xFF | Reserved for future use |

TABLE 80

```
Syntax
ESGEntry{
    ESGEntryVersion
    ESGEntryLength
    MultipleStreamTransport
    MultipleESGAnnoucementCarousel
MultipleESGAnnoucementCarouselAttributeIndication
IPVersion6
Reserved
ProviderID
If(MultipleESGAnnoucementCarousel){
    If(MultipleESGAnnoucementCarouselAttributeIndication==0x1){
        For(i=0;i<n_o_AnnoucmentCarousel i++){
```

TABLE 80-continued

```
        if(IPVersion6){
    SourceIPAddress
    DestinationIPAddress
        }else{
    SourceIPAddress
    DestinationIPAddress
    }
        Port
        TSI
        Network id
        Cell id
    }else{
        If(MultipleESGAnnoucementCarouselAttributeIndication==
        0x2){
            For(i=0;i<n_o_AnnoucmentCarousel i++){
                if(IPVersion6){
                    SourceIPAddress
                    DestinationIPAddress
                }else{
                    SourceIPAddress
                    DestinationIPAddress
                }
                Port
                TSI
                IPDCKMSID
                IPDCOperatorID
        }else{
        For(i=0;i<n_o_AnnoucmentCarousel; i++){
            if(IPVersion6){
                SourceIPAddress
                DestinationIPAddress
            }else{
                SourceIPAddress
                DestinationIPAddress
            }
            Port
            TSI
        }
    }else{
        if(IPVersion6){
            SourceIPAddress
            DestinationIPAddress
        }else{
            SourceIPAddress
            DestinationIPAddress
        }
        Port
        TSI
    }
}
```

The ESGProviderDiscoveryDescriptor and ESGAccessDescriptor are extended to cover ESGoIA case. The new element may also be modified based on this new version.

Table 81 shows an extension of ESGProviderDiscoveryDescriptor, in which the elements in bold are the new elements.

TABLE 81

```
<schema xmlns:dl="urn:dvb:ipdc:esg:2008" xmlns="http://www.w3.org/2001/XMLSchema"
        targetNamespace="urn:dvb:ipdc:esgbs:2008"    elementFormDefault="qualified"
attributeFormDefault="unqualified">
    <import namespace="urn:dvb:ipdc:esgbs:2005"/>
        <complexType name="ESGType">
    <complexContent>
        <sequence>
    <element name="ESG_URI" type="anyURI"/>
    <element name="TargetAudienceType" type="tva:ControlledTermType" minOccurs="0"
maxOccurs="unbounded"/>
    <element name="AccessPoint" type="bs2:accessPointType" maxOccurs="unbounded"/>
        </sequence>
        <attribute     name="broadcastAccess"    type="bs2:AccessType" use="optional"
default="required"/>
        <attribute     name="interactiveAccess"  type="bs2:AccessType" use="optional"
default="not required"/>
        <attribute name="ESG_ID" type="unsignedInt"/>
        <attribute name=" MultipleESGAnnouncementCarousel" type="boolean"
use="optiona"/>
        <attribute     name=" n_o_AnnoucmentCarousel"   type="unsignedInt"
use="optiona"/>
        </extension>
    </complexContent>
</complexType>
<complexType name="ESGProviderExtensionType">
    <complexContent>
        <extension base="bs:ESGProviderType">    <sequence>
    <element name="ESG" type="bs2:ESGType" maxOccurs="unbounded">    </sequence>
        </extension>
    </complexContent>
</complexType>
<simpleType name="AccessType">
        <restriction base="string">
            <enumeration value="required">
            <enumeration value="not required">
        </restriction>
</simpleType>
<complexType name="accessPointType">
        <attribute name="accessPointID" type="unsignedInt"/>
        <sequence>
        <element name=" MultipleESGAnnouncementCarouselAttribute"
type="tva:ControlledTermType" minOccurs="0" maxOccurs="unbounded"/>
        <element    name="NetworkID"    type="positiveInteger"minOccurs="0"
maxOccurs="unbounded"/>
    <element           name="CellID"         type="positiveInteger"minOccurs="0"
```

TABLE 81-continued

```
maxOccurs="unbounded"/>
    <element    name="IPDCKMSId"    type="unsignedShort"    minOccurs="0"
maxOccurs="unbounded"/>
    <element    name="IPDCOperatorId"    type="string"    minOccurs="0"
maxOccurs="unbounded"/>
    <element    name="IPPlatformID"    type="positiveInteger"    minOccurs="0"
maxOccurs="unbounded"/>
    </sequence>
</ complexType >
</schema>
```

Exemplary semantics of the ESGProviderDiscoveryDescriptor is defined as Table 82.

TABLE 82

| Field | Semantics |
|---|---|
| ESG | The ESG element contains information about ESGs offered by a ServiceProvider, and enables globally unique identification of an ESG and 1 to 1 mapping to an ESG entry in the AccessDescriptor Multiple ESGs can be signaled for each one ServiceProvider. |
| ServiceProvider | The ServiceProvider Element describes the ESG Provider |
| ESG_URI | Globally unique identifier of an ESG |
| ESG_ID | The ESG_ID is used to find the right ESG Entry in NotificationAccessDescriptor mapping to ProviderID |
| TargetAudienceType | Target audience of the particular ESG, e.g. for roaming or local users. This is a controlled term of a Classification Scheme. |
| AccessPoint | Each ESG has one or several AccessPoints which can be either a broadcast AccesPoint or interactive AccessPoint |
| MultipleESGAnnoucementCarousel | If it is set as true, it means the multiple ESG announcement carousels is applied for this ESG. if it is set as false, it means only one ESG announcement carousel is applied for this ESG. |
| n_o_AnnoucmentCarousel | Specifies the number of ESG announcement carousel FLUTE session for the ESG |
| accessPointID | The identifier for an AccessPoint that maps to an accessPointID in the ESG AccessDescriptor |
| broadcastAccess | defines the access type of a broadcast AccessPoint. An AccessPoint can be "required", "available" or "unavailable" (see. Default value is "required". |
| interactiveAccess | defines the access type of an interactive AccessPoint. An AccessPoint can be "required", "available" or "unavailable". Default value is "unavailable". |
| MultipleESGAnnoucementCarouselAttribute | Specifies the attribute of the ESG annocement carousel. |
| Network id | Specifies the target network of this ESG announcement carousel |
| Cell id | Specifies the target cell of this ESG announcement carousel |
| IPDCKMSId | Specifies the target IPDC KMS system of this ESG announcement carousel |
| IPDCOperatorId | Specifies the target IPDC operator of this ESG announcement carousel |
| IPPlatformID | Specifies the target IP platform of this ESG announcement carousel |
| Reserved | For further any new attribute to be added. |

Further, exemplary MultipleESGAnnouncementCarouselAttribute classification scheme is as shown in Table 83.

TABLE 83

```
<ClassificationScheme                    uri="urn:dvb:ipdc:esg:cs:
MultipleESGAnnouncementCarouselAttribute TypeCS">
    <Term termID="1">
     <Name xml:lang="en">ESG Announcement Carousel
     Attribute</Name>
        <Definition xml:lang="en">attribute of the ESG
        announcementcarousel </Definition>
        <Term termID="1.1">
            <Name xml:lang="en">Region</Name>
            <Definition xml:lang="en">access region</Definition>
        </Term>
        <Term termID="1.2">
            <Name xml:lang="en">IPDC operator</Name>
            <Definition xml:lang="en">IPDC operator</Definition>
        </Term>
        <Term termID="1.3">
            <Name xml:lang="en">IP platform</Name>
            <Definition xml:lang="en">IP platform</Definition>
        </Term>
    </Term>
</ClassificationScheme>
```

The independent descriptor shown in Table 84 may also be used to signal this information.

TABLE 84

```
<complexType name="ESGComplementaryType">
    <complexContent>
        <sequence>
    <element name="ESG_URI" type="anyURI"/>
    <element name="AccessPoint" type="bs2:accessPointType" maxOccurs="unbounded"/>
        <attribute  name="  MultipleESGAnnouncementCarousel"  type="boolean"
use="optiona"/>
        <attribute     name="    n_o_AnnoucmentCarousel"     type="unsignedInt"
use="optiona"/>
        </complexContent>
    </complexType>
    <complexType name="accessPointType">
        <attribute name="accessPointID" type="unsignedInt"/>
        <sequence>
        <element     name="     MultipleESGAnnouncementCarouselAttribute"
type="tva:ControlledTermType" minOccurs="0" maxOccurs="unbounded"/>
            <element    name="NetworkID"       type="positiveInteger"minOccurs="0"
maxOccurs="unbounded"/>
        <element         name="CellID"            type="positiveInteger"minOccurs="0"
maxOccurs="unbounded"/>
            <element    name="IPDCKMSId"      type="unsignedShort"    minOccurs="0"
maxOccurs="unbounded"/>
            <element       name="IPDCOperatorId"     type="string"     minOccurs="0"
maxOccurs="unbounded"/>
            <element    name="IPPlatformID"    type="positiveInteger"    minOccurs="0"
maxOccurs="unbounded"/>
        </sequence>
    </ complexType >
```

For supporting partition or multiple ESG Announcement carousels for the different ESG subsets, the attribute may need to indicate inside the fragment level, e.g., indicate which fragment is for the satellite cell and which fragment is for the terrestrial cell.

As is apparent from the foregoing description, the present invention can efficiently support mobility of a terminal in a mobile broadcasting system supporting IP Data Casting. Further, when mobility is offered to the terminal according to the present invention, the terminal more easily and rapidly acquires the ESG; while the terminal according to the prior art acquire and search not only the information in every ESG bootstrap but also in every ESG in order to find an accessible IPDC operator information.

While the present invention has been described with reference to certain exemplary embodiments thereof, the present invention is not limited to the above-described embodiments. Those skilled in the art will appreciate that various modifications, additions, and substitutions are possible, without departing from the scope of the present invention as defined by the appended claims and their equivalents.

What is claimed is:

1. A method for supporting mobility of a terminal by a server in a mobile broadcasting system supporting Internet Protocol Data Casting (IPDC), the method comprising:
    listing local IPDC operators that provide a broadcast service to a terminal in a predetermined IP platform and an Electronic Service Guide (ESG);
    generating roaming information for a local IPDC operator having a roaming partner among the local IPDC operators; and
    transmitting broadcast service information including the roaming information over a broadcast network,
    wherein the broadcast service information comprises an ESG bootstrap, and
    wherein generating roaming information further comprises including the roaming information in the ESG bootstrap, and
    wherein the roaming information comprises an identifier of a local IPDC operator which is set as the roaming partner.

2. The method of claim 1, wherein the local IPDC operator having a roaming partner provides the broadcast service even to a terminal subscribed to a local IPDC operator which is set as the roaming partner.

3. The method of claim 1, wherein the ESG bootstrap further comprises a separate descriptor for providing the roaming information.

4. The method of claim 1, wherein the identifier is an IPDC Key Management System (KMS) identifier.

5. A method for supporting mobility by a terminal in a mobile broadcasting system supporting Internet Protocol Data Casting (IPDC), the method comprising:

receiving, over a broadcast network, broadcast service information including information on local IPDC operators that provide a broadcast service to a terminal in a predetermined IP platform and an Electronic Service Guide (ESG);

parsing the broadcast service information to acquire roaming information for a local IPDC operator having a roaming partner among the local IPDC operators;

finding a particular local IPDC operator having its subscribed local IPDC operator as the roaming partner from the acquired roaming information, when the terminal cannot receive the broadcast service through the subscribed local IPDC operator; and accessing the broadcast service using an ESG of the particular local IPDC operator when the particular local IPDC operator is found, wherein the broadcast service information comprises an ESG bootstrap, and wherein the ESG bootstrap further comprises the roaming information, and wherein the roaming information comprises an identifier of a local IPDC operator which is set as the roaming partner.

6. The method of claim 5, wherein the ESG bootstrap comprises a separate descriptor for providing the roaming information.

7. The method of claim 5, wherein the identifier is an IPDC Key Management System (KMS) identifier.

8. A server apparatus for supporting mobility of a terminal in a mobile broadcasting system supporting Internet Protocol Data Casting (IPDC), the apparatus comprising:

a controller for listing local IPDC operators that provide a broadcast service to a terminal in a predetermined IP platform and an Electronic Service Guide (ESG), and generating roaming information for a local IPDC operator having a roaming partner among the local IPDC operators; and a transmitter for transmitting broadcast service information including the roaming information generated by the controller, over a broadcast network, wherein the broadcast service information comprises an ESG bootstrap, and wherein the ESG bootstrap further comprises the roaming information, and wherein the roaming information comprises an identifier of a local IPDC operator which is set as the roaming partner.

9. The server apparatus of claim 8, wherein the local IPDC operator having a roaming partner provides the broadcast service even to a terminal subscribed to a local IPDC operator which is set as the roaming partner.

10. The server apparatus of claim 8, wherein the ESG bootstrap further comprises a separate descriptor for providing the roaming information.

11. The server apparatus of claim 8, wherein the identifier is an IPDC Key Management System (KMS) identifier.

12. A terminal apparatus for supporting mobility in a mobile broadcasting system supporting Internet Protocol Data Casting (IPDC), the apparatus comprising:

a receiver for receiving, over a broadcast network, broadcast service information including information on local IPDC operators that provide a broadcast service to a terminal in a predetermined IP platform and an Electronic Service Guide (ESG); and a controller for parsing the broadcast service information to acquire roaming information for a local IPDC operator having a roaming partner among the local IPDC operators, finding a particular local IPDC operator having its subscribed local IPDC operator as the roaming partner from the acquired roaming information when the terminal cannot receive the broadcast service through the subscribed local IPDC operator, and accessing the broadcast service using an ESG of the particular local IPDC operator when the particular local IPDC operator is found, wherein the broadcast service information comprises an ESG bootstrap, and wherein the ESG bootstrap further comprises the roaming information, and wherein the roaming information comprises an identifier of a local IPDC operator which is set as the roaming partner.

13. The terminal apparatus of claim 12, wherein the ESG bootstrap comprises a separate descriptor for providing the roaming information.

14. The terminal apparatus of claim 12, wherein the identifier is an IPDC Key Management System (KMS) identifier.

15. A method for supporting mobility by a terminal in a mobile broadcasting system supporting Internet Protocol Data Casting (IPDC), the method comprising:

generating a query message including at least one key value requiring transmission of information on a particular local IPDC operator among local IPDC operators that provide a broadcast service to a terminal in a predetermined IP platform and an Electronic Service Guide (ESG);

transmitting the query message including the at least one key value requiring transmission of information on the particular local IPDC operator, to a server over an interactive channel; and receiving a response message including information on the particular local IPDC operator from the server in response to the query message, wherein the information on the particular local IPDC operator further comprises an ESG bootstrap for the corresponding local IPDC operator, and wherein the ESG bootstrap comprises roaming information, and wherein the roaming information comprises an identifier of the particular local IPDC operator having a roaming partner among the local IPDC operators and an identifier of a local IPDC operator which is set as the roaming partner.

16. The method of claim 15, wherein the ESG bootstrap further comprises a separate descriptor for the particular local IPDC operator.

17. The method of claim 15, wherein the at least one key value in the query message comprises at least one of an IPDC Key Management System (KMS) identifier of the particular local IPDC operator, an IPDC operator identifier, and an IP platform identifier.

18. The method of claim 15, wherein when the server manages the roaming information for the local IPDC operator having the roaming partner among the local IPDC operators and the query message is a message for requesting information on the particular local IPDC operator as the roaming partner, the response message comprises at least one of a particular IP platform and an ESG related to the particular local IPDC operator.

19. A method for supporting mobility to a terminal by a server in a mobile broadcasting system supporting Internet Protocol Data Casting (IPDC), the method comprising:

receiving over an interactive channel a terminal's query message including at least one key value requiring transmission of information on a particular local IPDC operator among local IPDC operators that provide a broadcast service to a terminal in predetermined IP platform and an Electronic Service Guide (ESG); and generating and transmitting a response message including information on the particular local IPDC operator based on at least one key value in response to the query message received from the terminal, generating roaming information for a local IPDC operator having a roaming partner among the local IPDC operators;

wherein the information on the particular local IPDC operator included in the response message further comprises an ESG bootstrap for the corresponding local IPDC operator, and wherein the ESG bootstrap comprises the roaming information, and wherein the roaming information comprises an identifier of a local IPDC operator which is set as the roaming partner.

20. The method of claim 19, wherein the ESG bootstrap further comprises a separate descriptor for the particular local IPDC operator.

21. The method of claim 19, wherein the at least one key value in the query message comprises at least one of an IPDC Key Management System (KMS) identifier of the particular local IPDC operator, an IPDC operator identifier, and an IP platform identifier.

22. The method of claim 19, further comprising:
listing the local IPDC operators that provide the broadcast service to the terminal in the predetermined IP platform and the Electronic Service Guide (ESG); and
wherein when the query message is a message for requesting information on the particular local IPDC operator as the roaming partner, the response message comprises at least one of a particular IP platform and an ESG related to the particular local IPDC operator.

23. A terminal apparatus for supporting mobility in a mobile broadcasting system supporting Internet Protocol Data Casting (IPDC), the apparatus comprising:
a controller for generating a query message including at least one key value requiring transmission of information on a particular local IPDC operator among local IPDC operators that provide a broadcast service to a terminal in a predetermined IP platform and an Electronic Service Guide (ESG);
a transmitter for transmitting the query message including the at least one key value requiring transmission of information on the particular local IPDC operator, to a server over an interactive channel; and
a receiver for receiving a response message including information on the particular local IPDC operator from the server in response to the query message,
wherein the information on the particular local IPDC operator further comprises an ESG bootstrap for the corresponding local IPDC operator, and
wherein the ESG bootstrap comprises roaming information, and
wherein the roaming information comprises an identifier of the particular local IPDC operator having a roaming partner among the local IPDC operators and an identifier of a local IPDC operator which is set as the roaming partner.

24. The terminal apparatus of claim 23, wherein the ESG bootstrap further comprises a separate descriptor for the particular local IPDC operator.

25. The terminal apparatus of claim 23, wherein the at least one key value in the query message comprises at least one of an IPDC Key Management System (KMS) identifier of the particular local IPDC operator, an IPDC operator identifier, and an IP platform identifier.

26. The terminal apparatus of claim 23, wherein when the query message is a message for requesting information on the particular local IPDC operator as the roaming partner, the controller further manages roaming information for a local IPDC operator having a roaming partner among the local IPDC operators;
wherein the response message comprises at least one of a particular IP platform and an ESG related to the particular local IPDC operator.

27. A server apparatus for supporting mobility to a terminal in a mobile broadcasting system supporting Internet Protocol Data Casting (IPDC), the apparatus comprising:
a receiver for receiving over an interactive channel a terminal's query message including at least one key value requiring transmission of information on a particular local IPDC operator among local IPDC operators that provide a broadcast service to a terminal in a predetermined IP platform and an Electronic Service Guide (ESG);
a transmitter for transmitting a response message to the query message; and
a controller for generating the response message including information on the particular local IPDC operator based on at least one key value in response to the query message received from the terminal,
wherein the information on the particular local IPDC operator included in the response message further comprises an ESG bootstrap for the corresponding local IPDC operator, and
wherein the ESG bootstrap comprises roaming information, and
wherein the roaming information comprises an identifier of the particular local IPDC operator having a roaming partner among the local IPDC operators and an identifier of a local IPDC operator which is set as the roaming partner.

28. The server apparatus of claim 27, wherein the information on the particular local IPDC operator included in the response message further comprises an ESG bootstrap for the corresponding local IPDC operator.

29. The server apparatus of claim 27, wherein the ESG bootstrap further comprises a separate descriptor for the particular local IPDC operator.

30. The server apparatus of claim 27, wherein the at least one key value in the query message comprises at least one of an IPDC Key Management System (KMS) identifier of the particular local IPDC operator, an IPDC operator identifier, and an IP platform identifier.

31. The server apparatus of claim 27, wherein the controller is adapted to list the local IPDC operators that provide the broadcast service to the terminal in the predetermined IP platform and the Electronic Service Guide (ESG), and generate roaming information for a local IPDC operator having a roaming partner among the local IPDC operators;
wherein when the query message is a message for requesting information on the particular local IPDC operator as the roaming partner, the response message comprises at least one of a particular IP platform and an ESG related to the particular local IPDC operator.

32. A method for supporting mobility of a terminal by a server in a mobile broadcasting system supporting Internet Protocol Data Casting (IPDC), the apparatus comprising:

generating broadcast service information including type information of an Electronic Service Guide (ESG), an access type of which is classified according to provision of a roaming service in association with use of a broadcast service; and transmitting broadcast service information including the type information of the ESG, wherein the broadcast service information comprises an ESG bootstrap, and the type information of the ESG is included in the ESG bootstrap, wherein the ESG bootstrap comprises roaming information, and wherein the roaming information comprises an identifier of a local IPDC operator having a roaming partner among local IPDC operators and an identifier of a local IPDC operator which is set as the roaming partner.

33. The method of claim 32, wherein the type information of the ESG indicates whether a corresponding ESG is for a roaming user who uses the roaming service, or for a local user who does not use the roaming service.

34. The method of claim 32, wherein the ESG bootstrap further comprises a separate descriptor for the type information of the ESG.

35. A method for supporting mobility by a terminal in a mobile broadcasting system supporting Internet Protocol Data Casting (IPDC), the method comprising:

receiving, from a server, broadcast service information including type information of an Electronic Service Guide (ESG), an access type of which is classified according to provision of a roaming service in association with a broadcast service; and selecting a desired ESG based on the type information of the ESG, wherein the broadcast service information comprises an ESG bootstrap, and the type information of the ESG is included in the ESG bootstrap; and wherein selecting the desired ESG further comprises selecting the desired ESG without parsing a plurality of ESGs included in the broadcast service information, wherein the ESG bootstrap comprises roaming information, and wherein the roaming information comprises an identifier of a local IPDC operator having a roaming partner among local IPDC operators and an identifier of a local IPDC operator which is set as the roaming partner.

36. The method of claim 35, wherein the type information of the ESG indicates whether a corresponding ESG is for a roaming user who uses the roaming service, or for a local user who does not use the roaming service.

37. The method of claim 35, wherein the ESG bootstrap further comprises a separate descriptor for the type information of the ESG.

38. A server apparatus for supporting mobility of a terminal in a mobile broadcasting system supporting Internet Protocol Data Casting (IPDC), the apparatus comprising:

a controller for generating broadcast service information including type information of an Electronic Service Guide (ESG), an access type of which is classified according to provision of a roaming service in association with use of a broadcast service; and a transmitter for transmitting broadcast service information including the type information of the ESG, wherein the broadcast service information comprises an ESG bootstrap, and the type information of the ESG is included in the ESG bootstrap, wherein the ESG bootstrap comprises roaming information, and wherein the roaming information comprises an identifier of a local IPDC operator having a roaming partner among local IPDC operators and an identifier of a local IPDC operator which is set as the roaming partner.

39. The server apparatus of claim 38, wherein the type information of the ESG indicates whether a corresponding ESG is for a roaming user who uses the roaming service, or for a local user who does not use the roaming service.

40. The server apparatus of claim 38, wherein the ESG bootstrap further comprises a separate descriptor for the type information of the ESG.

41. A terminal apparatus for supporting mobility in a mobile broadcasting system supporting Internet Protocol Data Casting (IPDC), the apparatus comprising:

a receiver for receiving, from a server, broadcast service information including type information of an Electronic Service Guide (ESG), an access type of which is classified according to provision of a roaming service in association with use of a broadcast service; and a controller for selecting a desired ESG based on the type information of the ESG, wherein the broadcast service information comprises an ESG bootstrap, and the type information of the ESG is included in the ESG bootstrap, and wherein the controller selects the desired ESG without parsing a plurality of ESGs included in the broadcast service information, wherein the ESG bootstrap comprises roaming information, and wherein the roaming information comprises an identifier of a local IPDC operator having a roaming partner among local IPDC operators and an identifier of a local IPDC operator which is set as the roaming partner.

42. The terminal apparatus of claim 41, wherein the type information of the ESG indicates whether a corresponding ESG is for a roaming user who uses the roaming service, or for a local user who does not use the roaming service.

43. The terminal apparatus of claim 41, wherein the ESG bootstrap further comprises a separate descriptor for the type information of the ESG.

* * * * *